(12) United States Patent
Yoshida

(10) Patent No.: US 7,410,235 B2
(45) Date of Patent: Aug. 12, 2008

(54) PRINTING DARKNESS NON-UNIFORMITIES CORRECTION METHOD AND PRINTING DARKNESS NON-UNIFORMITIES CORRECTION APPARATUS

(75) Inventor: Masahiko Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 437 days.

(21) Appl. No.: 11/057,374

(22) Filed: Feb. 15, 2005

(65) Prior Publication Data
US 2005/0212833 A1     Sep. 29, 2005

(30) Foreign Application Priority Data
Feb. 16, 2004     (JP)     ............... 2004-038587

(51) Int. Cl.
*B41J 29/393*     (2006.01)
(52) U.S. Cl. .......................................... 347/19
(58) Field of Classification Search .................. 347/19, 347/15, 41, 12
See application file for complete search history.

(56) References Cited

U.S. PATENT DOCUMENTS

| | | | |
|---|---|---|---|
| 6,354,688 B1 * | 3/2002 | Inoue et al. ................... 347/15 |
| 6,830,306 B2 * | 12/2004 | Couwenhoven et al. ....... 347/12 |
| 7,347,524 B2 * | 3/2008 | Yoshida ........................ 347/19 |
| 2005/0185012 A1 * | 8/2005 | Yoshida ........................ 347/19 |

FOREIGN PATENT DOCUMENTS

JP     2-54676 A     2/1990

* cited by examiner

*Primary Examiner*—Stephen D. Meier
*Assistant Examiner*—Rene Garcia, Jr.
(74) *Attorney, Agent, or Firm*—Sughrue Mion, PLLC

(57) ABSTRACT

A printing method and a printing apparatus are achieved that can improve the quality of printed images. The printing method comprises the following steps: (a) a step of printing a correction pattern on a medium, wherein said correction pattern comprises a plurality of lines made of a plurality of dots arranged in a movement direction of nozzles, said lines being disposed in an intersecting direction that intersects with said movement direction, and is printed by alternately repeating an operation to eject ink from a plurality of said nozzles and an operation of moving said medium in said intersecting direction; (b) a step of determining for each of said lines a correction value for correcting a darkness in said intersecting direction of an image to be printed on said medium, wherein a degree of darkness correction in said correction values is determined according to a darkness of said correction pattern and a darkness of an image to be printed; and (c) a step of printing said image on said medium based on said correction values determined corresponding to each of said lines.

14 Claims, 27 Drawing Sheets

TM

| 1 | 9 | 3 | 11 |
|---|---|---|---|
| 13 | 5 | 15 | 7 |
| 4 | 12 | 2 | 10 |
| 16 | 8 | 14 | 6 |

UM

| 16 | 8 | 14 | 6 |
|---|---|---|---|
| 4 | 12 | 2 | 10 |
| 13 | 5 | 15 | 7 |
| 1 | 9 | 3 | 11 |

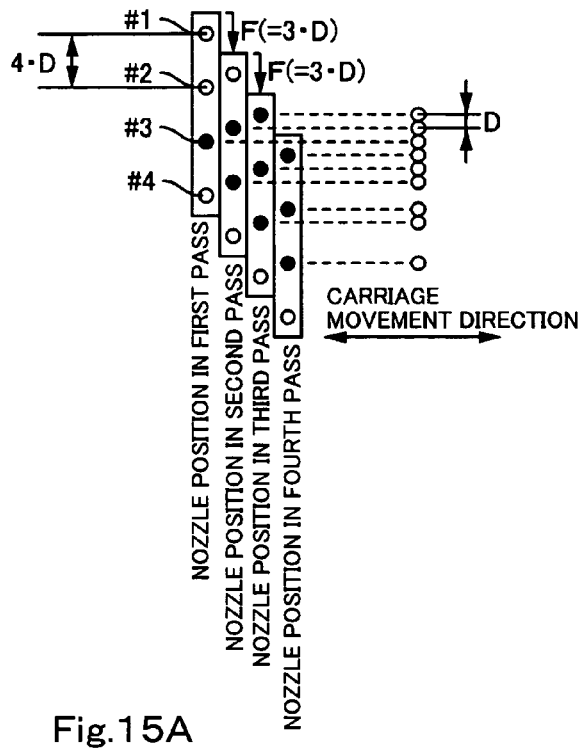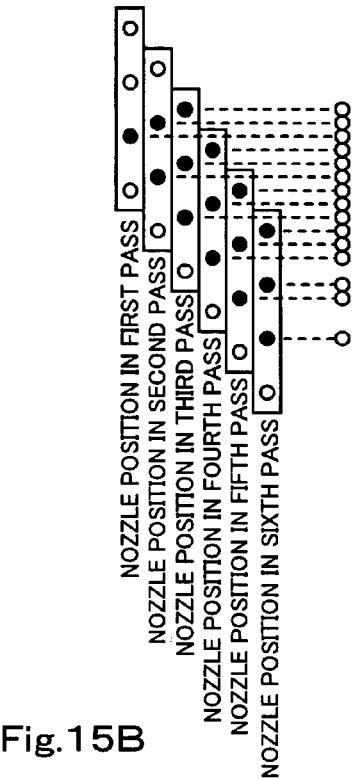
Fig.15A   Fig.15B
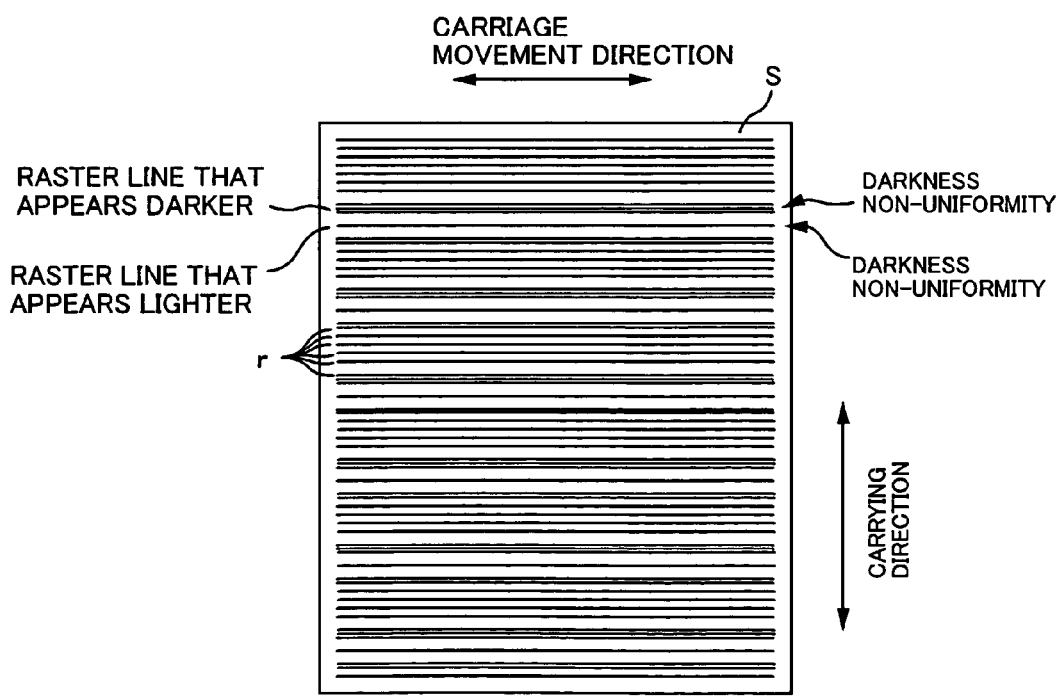
Fig.16

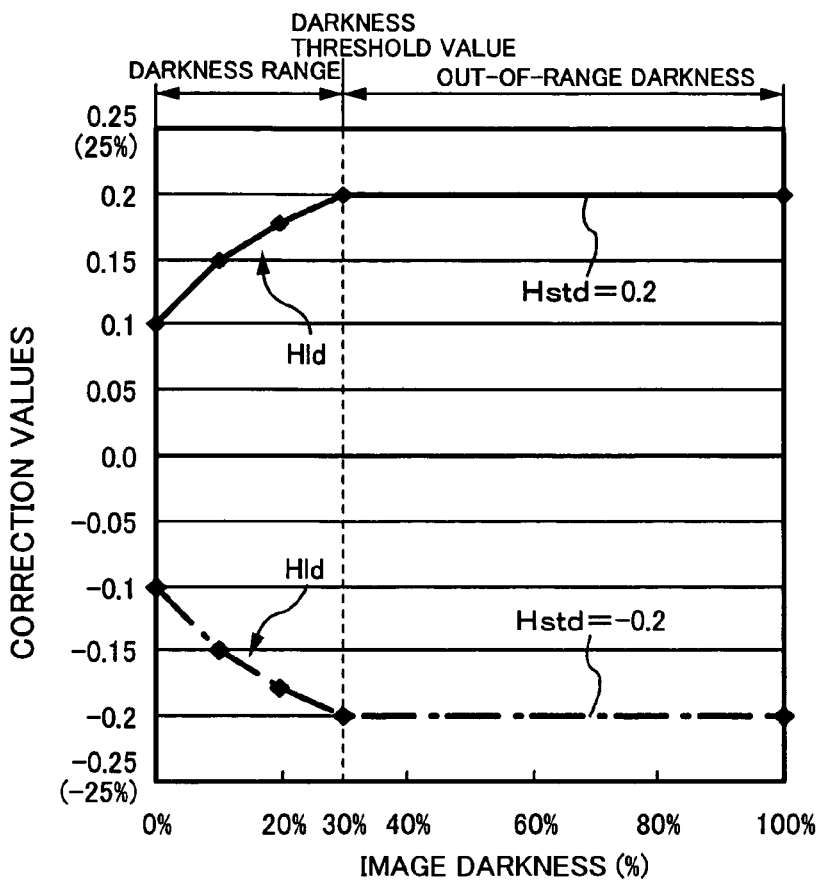
Fig.28A
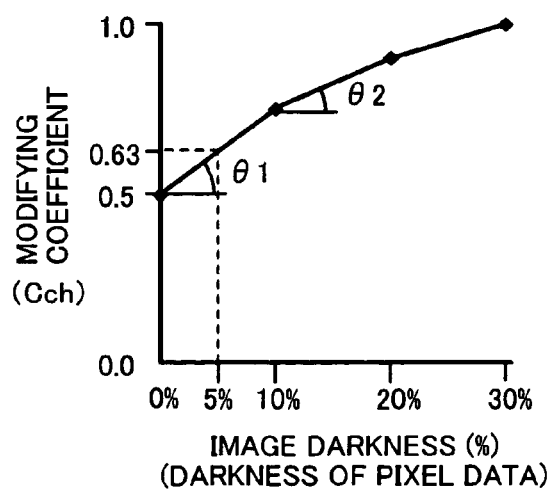
Fig.28B
Fig.28C

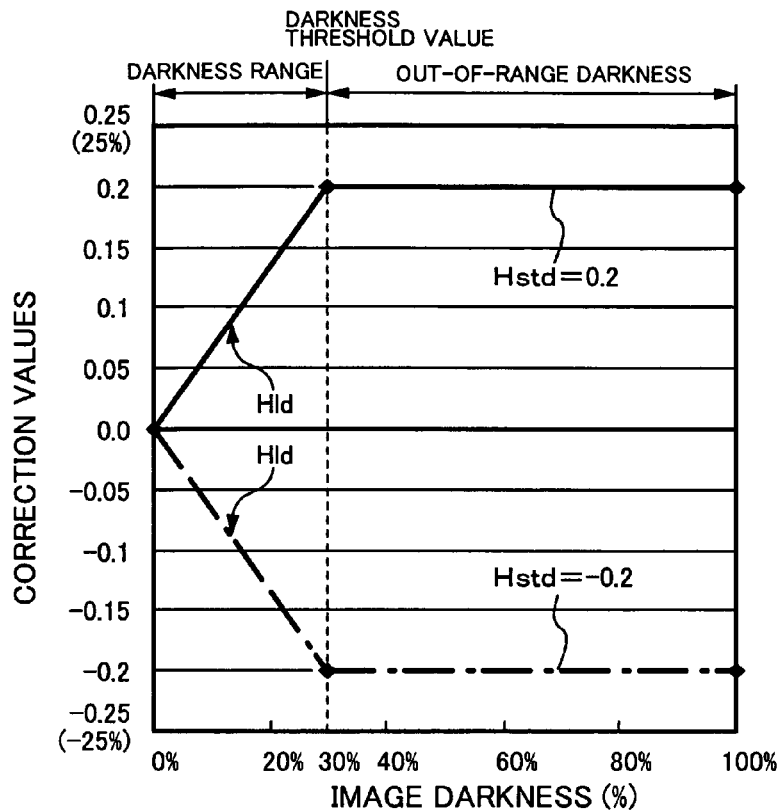
Fig.31A
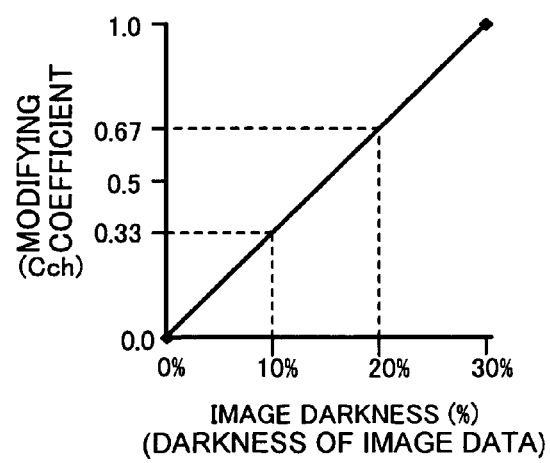
Fig.31B
Fig.31C

| | FIRST SUB-DARKNESS RANGE CR1 | SECOND SUB-DARKNESS RANGE CR2 | THIRD SUB-DARKNESS RANGE CR3 |
|---|---|---|---|
| STANDARD CORRECTION VALUE \ IMAGE DARKNESS | 0% OR HIGHER AND LOWER THAN 10% | 10% OR HIGHER AND LOWER THAN 20% | 20% OR HIGHER AND LOWER THAN 30% |
| ⋮ | ⋮ | ⋮ | ⋮ |
| 0.2 | 0.1 | 0.15 | 0.18 |
| ⋮ | ⋮ | ⋮ | ⋮ |
| 0.1 | 0.05 | 0.075 | 0.09 |
| ⋮ | ⋮ | ⋮ | ⋮ |
| 0.0 | 0.0 | 0.0 | 0.0 |
| ⋮ | ⋮ | ⋮ | ⋮ |
| -0.1 | -0.05 | -0.075 | -0.09 |
| ⋮ | ⋮ | ⋮ | ⋮ |
| -0.2 | -0.1 | -0.15 | -0.18 |
| ⋮ | ⋮ | ⋮ | ⋮ |
| CORRECTION RATIO | 0.5 | 0.75 | 0.9 |

PRINTING DARKNESS NON-UNIFORMITIES CORRECTION METHOD AND PRINTING DARKNESS NON-UNIFORMITIES CORRECTION APPARATUS

CROSS-REFERENCE TO RELATED APPLICATION

The present application claims priority upon Japanese International Patent Application No. 2004-038587 filed on Feb. 16, 2004, which is herein incorporated by reference.

BACKGROUND OF THE INVENTION

1. Field of the Invention

The present invention relates to printing methods and printing apparatuses.

2. Description of the Related Art

Inkjet printers (hereinafter referred to simply as "printers") that eject ink onto paper serving as a medium to form dots are known as printing apparatuses for printing images. These printers repeat alternately a dot formation operation of forming dots on a paper by ejecting ink droplets from a plurality of nozzles which move together with a carriage, and a carrying operation of carrying the paper in an intersecting direction that intersects with the movement direction (hereinafter, referred to as the "carrying direction") using a carry unit. By repeating these operations, raster lines are formed on the paper that consist of a plurality of dots arranged in the movement direction of the carriage. An image is printed by a plurality of the raster lines being formed in the carrying direction.

With this type of printer, the ink-droplet ejection characteristics, such as the amount of the ink droplet and the travel direction, vary from nozzle to nozzle. Such variations in the ejection characteristics are a cause of darkness non-uniformities in printed images, and thus are not preferable. Accordingly, with conventional methods, a correction value is set for each nozzle and the amount of ink is adjusted based on those correction values that are set (see JP H2-54676A for example).

In this conventional method, an output characteristics coefficient that indicates the characteristics of the ink ejection amount for each nozzle is stored in a head-characteristics register. Then, when an ink droplet is to be ejected, this output-characteristics coefficient is used to prevent darkness non-uniformities in the printed images.

However, the above-described conventional method corrects the ejection amount of ink droplets from each nozzle, but does not give consideration to darkness non-uniformities caused by the travel curve of ink droplets. Such darkness non-uniformities are related to landing positions of ink droplets ejected from the nozzles and are brought about by displacement in the carrying direction from the normal position. In other words, darkness non-uniformities occur when the spacing between adjacent raster lines becomes narrower or wider than the prescribed spacing. Accordingly, the darkness non-uniformities occur due to combinations of nozzles responsible for each raster line. For this reason, according to the conventional method described above, darkness non-uniformities due to the travel curve of ink droplets can occur when the sequence of the nozzles that form each raster line is different from the arrangement of the nozzles in the heads.

For example, there are cases where darkness non-uniformities can occur when using the interlaced mode as the print mode. The interlaced mode is a print mode in which unformed raster lines are set between raster lines that are formed in a single dot formation operation, and all of the raster lines are formed in a complementary manner through a plurality of dot formation operations. With this print mode, adjacent raster lines are not printed by the same nozzle. With this interlaced mode, there are cases in which the sequence of the nozzles responsible for adjacent raster lines in a printed image differs from the arrangement of the nozzles in the head, and darkness non-uniformities due to the travel curve can occur in these cases. The occurrence of such darkness non-uniformities reduces the quality of the printed images.

SUMMARY OF THE INVENTION

The present invention was arrived at in light of the foregoing issues, and it is an object thereof to achieve a printing method and a printing apparatus that are capable of improving the quality of printed images.

A main aspect for achieving the above object is a printing method comprising:

(a) a step of printing a correction pattern on a medium, wherein the correction pattern:

comprises a plurality of lines, each of said lines being made of a plurality of dots arranged in a movement direction of nozzles, the lines being arranged in an intersecting direction that intersects with the movement direction, and is printed by repeating alternately an operation of ejecting ink from a plurality of the nozzles and an operation of moving the medium in the intersecting direction;

(b) a step of determining corresponding to each of the lines a correction value for correcting a darkness in the intersecting direction of an image to be printed on the medium, wherein a degree of darkness correction achieved by each of the correction values is determined according to a darkness of the correction pattern and a darkness of an image to be printed; and (c) a step of printing the image on the medium based on the correction values determined corresponding to each of the lines.

Features and objects of the present invention other than the above will be made clear by reading the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings.

FIG. 15A is an explanatory diagram of the interlaced mode.

FIG. 15B is another explanatory diagram of the interlaced mode.

FIG. 16 is a diagram for schematically describing the darkness non-uniformities occurring in the carrying direction of the paper.

FIG. 28A is a diagram illustrating the standard correction values and the low-darkness correction values in cases where the standard correction values are 0.2 (20%) and −0.2 (−20%).

FIG. 28B is a diagram illustrating specific examples of reference coefficients that correspond to a reference darkness and a predetermined darkness.

FIG. 28C is a diagram describing the modifying coefficients to be determined.

FIG. 31A is a diagram illustrating standard correction values according to a second embodiment and the low-darkness correction values corresponding thereto.

FIG. 31B is a diagram illustrating a specific example of the reference darkness and the corresponding reference coefficient and the predetermined darkness and the corresponding reference coefficient according to the second embodiment.

FIG. 31C is a diagram illustrating the modifying coefficients determined in the second embodiment.

DESCRIPTION OF PREFERRED EMBODIMENTS

Figure 1:
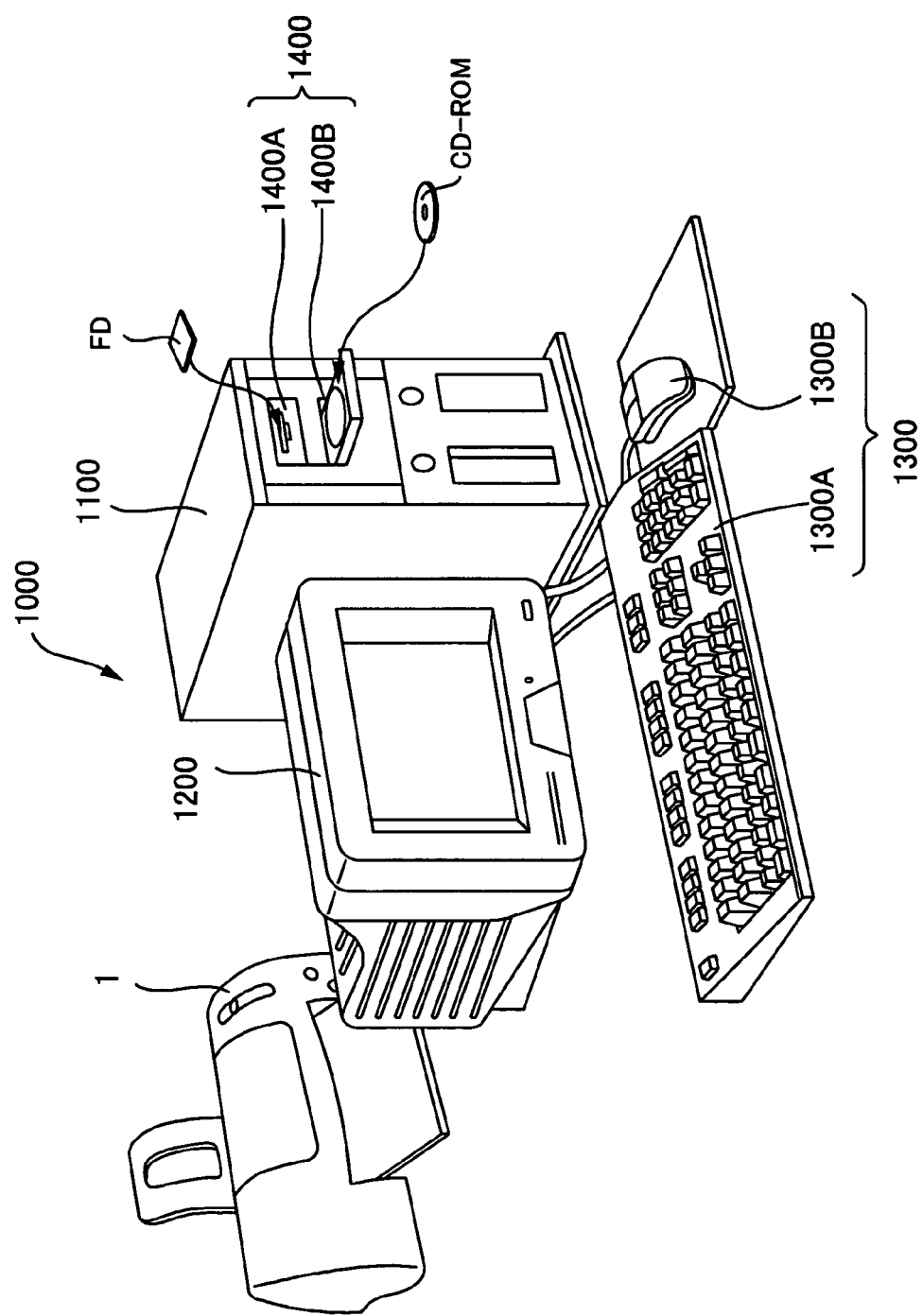
FIG. 1 is an explanatory diagram of the overall configuration of a printing system.

At least the following matters will be made clear by the description in the present specification and the description of the accompanying drawings.

A printing method can be realized comprising the following steps:

(a) a step of printing a correction pattern on a medium, wherein the correction pattern:
  comprises a plurality of lines, each of said lines being made of a plurality of dots arranged in a movement direction of nozzles, said lines being arranged in an intersecting direction that intersects with the movement direction, and
  is printed by alternately repeating an operation of ejecting ink from a plurality of the nozzles and an operation of moving the medium in the intersecting direction;

(b) a step of determining coersponding to each of the lines a correction value for correcting a darkness in the intersecting direction, of an image to be printed on the medium,
  wherein a degree of darkness correction achieved by each of the correction values is determined according to a darkness of the correction pattern and a darkness of an image to be printed; and (c) a step of printing the image on the medium based on the correction values determined corresponding to each of the lines.

According to this printing method, each of the lines can be formed at the desired darkness, even if a sequence of nozzles responsible for adjacent lines in a carrying direction differs from an arrangement of nozzles in a head, because correction values determined corresponding to each line are used to correct the darkness of those lines. This makes it possible to raise the quality of printed images. Because the degree of darkness correction of the correction values is determined in accordance with the darkness of the image to be printed, problems such as excessive addition or excessive decimation of dots in the image can be prevented. As a result, deterioration of graininess can be prevented and the quality of the printed image can be raised by performing the required darkness correction.

According to this printing method, it is preferable that correction values that are used when printing an image with a darkness lower than a predetermined darkness makes the degree of darkness correction lower as compared to correction values that are used when printing an image with a darkness equal to or higher than the predetermined darkness. According to this printing method, correction values that make a degree of darkness correction lower as compared to the correction values used when printing images with a darkness equal to or higher than the predetermined darkness are used when printing images with a darkness lower than the predetermined darkness. This makes it possible to suppress excessive darkness correction in images with a darkness lower than the predetermined darkness. As a result, deterioration of graininess can be prevented and the quality of the printed image can be raised by performing the required darkness correction.

According to this printing method, it is preferable that the correction values that are used when printing an image with a darkness equal to or higher than the predetermined darkness are determined based on measurement values obtained by measuring a darkness of the correction pattern, and the correction values that are used when printing an image with a darkness lower than the predetermined darkness are determined based on the correction values that are used when printing an image with a darkness is equal to or higher than the predetermined darkness. According to this printing method, the correction values that are used when printing images with a darkness equal to or higher than the predetermined darkness are determined based on the measurement values that are obtained by measuring the darkness of the correction pattern, and the correction values used when printing images with a darkness lower than the predetermined darkness are determined based on those correction values. This makes it possible to set a suitable correction value for each line with a high degree of precision. As a result, darkness correction and prevention of deterioration of graininess can be achieved at a higher level.

According to this printing method, it is preferable that the correction value that is used when printing an image with a darkness lower than the predetermined darkness is determined by modifying the correction value that is used when printing an image with a darkness equal to or higher than the predetermined darkness using a modifying coefficient; and the modifying coefficient indicates a ratio with respect to the correction value that is used when printing an image with a darkness equal to or higher than the predetermined darkness, and varies according to the darkness of an image to be printed. According to this printing method, the correction values that are used when printing images with a darkness lower than the predetermined darkness, are determined by modifying the correction values that are used when printing the images with a darkness equal to or higher than the predetermined darkness, using the modifying coefficient, so that correction values that are used when printing the images with a darkness lower than the predetermined darkness, do not have to be provided for each line.

In this printing method, it is preferable that the modifying coefficient is determined based on a correlation between a set of a reference darkness and a modifying reference coefficient and a set of the predetermined darkness and an out-of-range reference coefficient; wherein at least one reference darkness is set within a range of darkness lower than the predetermined darkness, the modifying reference coefficient is a coefficient that is set corresponding to the reference darkness, and the out-of-range reference coefficient is a coefficient that is set corresponding to the predetermined darkness. With this printing method, the modifying coefficients are set based on the correlation between the set of the reference darkness and the modifying reference coefficient and the set of the predetermined darkness and the out-of-range reference coefficient, making it possible to set the corresponding modifying coefficients with a high degree of precision, even for a darkness that is not the reference darkness.

According to this printing method, it is preferable that the modifying coefficient is determined by linear interpolation between the set of the reference darkness and the modifying reference coefficient and the set of the predetermined darkness and the out-of-range reference coefficient. According to this printing method, the modifying coefficient is set using linear interpolation, so a process of setting the modifying coefficients can be simplified, and high-frequency ejection of ink droplets can easily be achieved.

According to this printing method, it is preferable that a plurality of the sets of the reference darkness and the modifying reference coefficient are provided, said reference darkness being different for each of said sets; and the modifying reference coefficient makes the degree of darkness correction lower as the reference darkness becomes lower. According to this printing method, it is possible to set the modifying coefficients with a high degree of precision even in cases where the amount of change in the modifying coefficients relative to the amount of change in the darkness is not constant, within the range of darkness lower than the predetermined darkness.

According to this printing method, it is preferable that the reference darkness is a minimum darkness in the image, and is set within the darkness range. According to this printing method, the modifying coefficients are set based on the modifying reference coefficient that corresponds to the minimum darkness and the out-of-range reference coefficient that corresponds to the predetermined darkness, so only the information of the modifying reference coefficient and the out-of-range reference coefficient are needed.

According to this printing method, it is preferable that the correction value that is used when printing an image with a darkness lower than the predetermined darkness is determined for each sub-darkness range by multiplying the correction value that is used when printing an image with a darkness equal to or higher than the predetermined darkness by a predetermined ratio corresponding to that sub-darkness range; wherein a plurality of the sub-darkness ranges are set within a range of darkness lower than the predetermined darkness. According to this printing method, the correction values that are used when printing images with a darkness lower than the predetermined darkness can be determined by multiplying the correction values that are used when printing images with a darkness equal to or higher than the predetermined darkness by the corresponding predetermined ratio. Therefore, the processing for obtaining the correction values can be simplified and high-frequency ejection of ink can easily be achieved.

According to this printing method, it is preferable that the correction value that is used when printing an image with a darkness lower than the predetermined darkness is determined by multiplying the correction value that is used when printing an image with a darkness equal to or higher than the predetermined darkness by a constant predetermined ratio, regardless of the darkness of the image to be printed. According to this printing method, the correction values that are used when printing images with a darkness lower than the predetermined darkness can be determined by multiplying the correction values that are used when printing images with a darkness equal to or higher than the predetermined darkness by a predetermined ratio. Therefore, the processing for obtaining the correction values can be further simplified and high-frequency ejection of ink can easily be achieved.

According to this printing method, it is preferable that the step of printing the image on the medium based on the correction values determined corresponding to each of said lines, forms the lines at a darkness corresponding to gradation values, and varies the gradation values of the image based on the correction values. According to this printing method, the gradation values related to darknesses are changed by the correction values, so that the processings related to darkness correction can be simplified and high-frequency ejection of ink can be achieved.

According to this printing method, it is preferable that the step of printing the image on the medium based on the correction values determined corresponding to each of the lines, forms the lines in a complementary manner by: setting at least one line that is not formed between the lines that are formed by carrying out the operation of ejecting ink from the plurality of nozzles once, and carrying out the operation of ejecting ink from the plurality of the nozzles a plurality of times. According to this printing method, there may be cases where the relationship between the nozzles responsible for adjacent lines does not coincide with the arrangement (order) of the nozzles constituting the nozzle row, but even in such cases darkness non-uniformities in images can be suppressed effectively.

It is also possible to achieve a printing apparatus such as the following.

A printing apparatus comprising:

nozzles for ejecting ink;

a carry unit for carrying a medium in an intersecting direction that intersects with the movement direction; and a controller for controlling ejection of the ink by the nozzles and carrying of the medium by the carry unit;

wherein the controller:

(A) prints a correction pattern on the medium using the nozzles and the carry unit, wherein the correction pattern:

comprises a plurality of lines, each of the lines being made of a plurality of dots arranged in a movement direction of nozzles, the lines being arranged in an intersecting direction that intersects with the movement direction, and is printed by alternately repeating an operation of ejecting ink from a plurality of the nozzles and an operation of moving the medium in the intersecting direction;

(B) determines corresponding to each of the lines a correction value for correcting a darkness in the intersecting direction of an image to be printed on the medium, wherein:

a degree of darkness correction achieved by each of the correction values is determined according to a darkness of the correction pattern and a darkness of an image to be printed; and (C) prints, using the nozzles and the carry unit, the image on the medium based on the correction values determined corresponding to each of the lines.

According to this printing apparatus, deterioration of graininess can be prevented and the quality of the printed image can be raised by performing the required darkness correction.

First Embodiment

<Configuration of the Printing System>

An embodiment of a printing system is described next with reference to the drawings.

FIG. 1 is an explanatory drawing showing the external structure of a printing system 1000. The printing system 1000 is provided with a printer 1, a computer 1100, a display device 1200, input devices 1300, and record/play devices 1400. The printer 1 is a printing apparatus for printing images on a medium such as paper, cloth, or film. It should be noted that the following description is made using paper S (see FIG. 9), which is a representative medium, as an example of the medium. The computer 1100 is communicably connected to the printer 1, and outputs to the printer 1 print data corresponding to an image to make the printer 1 print the image. The display device 1200 has a display, and displays a user interface such as an application program 1104 or a printer driver 1110 (see FIG. 2). The input devices 1300 are constituted by, for example, a keyboard 1300A and/or a mouse 1300B, and are used to operate the application program 1104 and to adjust the settings for the printer driver 1110 in accordance with the user interface displayed on the display device 1200. For example, a flexible disk drive device 1400A and a CD-ROM drive device 1400B are employed as the record/play devices 1400.

The printer driver 1110 is installed on the computer 1100. The printer driver 1110 is a computer program for achieving functions of displaying the user interface on the display device 1200, and for achieving the function of converting image data that is output from the application program 1104 into print data. The printer driver 1110 is recorded on a storage medium (computer-readable storage medium) such as a flexible disk FD or a CD-ROM. The printer driver 1110 can also be downloaded onto the computer 1100 via the Internet. The printer driver 1110 is made of codes for achieving various functions.

It should be noted that "printing apparatus" in a narrow sense means the printer 1, but in a broader sense it means the system constituted by the printer 1 and the computer 1100.

=== Printer Driver ===

<Regarding the Printer Driver>

Figure 2:
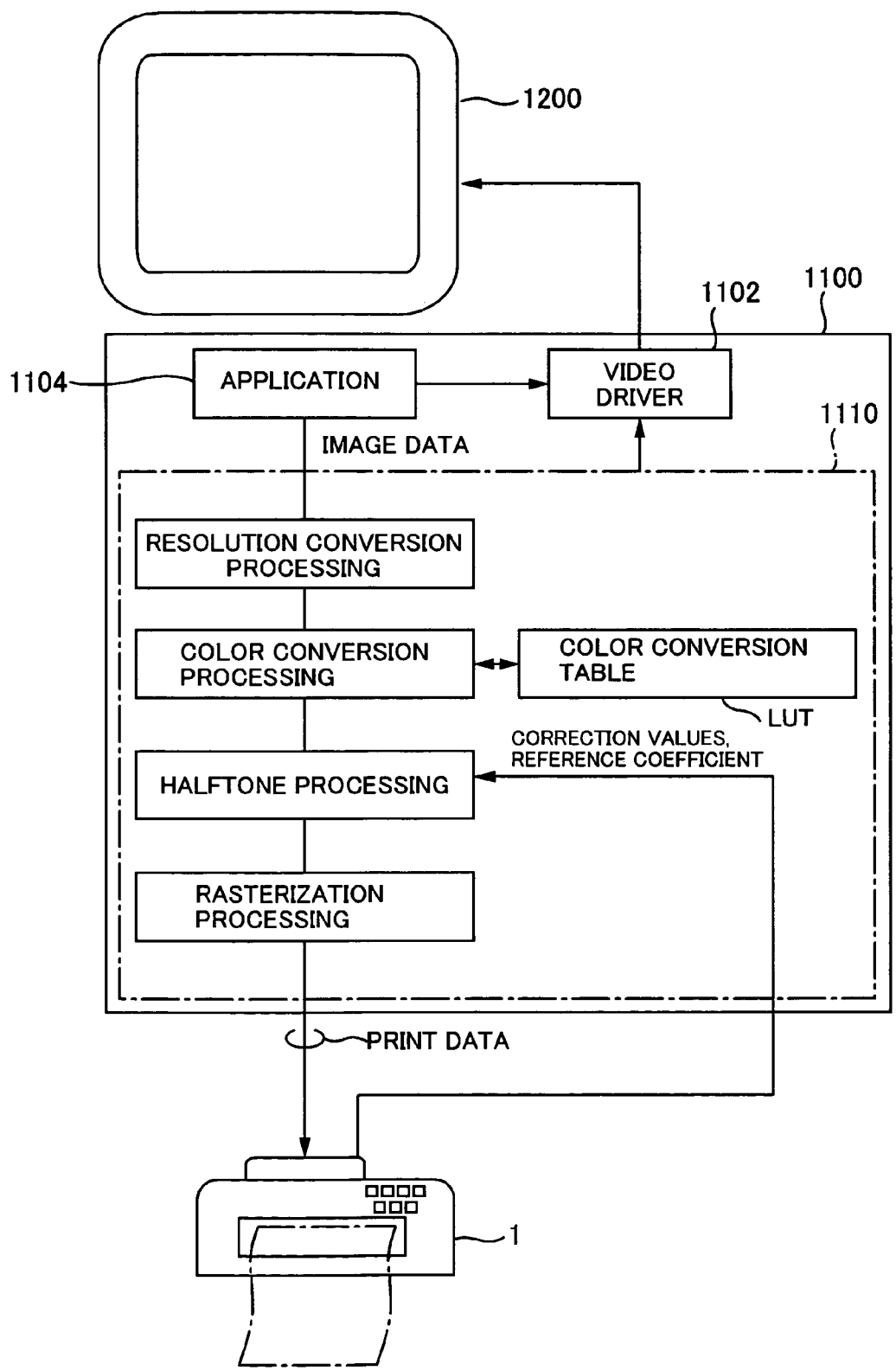
FIG. 2 is an explanatory diagram of processings carried out by a printer driver.

FIG. 2 is a schematic explanatory diagram of the basic processes carried out by the printer driver 1110. It should be noted that structural elements that have already been described are assigned identical reference numerals and thus further description thereof is omitted.

On the computer 1100, computer programs such as a video driver 1102, an application program 1104, and the printer driver 1110 operate under an operating system installed on the computer 1100. The video driver 1102 has a function of displaying, for example, the user interface on the display device 1200, by operating in accordance with display commands from the application program 1104 and the printer driver 1110. The application program 1104, for example, has such functions as enabling image editing and generates data relating to an image (image data). A user can give an instruction to print an image edited by the application program 1104 via the user interface of the application program 1104. Upon receiving the print instruction, the application program 1104 outputs the image data to the printer driver 1110.

The printer driver 1110 receives the image data from the application program 1104, converts the image data into print data, and outputs the print data to the printer 1. The image data has pixel data as data relating to the pixels of the image to be printed. The gradation values, etc., of the pixel data are converted in accordance with the processing stages described later. At the final print data stage, the pixel data is converted into data relating to the dots to be formed on the paper (data such as the color and the size of the dots). Here, print data is data in a format that can be interpreted by the printer 1, and includes the pixel data described above and various command data. Furthermore, "command data" refers to data for instructing the printer 1 to carry out a specific operation, and is data indicating the carry amount, for example.

It should be noted that the "pixels" are virtually-set square boxes on the paper in order to define the positions onto which ink lands to form dots. In other words, the pixels are regions on the medium on which dots can be formed, and can be thought of as "dot formation units."

In order to convert the image data that is output from the application program 1104 into print data, the printer driver 1110 carries out such processes as resolution conversion, color conversion processing, halftone processing, and rasterization processing. The various processes carried out by the printer driver 1110 are described below.

Resolution conversion is a process for converting image data (text data, image data, etc.) output from the application program 1104 to the resolution (the spacing between dots when printing; also referred to as "print resolution") for printing the image on the paper S. For example, when the print resolution has been specified as 720×720 dpi, then the image data obtained from the application program 1104 is converted into image data having a resolution of 720×720 dpi. Pixel data interpolation and decimation are examples of this conversion method. For example, if the resolution of the image data is lower than the print resolution that has been designated, then linear interpolation or the like is performed to create new pixel data between adjacent pixel data. Conversely, if the resolution of the image data is higher than the print resolution that has been designated, then the pixel data is decimated, for example, at a set ratio, in order to adjust the resolution of the image data to the print resolution. Also, in this resolution conversion processing, the size of the print region (which is the region onto which ink is actually ejected) is adjusted based on the image data.

It should be noted that the pixel data in the image data has gradation values of many levels (for example, 256 levels) expressed in RGB color space. The pixel data having such RGB gradation values is hereinafter referred to as "RGB pixel data," and the image data made of these RGB pixel data is referred to as "RGB image data."

Color conversion processing is a process for converting the RGB pixel data of the RGB image data described above into data having gradation values of many levels (for example, 256 levels) expressed in CMYK color space. C, M, Y and K are the ink colors of the printer 1. That is, C stands for cyan, M stands for magenta, Y stands for yellow, and K stands for black. Hereinafter, the pixel data having CMYK gradation values are referred to as "CMYK pixel data", and the image data made of these CMYK pixel data are referred to as "CMYK image data". This color conversion processing is carried out by the printer driver 1110 referencing a table (color conversion lookup table "LUT") that correlates RGB gradation values and CMYK gradation values.

Halftoning is a process for converting CMYK pixel data having many gradation values into CMYK pixel data having few gradation values, which can be expressed by the printer 1. For example, through halftoning, CMYK pixel data representing 256 gradation values is converted into 2-bit CMYK pixel data representing four gradation values. The 2-bit CMYK pixel data is data that indicates, for each color, "no dot formation" (binary value "00"), "small dot formation" (binary value "01"), "medium dot formation" (binary value "10"), and "large dot formation" (binary value "11"), for example.

Dithering, for example, is used for such halftoning. Halftoning creates 2-bit CMYK pixel data with which the printer 1 can form dots in a dispersed manner. Halftoning through dithering is described later. Also, the method used for halftoning is not limited to dithering, and it is also possible to use gamma correction or error diffusion. In the halftoning of this embodiment, a pixel data conversion is performed based on a correction value. This conversion process is described in detail later.

Rasterization is a process for changing CMYK image data that has been subjected to halftoning into the data order in which the data is to be transferred to the printer 1. Data that has been rasterized is output to the printer 1 as the print data described above.

<Halftoning Using Dithering>

Figure 3:
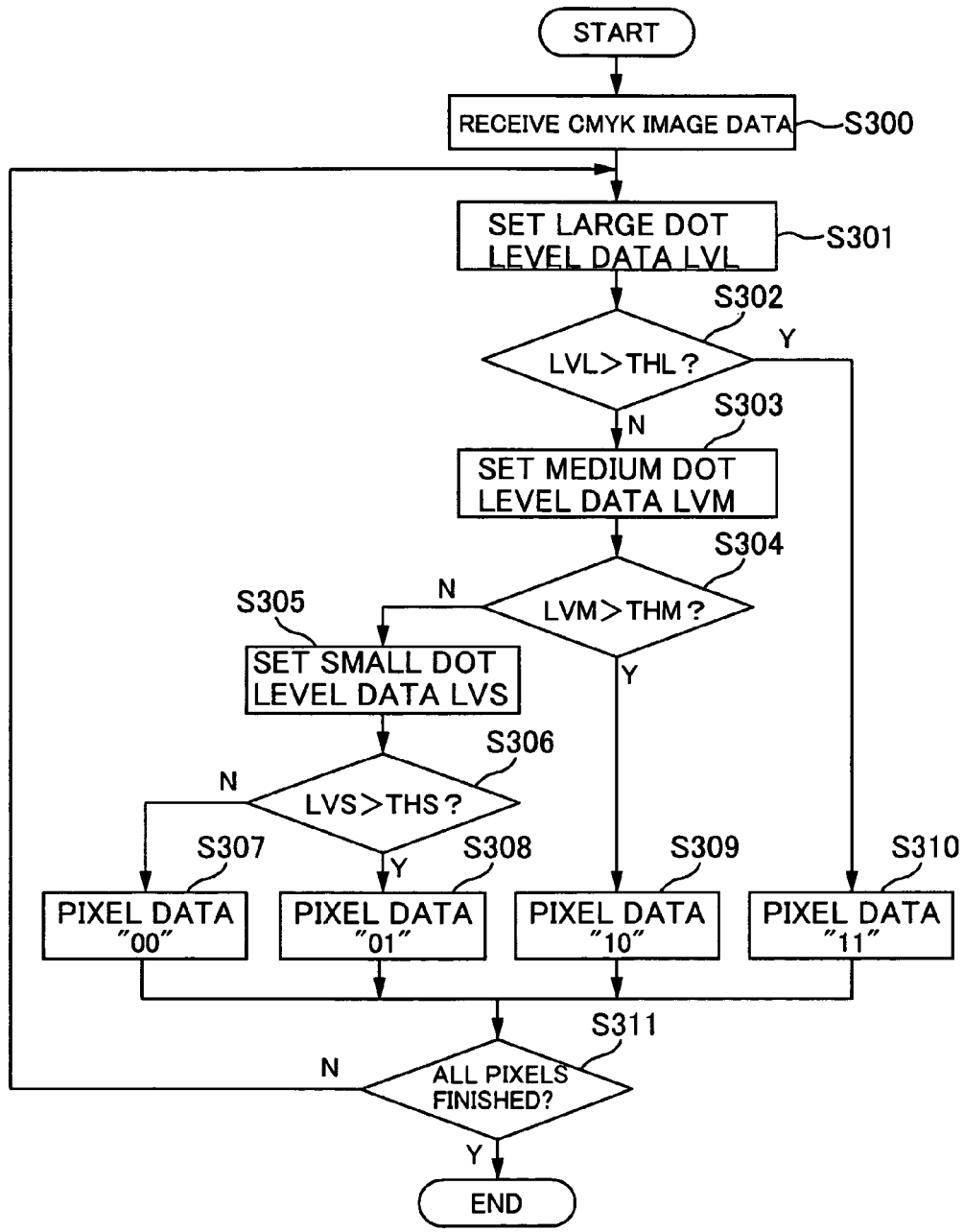
FIG. 3 is a flowchart of halftone processing through dithering.

Here, halftoning through dithering is described in greater detail. FIG. 3 is a flowchart of halftoning through dithering. The printer driver 1110 performs the following steps in accordance with this flowchart.

First, in Step S300, the printer driver 1110 obtains the CMYK image data. The CMYK image data is made of image data expressed by 256 gradation values for each ink color C, M, Y, and K for example. In other words, the CMYK image data includes C image data for cyan (C), M image data for magenta (M), Y image data for yellow (Y), and K image data for black (K). The C, M, Y, and K image data are respectively composed of C, M, Y, and K pixel data indicating the gradation values of each ink color. It should be noted that the following description can be applied to any of the C, M, Y, and K image data, and thus the K image data is described as representative image data.

The printer driver 1110 performs the processing of the Steps S301 to S311 for all of the K pixel data in the K image data while successively changing the K image data to be processed. Through this process, the K image data is converted into 2-bit data having gradation value of the four levels described above for each K pixel data.

Figure 4:
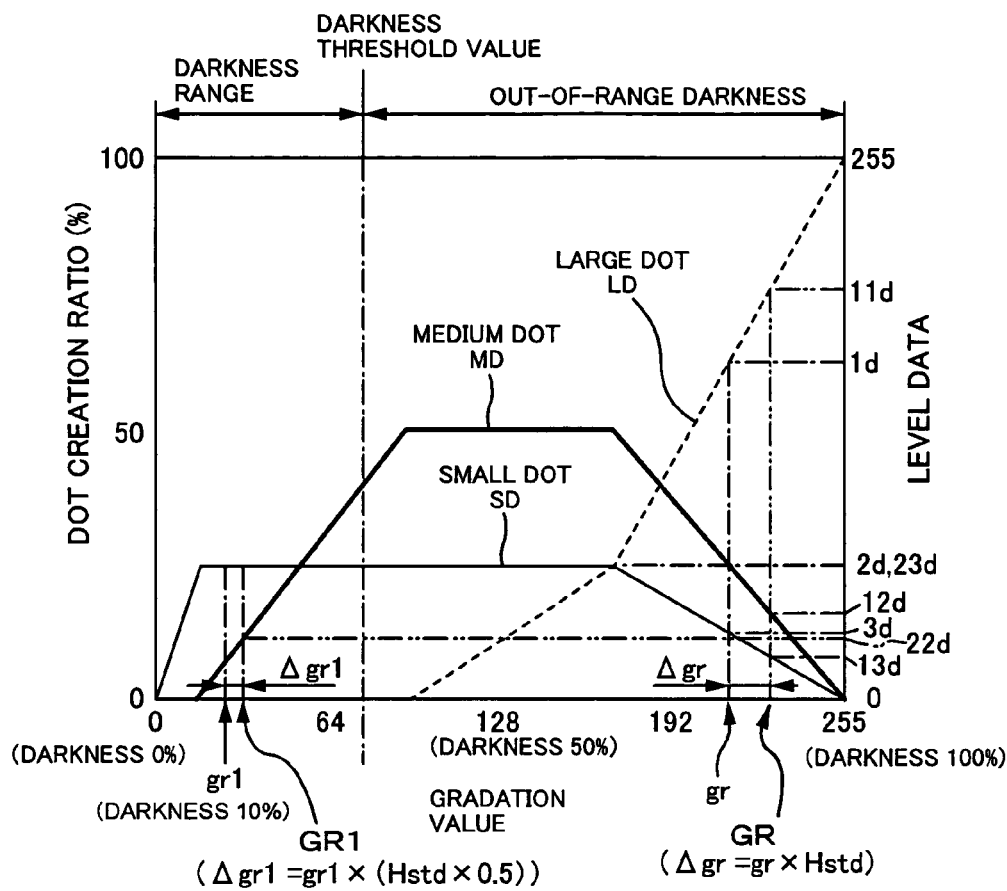
FIG. 4 is a diagram showing a dot creation ratio table.

This conversion process is described in detail here. First, in Step S301, the large dot level LVL is set in accordance with the gradation value of the K pixel data to be processed. A dot creation ratio table, for example, is used to make this setting. FIG. 4 is a diagram showing a dot creation ratio table that is used for setting the level data for each of the large, medium, and small dots. In this diagram, the horizontal axis indicates gradation values (0-255), the vertical axis on the left is the dot creation ratio (%), and the vertical axis on right is the level data.

Here, "level data" refers to data whose dot creation ratio has been converted to one of 256 gradation values from 0 to 255. Further, "dot creation ratio" means the ratio of pixels, among a plurality of pixels within a certain region, for which dots are formed when that region is to be reproduced according to a predetermined gradation value. For example, take a case in which the dot creation ratio for a particular gradation value is large dot 65%, medium dot 25%, and small dot 10%, and at this dot creation ratio, a region of 100 pixels composed of 10 pixels in the vertical direction by 10 pixels in the horizontal direction is printed. In this case, of the 100 pixels, 65 of the pixels will be formed by large dots, 25 of the pixels will be formed by medium dots, and 10 of the pixels will be formed by small dots. The profile SD shown by the thin solid line in FIG. 4 indicates the dot creation ratio of the small dots. Further, the profile MD shown by the thick solid line indicates the dot creation ratio of the medium dots, and the profile LD shown by the dotted line indicates the dot creation ratio of the large dots.

In the dot creation ratio table, the horizontal gradation values can be expressed as the darkness of the image to be printed (hereinafter, referred to as "image darkness"). In other words, a gradation value of 0 indicates the minimum darkness since no dots are formed in any of the pixels, and can be expressed as an image darkness of 0%. On the other hand, a gradation value of 255 indicates the maximum darkness since large dots are formed in all of the pixels, and can be expressed as an image darkness of 100%. A gradation value of 128 can be expressed as an image darkness of 50%, which would be halfway between the previous two.

In Step S301, the level data LVL corresponding to the gradation value is read from the profile LD for large dots. For example, as shown in FIG. 4, if the gradation value of the K pixel data to be processed is gr, then the level data LVL is determined to be 1d from the point of intersection with the profile LD. In actuality, the profile LD is, for example, stored in the form of a one-dimensional table in a memory such as a ROM (not shown in the drawings) provided in the computer 1100. The printer driver 1110 calculates the level data by referring to this table.

In Step S302, it is determined whether or not the level data LVL that has been set as described above is larger than the threshold value THL. Here, determination of whether the dots are on or off is performed using dithering. The threshold value THL is set to a different value for each pixel block of a so-called dither matrix. This embodiment uses a dither matrix in which a value from 0 to 254 is expressed for each square of a 16×16 square pixel block.

Figure 5:
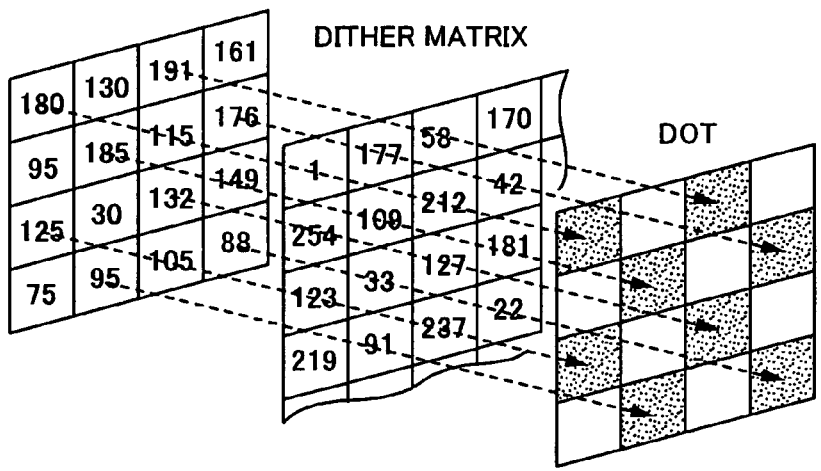
FIG. 5 is a diagram illustrating how dots are determined to be on or off through dithering.

FIG. 5 is a diagram illustrating how dots are determined to be on or off through dithering. For the convenience of illustration, FIG. 5 shows only a portion of the K pixel data. First, the level data LVL of the K pixel data is compared with the threshold value THL of the pixel block on the dither matrix that corresponds to that K pixel data. If the level data LVL is larger than the threshold value THL, the dot is set to on (i.e., a dot is formed), and if the level data LVL is smaller, the dot is set to off (i.e., no dot is formed). In this diagram, the pixel data of the shaded regions in the dot matrix is the K pixel data in which the dots are set to on. In other words, in Step S302, if the level data LVL is larger than the threshold value THL, then the procedure advances to Step S310, and otherwise the procedure advances to Step S303. Here, if the procedure advances to Step S310, then the printer driver 1110 stores the K pixel data being processed, assigning a value of "11" to indicate that the pixel data (2-bit data) expresses a large dot, and then the procedure advances to Step S311. In Step S311, it is determined whether or not the processing of all of the K pixel data is finished, and if it is finished, then the halftone processing is ended. On the other hand, if it is not finished, then the processing shifts to the K pixel data that has not yet been processed, and the procedure returns to Step S301.

When the procedure advances to Step S303, then the printer driver 1110 sets the level data LVM for medium dots. The level data LVM for medium dots is set by the dot creation ratio table described above, based on the gradation values. The setting method for the medium dot level data LVM is the same as that for setting the large dot level data LVL. That is, in the example shown in FIG. 4, the level data LVM corresponding to the gradation value gr is found to be 2d, which is indicated by the point of intersection with the profile MD that shows the medium dot creation ratio.

Next, in Step S304, the medium dot level data LVM is compared in size with the threshold value THM to determine which is larger. In other words, the medium dots are determined to be on or off. The method by which dots are determined to be either on or off is the same as that for large dots. At this point, when determining whether dots are on or off, the threshold values THM used for this determination are set to values that are different from the threshold values THL for large dots. That is, if the dots are determined to be on or off using the same dither matrix for the large dots and the medium dots, then the pixel blocks where the dots are likely to be on will be the same in both cases. That is, there is a high possibility that when a large dot is off, the medium dot will also be off. As a result, there is a risk that the creation ratio of medium dots will be lower than the desired creation ratio. In order to avoid this phenomenon, in the present embodiment there is a different dither matrix for large dots and medium dots. That is, by changing the pixels that are likely to be on between the large dots and the medium dots, those dots are formed appropriately.

Figures 6A, 6B, 7:
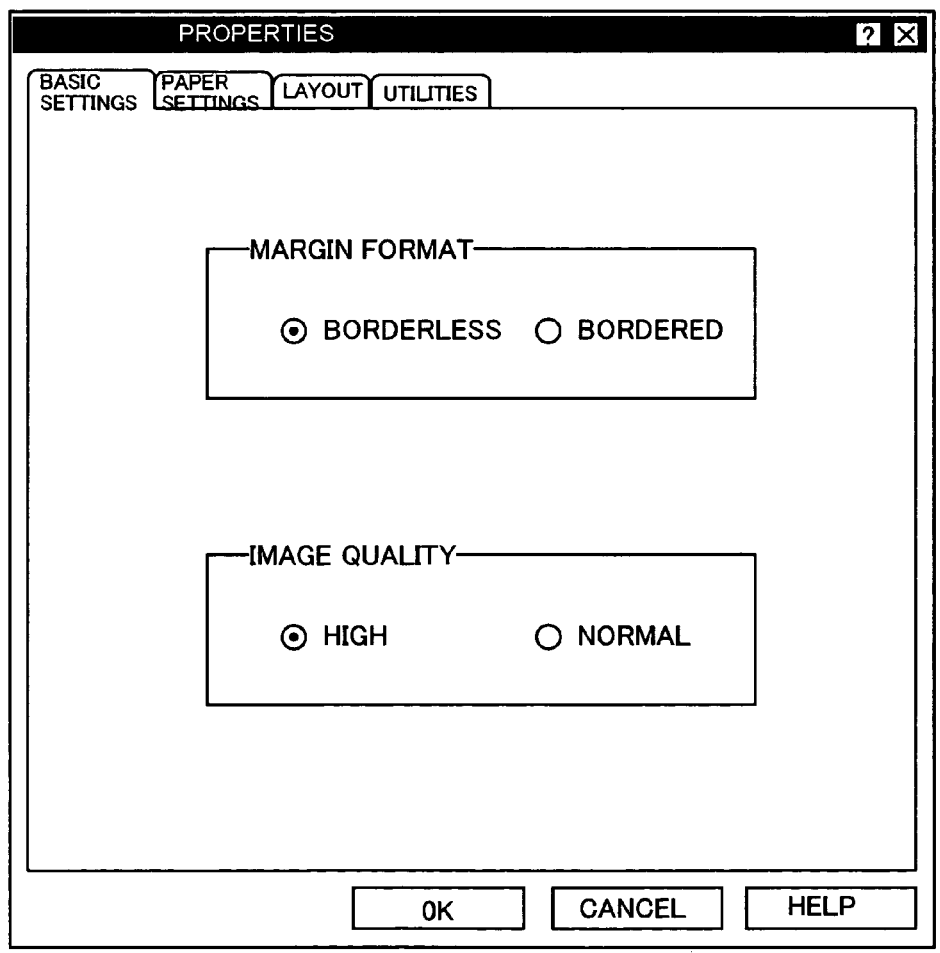
FIG. 6A shows a dither matrix used for determining large dots.
FIG. 6B shows a dither matrix used for determining medium dots.
FIG. 7 is an explanatory diagram of a user interface of a printer driver.

FIG. 6A and FIG. 6B show the relationship between the dither matrix that is used for determining large dots and the dither matrix that is used for determining medium dots. In this embodiment, a first dither matrix TM as shown in FIG. 6A is used for the large dots. Furthermore, a second dither matrix UM as shown in FIG. 6B is used for the medium dots. The second dither matrix UM is obtained by symmetrically mirroring the threshold values in the first dither matrix TM about the center in the carrying direction (the vertical direction in these diagrams). As explained previously, the present embodiment uses a 16×16 matrix, but for convenience of illustration, FIG. 6A and FIG. 6B show a 4×4 matrix. It should be noted that it is also possible to use completely different dither matrices for the large dots and medium dots.

Then, in Step S304, if the medium dot level data LVM is larger than the medium dot threshold value THM, then the printer driver 1110 determines that the medium dot should be on, and the procedure advances to Step S309. Otherwise the procedure advances to Step S305. Here, if the procedure advances to Step S309, then the printer driver 1110 assigns a value of "10" to the K pixel data being processed, storing it as pixel data indicating a medium dot, and then the procedure advances to Step S311. In Step S311, it is determined whether or not the processing of all of the K pixel data is finished, and if it is finished, then the halftone processing is ended. On the other hand, if it is not finished, then the processing shifts to the K pixel data that has not yet been processed, and the procedure returns to Step S301.

If the procedure advances to Step S305, then the small dot level data LVS is set in the same way the level data of the large dots and the medium dots are set. Then, in Step S306, the printer driver 1110 compares the level data LVS and the small dot threshold values THS, and if the value of the small dot level data LVS is larger than the value of the small dot threshold value THS, then the procedure advances to Step S308. Otherwise the procedure advances to Step S307. It should be noted that the dither matrix for the small dots is preferably different from those for the medium dots and the large dots, as described above, in order to prevent a reduction in the creation ratio of small dots.

Here, if the procedure advances to Step S308, then a value of "01" for pixel data that indicates a small dot is assigned to the K pixel data being processed and the data is stored, and then the procedure advances to Step S311. Then, in Step S311, it is determined whether or not the processing of all of the K pixel data is finished. If it is not finished, then the processing shifts to the K pixel data that has not yet been processed, and the procedure returns to Step S301. On the other hand, if it is finished, then halftone processing is ended.

If the procedure advances to Step S307, then the printer driver 1110 assigns a value of "00" to the K pixel data being processed and stores it as pixel data indicating the absence of a dot, and then the procedure advances to Step S311. In Step S311, it is determined whether or not all of the K pixel data has been processed. If processing is not finished, then the processing shifts to the K pixel data that has not yet been processed, and the procedure returns to Step S301. On the other hand, if it is finished, then halftone processing is ended.

<Regarding the Settings of the Printer Driver>

FIG. 7 is an explanatory diagram of the user interface of the printer driver 1110. The user interface of the printer driver 1110 is displayed on the display device 1200 via the video driver 1102. The user can use the input device 1300 to change the various settings of the printer driver 1110. The settings for margin format mode and image quality mode are prearranged as the basic settings, and settings such as paper size mode are prearranged as the paper settings. Based on the settings made using the user interface, the printer driver 1110 distinguishes the print resolution and the size of paper S.

=== Configuration of the Printer ===

<Regarding the Configuration of the Printer>

Figure 8:
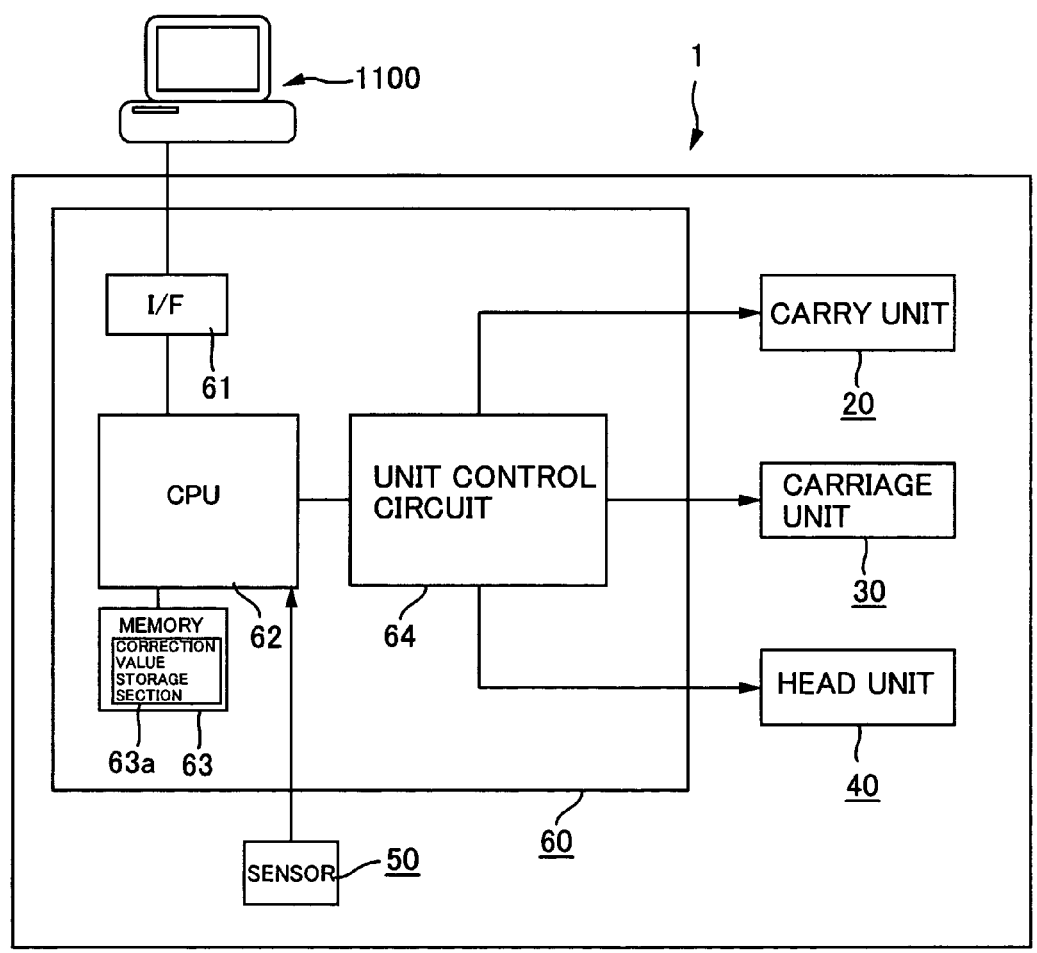
FIG. 8 is a block diagram of the overall configuration of a printer.
Figure 9:
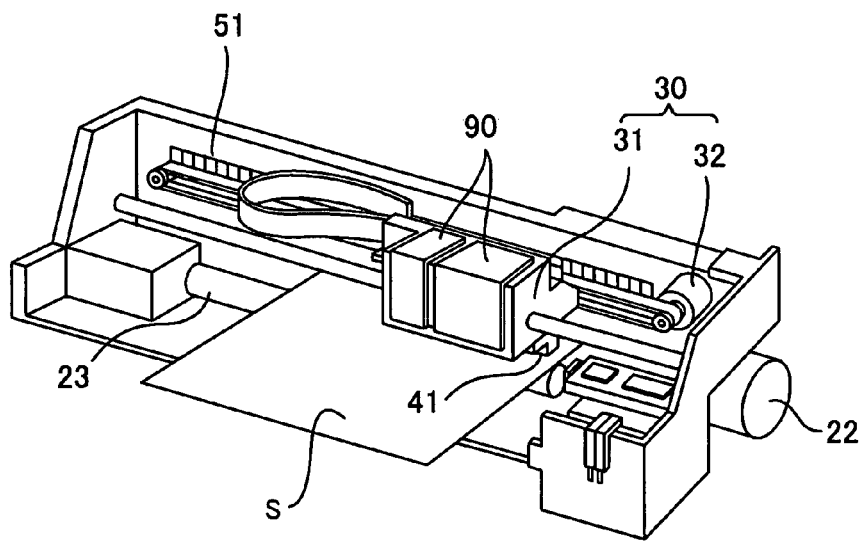
FIG. 9 is a schematic diagram of the overall configuration of the printer.
Figure 9:
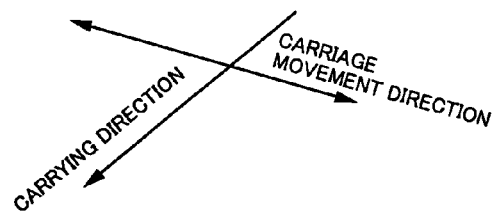
Figure 10:
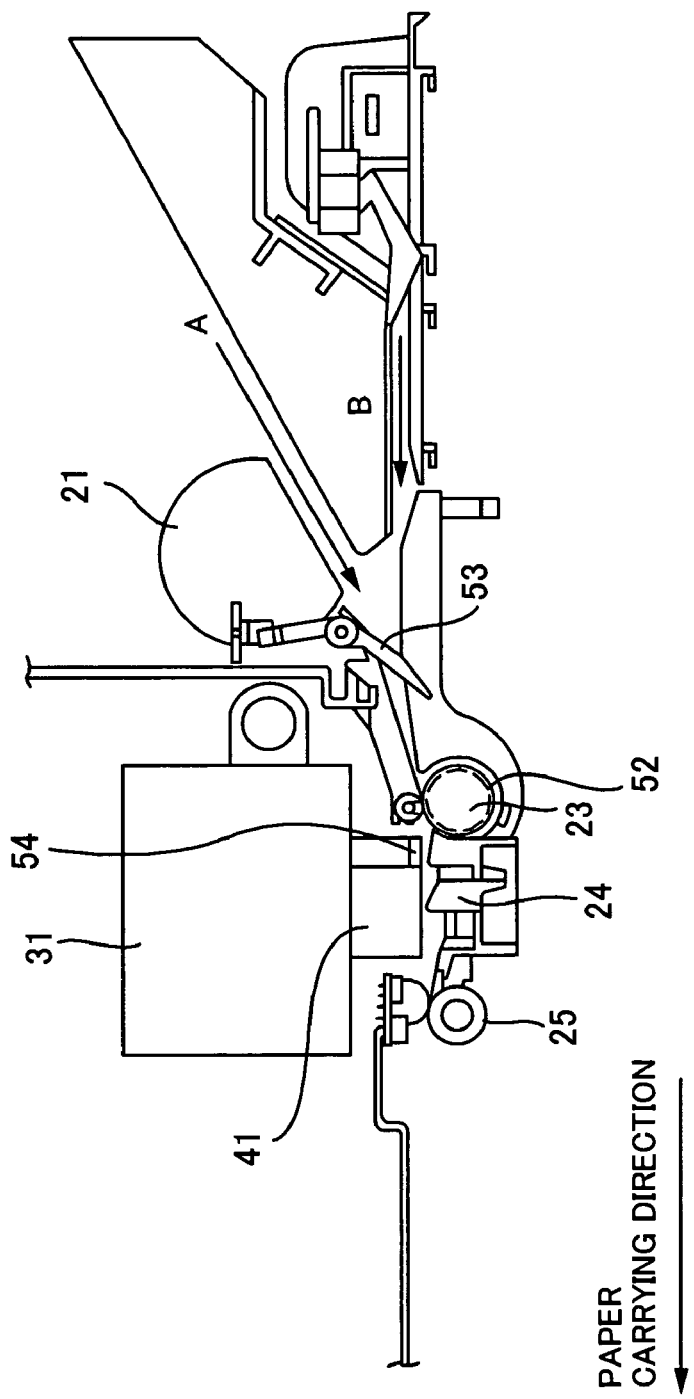
FIG. 10 is a lateral view of the overall configuration of the printer.

FIG. 8 is a block diagram of the overall configuration of the printer 1 of this embodiment. FIG. 9 is a schematic diagram of the overall configuration of the printer 1 of this embodiment. FIG. 10 is a lateral view of the overall configuration of the printer 1 of this embodiment. The basic structure of the printer 1 according to the present embodiment is described below using these diagrams.

The printer 1 has a carry unit 20, a carriage unit 30, a head unit 40, a sensor 50, and a controller 60. Having received print data from the computer 1100, which is an external device, the printer 1 controls the various units (the carry unit 20, the carriage unit 30, and the head unit 40) using the controller 60. The controller 60 controls the units in accordance with the print data that is received from the computer 1100 to print an image on the paper S. The sensor 50 monitors the conditions within the printer 1, and outputs the detection results to the controller 60. The controller 60 receives the detection results from the sensor 50, and controls the units based on these detection results.

The carry unit 20 is for delivering the paper S to a printable position, and for carrying the paper S by a predetermined carry amount in a predetermined direction (that is, the "carrying direction") during printing. Here, the carrying direction of the paper S is the direction that intersects with the carriage movement direction described below, and corresponds to an "intersecting direction." The carrying direction can also be referred to as the "sub-scanning direction." In the following description, positions in the carrying direction can also be referred to as "sub-scanning positions." The carry unit 20 functions as a carrying mechanism for carrying the paper S. The carry unit 20 has a paper supplying roller 21, a carry motor 22 (also referred to as "PF motor"), a carry roller 23, a platen 24, and a paper discharge roller 25. The paper supplying roller 21 is a roller for automatically supplying paper S, that has been inserted into a paper insert opening into the printer. The paper supplying roller 21 has the cross-sectional shape of the letter D, and the length of its circumferential portion is set longer than the carry distance up to the carry roller 23. Thus, by rotating the paper supplying roller 21 with its circumferential portion abutting against the paper surface, the paper S can be carried up to the carry roller 23. The carry motor 22 is a motor for carrying papers in the carrying direction, and is constituted by, for example, a DC motor. The carry roller 23 is a roller for carrying the paper S that has been supplied by the paper supply roller 21 up to a printable region, and is driven by the carry motor 22. The platen 24 supports the paper S during printing from the rear surface side of the paper S. The paper discharge roller 25 is a roller for carrying the paper S, for which printing has finished, in the carrying direction. The paper discharge roller 25 rotates in synchronization with the carry roller 23.

The carriage unit 30 is provided with a carriage 31 and a carriage motor 32 ("CR motor"). The carriage motor 32 is a motor for moving the carriage 31 back and forth in a predetermined direction (hereinafter, also referred to as "carriage movement direction"), and for example is constituted by a DC motor. The carriage 31 detachably holds ink cartridges 90 containing ink. A head 41 for ejecting ink from nozzles is attached to the carriage 31. Thus, by moving the carriage 31 back and forth, the head 41 and the nozzles also move back and forth in the carriage movement direction. Consequently, the carriage movement direction corresponds to the movement direction of the nozzles and the head 41. It should be noted that the carriage movement direction can also be referred to as the "main-scanning direction."

The head unit 40 is for ejecting ink onto the paper S. The head unit 40 has the head 41. The head unit 41 has a plurality of nozzles. Ink is ejected intermittently from each nozzle. Raster lines are formed on the paper S when ink is ejected intermittently from the nozzles while the head 41 is moving in the carriage movement direction. This raster line corresponds to a line that is constituted by a plurality of dots arranged along the carriage movement direction. It should be noted that the configuration of the head 41, the drive circuit for driving the head 41, and the method for driving the head 41 are described later.

Figure 11:
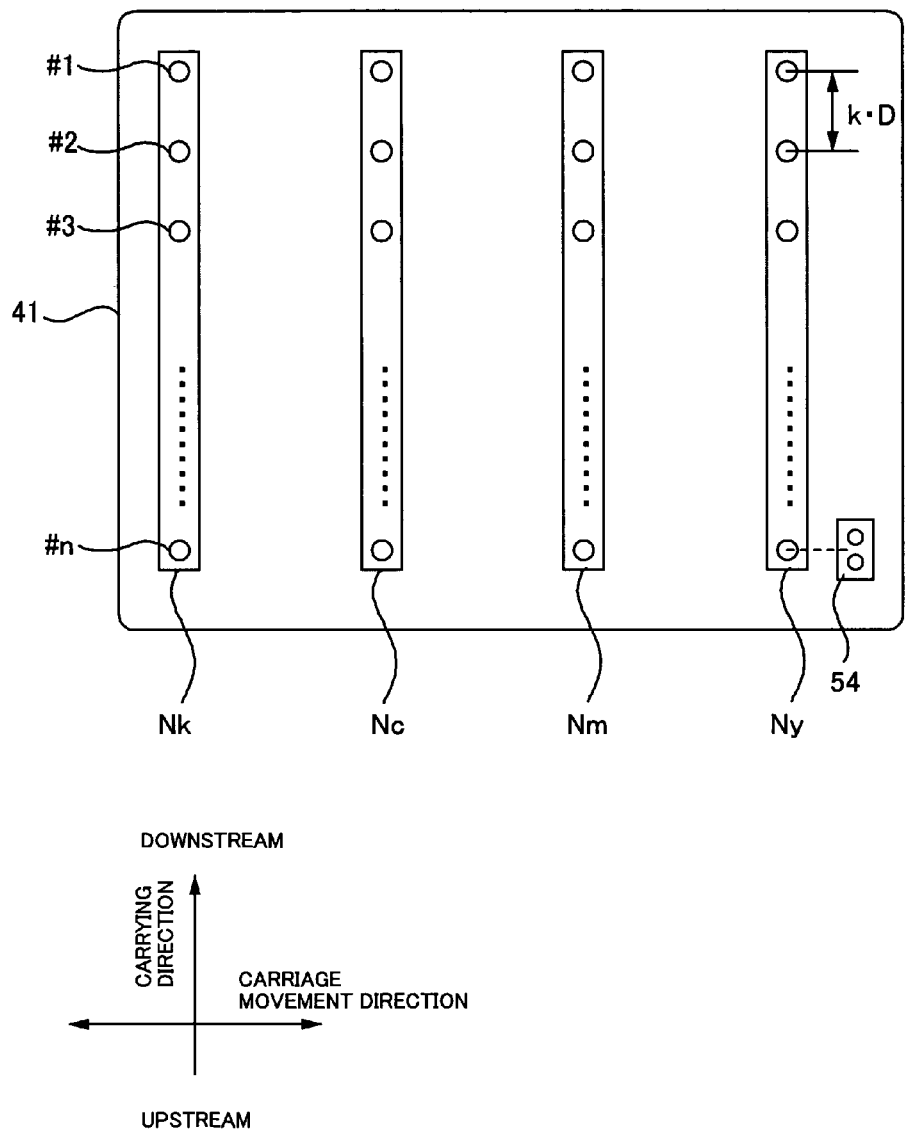
FIG. 11 is an explanatory diagram showing the arrangement of nozzles.

The sensor 50 includes a linear encoder 51, a rotary encoder 52, a paper detection sensor 53, and a paper width sensor 54, for example. The linear encoder 51 is for detecting the position of the carriage 31 (the head 41) in the carriage movement direction. The linear encoder 51 shown as an example here has a belt-shaped slit plate provided extending in the main-scanning direction, and a photointerrupter that is attached to the carriage 31 and detects the slits formed in the slit plate. The rotary encoder 52 is for detecting the amount of rotation of the carry roller 23, and has a disk-shaped slit plate that rotates in conjunction with rotation of the carry roller 23, and a photointerrupter for detecting the slits formed in the slit plate. The paper detection sensor 53 is for detecting the position of the leading edge of the paper S to be printed. The paper detection sensor 53 is provided at a position where it can detect the leading edge position of the paper S as the paper S is being carried toward the carry roller 23 by the paper supplying roller 21. It should be noted that the paper detection sensor 53 in the present embodiment is a mechanical sensor that detects the leading edge of the paper S through a mechanical mechanism. The paper width sensor 54 is attached to the carriage 31. In the present embodiment, as shown in FIG. 11, the paper width sensor is attached at substantially the same position as the most upstream side nozzle, with respect to its position in the carrying direction. The paper width sensor 54 is an optical sensor and receives light with a light-receiving section that receives the reflected light of light irradiated onto the paper S from a light-emitting section. The presence/absence of the paper S is detected based on the intensity of light received with the light-receiving section.

The controller 60 is a control unit for carrying out control of the printer 1. The controller 60 has an interface section 61, a CPU 62, a memory 63, and a unit control circuit 64. The interface section 61 exchanges data between the computer 1100, which is an external device, and the printer 1. The CPU 62 is a computer processing device for carrying out overall control of the printer. The memory 63 is for ensuring a working region and a region for storing the computer programs for the CPU 62, for instance, and uses storage means such as a RAM, an EEPROM, or a ROM to compose a storage means (memory section). The CPU 62 controls the various units via the unit control circuit 64 in accordance with computer programs stored in the memory 63. In this embodiment, a partial region of the memory 63 is used as a correction value storage section 63a for storing standard correction values and the like (described later).

<Regarding the Configuration of the Head>

FIG. 11 is an explanatory diagram showing the arrangement of the nozzles in the lower surface of the head 41 (i.e., the surface facing the paper S). A black ink nozzle row Nk, a cyan ink nozzle row Nc, a magenta ink nozzle row Nm, and a yellow ink nozzle row Ny are formed in the lower surface of the head 41. Each nozzle row is provided with n (for example, n=180) nozzles, which are ejection openings for ejecting the various color inks. The plurality of nozzles in each nozzle row are arranged in a row at a constant spacing (nozzle pitch: k·D) in the carrying direction. Here, D is the minimum dot pitch in the carrying direction, that is, the spacing at the highest resolution of the dots that can be formed on the paper S. Further, k is an integer of 1 or more. For example, if the nozzle pitch is 180 dpi (1/180 inch) and the dot pitch in the carrying direction is 720 dpi (1/720), then k=4. In the example illustrated here, the nozzles of the nozzle rows are assigned numbers that become smaller toward the nozzles on the downstream side (#1 to #n). In other words, the nozzle #1 is positioned more downstream (i.e., on the upper edge side of the paper S) in the carrying direction than the nozzle #n.

By providing such nozzles rows in the head 41, the region in which dots are formed by a single dot formation operation is widened, allowing the printing time to be reduced. These nozzle rows are provided for each color of ink. Therefore, by suitably ejecting ink from these nozzle rows it is possible to perform multi-color printing. Also, pressure chambers (not shown) are provided on the ink paths that are linked to the nozzles. In each pressure chamber, for example a piezo element (not shown) is provided that serves as a drive element for causing ink droplets to be ejected from the respective nozzle.

<Regarding the Driving of the Head>

Figure 12:
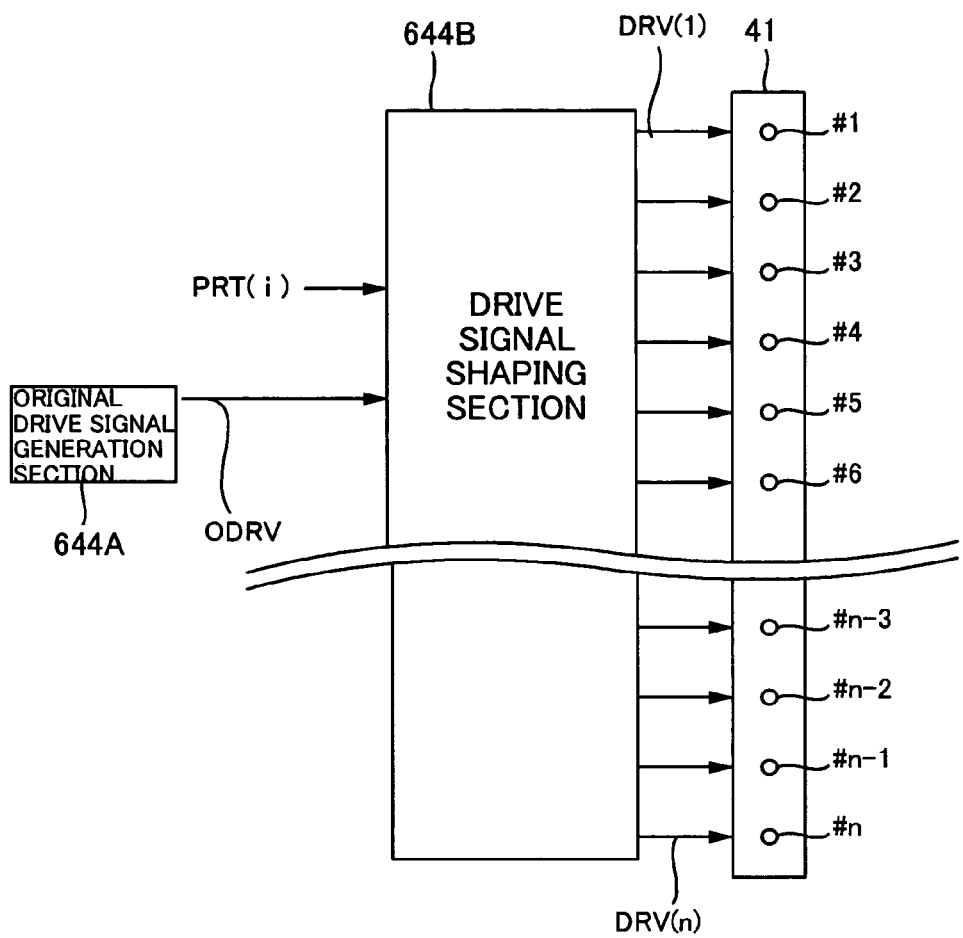
FIG. 12 is an explanatory diagram of a drive circuit of a head unit.

FIG. 12 is an explanatory diagram of the drive circuit of the head 41. This drive circuit is provided within the unit control circuit 64 mentioned above. As shown in the diagram, the drive circuit is provided with an original drive signal generating section 644A and a drive signal shaping section 644B. In this embodiment, a drive circuit is provided for each nozzle row, that is, for each nozzle row of the respective colors black (K), cyan (C), magenta (M), and yellow (Y), such that the piezo elements are driven individually for each nozzle row. Note that the number in parentheses at the end of the name of each of the signals in the diagram indicates the number of the nozzle to which that signal is supplied.

The piezo elements mentioned above deform each time drive pulses W1 and W2 (see FIG. 13) are supplied thereto, such that the pressure on the ink inside the pressure chamber is altered. In other words, when a voltage of a predetermined time duration is applied between electrodes provided at both ends of the piezo element, the piezo element becomes deformed for the time duration of voltage application and deforms an elastic membrane (lateral wall) partitioning a portion of the pressure chamber. The volume of the pressure chamber changes in accordance with this deformation of the elastic membrane, and due to this change in pressure chamber volume the pressure on the ink within the pressure chamber is altered. Due to this change in pressure on the ink, an ink droplet is ejected from the corresponding nozzle #1 to #180.

The original drive signal generation section 644A generates an original drive signal ODRV that is used in common by the nozzles #1 to #n. The original drive signal ODRV of the present embodiment is a signal that includes a plurality of the drive pulses W1 and W2 during the main-scanning period of a single pixel (the time during which a single nozzle crosses over a square box corresponding to a single pixel). The drive signal shaping section 644B receives an original drive signal ODRV from the original drive signal generating section 644A together with a print signal PRT(i). The drive signal shaping section 644B shapes the original drive signal ODRV in correspondence with the level of the print signal PRT(i) and outputs it toward the piezo elements of the nozzles #1 to #n as a drive signal DRV(i). The piezo elements of the nozzles #1 to #n are driven in accordance with the drive signal DRV(i) from the drive signal shaping section 644B.

<Regarding the Drive Signals of the Head>

Figure 13:
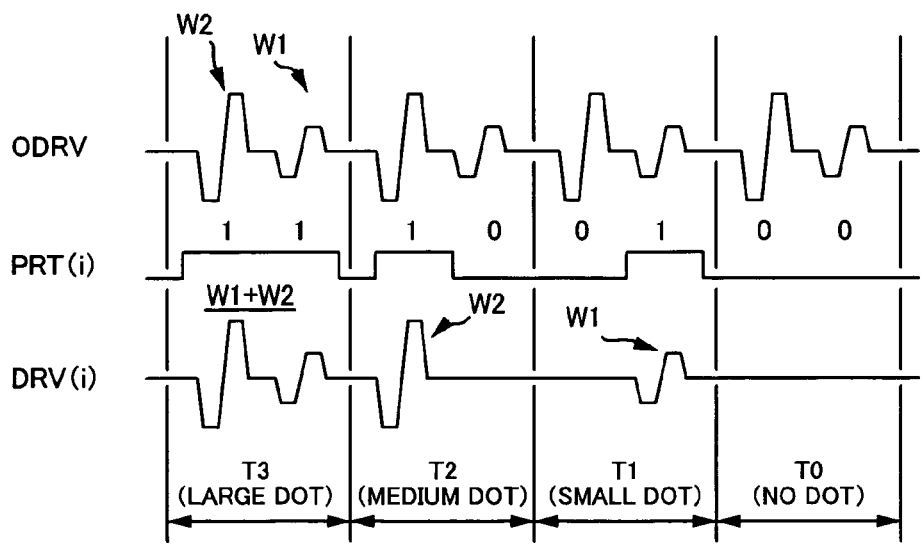
FIG. 13 is a timing chart describing the various signals.

FIG. 13 is a timing chart illustrating the various signals. That is, this drawing shows a timing chart for the various signals, namely the original drive signal ODRV, the print signal PRT(i), and the drive signal DRV(i).

As discussed above, the original drive signal ODRV is a signal used in common for the nozzles #1 to #n, and is output from the original drive signal generating section 644A to the drive signal shaping section 644B. In this embodiment, the original drive signal ODRV includes two drive pulses, namely a first pulse W1 and a second pulse W2, in the period during which a single nozzle crosses over the length of one pixel. The first pulse W1 is a drive pulse for causing a small size ink droplet (hereinafter, called small ink droplet) to be ejected from the nozzle. The second pulse W2 is a drive pulse for causing a medium size ink droplet (hereinafter, called medium ink droplet) to be ejected from the nozzle. In other words, by supplying the first pulse W1 to the piezo element, a small ink droplet is ejected from the nozzle. When this small ink droplet lands on the paper S, a small size dot (small dot) is formed. Likewise, by supplying the second pulse W2 to the piezo element, a medium ink droplet is ejected from the nozzle. When this medium ink droplet lands on the paper S, a medium size dot (medium dot) is formed.

The print signal PRT(i) is a signal corresponding to the pixel data allocated to a single pixel, i.e., a signal corresponding to the pixel data included in the print data. In this embodiment, the print signals PRT(i) are signals having two bits of information per pixel. The drive signal shaping section 644B shapes the original drive signal ODRV in correspondence with the signal level of the print signal PRT(i), and outputs a drive signal DRV(i).

The drive signal DRV(i) is a signal that is obtained by blocking the original drive signal ODRV in correspondence with the level of the print signal PRT(i). In other words, when the level of the print signal PRT is "1", the drive signal shaping section 644B allows the corresponding drive pulse in the original-drive signal ODRV to pass unchanged and sets it as the drive signal DRV(i). On the other hand, when the level of the print signal PRT(i) is "0," the drive signal shaping section 644B blocks the corresponding drive pulse in the original drive signal ODRV. Then, the drive signal DRV(i) from the drive signal shaping section 644B is individually supplied to the corresponding piezo element. Thus, the piezo elements are driven according to the drive signals DRV(i) that are supplied to them.

When the print signal PRT(i) corresponds to the two bits of data "01," then only the first pulse W1 is output in the first half of the single pixel interval. Accordingly, a small ink droplet is ejected from the nozzle, forming a small dot on the paper S. When the print signal PRT(i) corresponds to the two bits of data "10," then only the second pulse W2 is output in the second half of the single pixel interval. Accordingly, a medium ink droplet is ejected from the nozzle, forming a medium dot on the paper S. When the print signal PRT(i)

corresponds to the two bits of data "11," then both the first pulse W1 and the second pulse W2 are output during the single pixel interval. Accordingly, a small ink droplet and a medium ink droplet are successively ejected from the nozzle, forming a large size dot (large dot) on the paper S. It should be noted that when the print signal PRT(i) corresponds to the two bits of data "00," then neither the first pulse W1 nor the second pulse W2 are output during the single pixel interval. In this case, no ink droplet of any size is ejected from the nozzle, and no dot is formed on the paper S.

As described above, the drive signal DRV(i) in a single pixel period is shaped so that it may have four different waveforms corresponding to the four different values of the print signal PRT(i). Here, in the present embodiment, the content of the two-bit pixel data matches the content of the print signals PRT(i). In other words, for all pixel data and print signals PRT(i), non-formation of a dot is given by the two-bit data "00" and formation of a small dot is given by the two-bit data "01." Further, formation of a medium dot is given by the two-bit data "10" and formation of a large dot is given by the two-bit data "11." Consequently, the drive circuits of the head 41 use the pixel data included in the print data as the print signal PRT(i).

<Regarding the Printing Operation>

Figure 14:
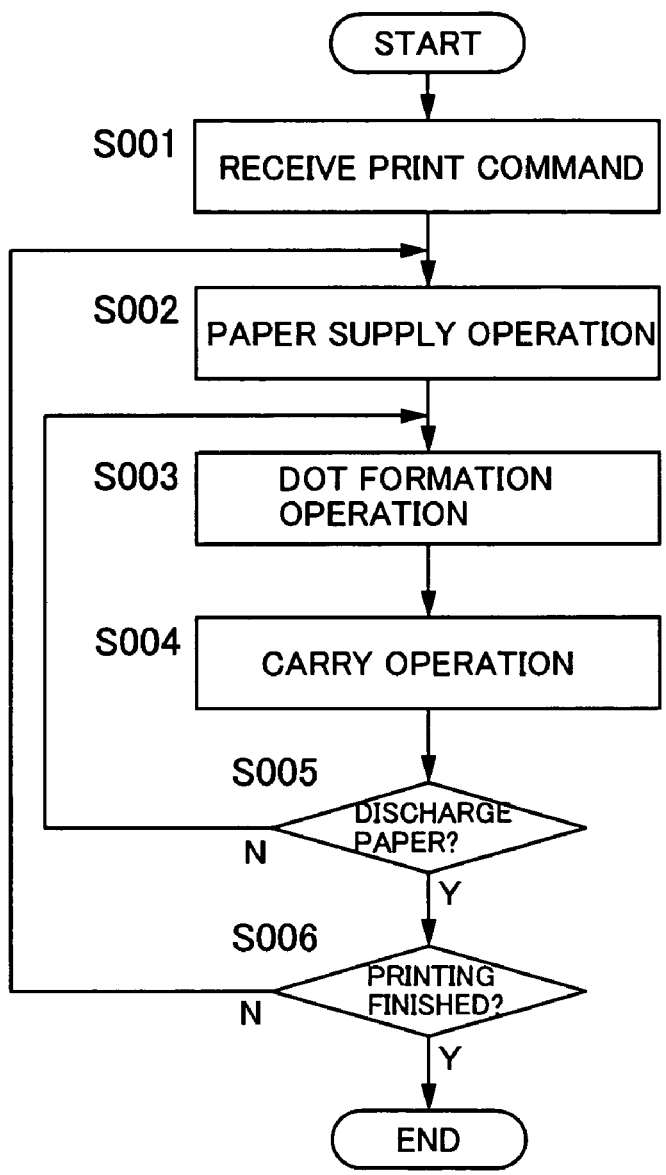
FIG. 14 is a flowchart of the operation during printing.

FIG. 14 is a flowchart of the operations during printing. The various operations that are described below are achieved by the controller 60 controlling the various units in accordance with a computer program stored in the memory 63. This computer program includes codes for executing the various processes.

Receive Print Command (S001): The controller 60 receives a print command via the interface section 61 from the computer 1100. This print command is included in the header of the print data transmitted from the computer 1100. The controller 60 then analyzes the content of the various commands included in the print data that has been received and uses the various units to perform the following paper supply operation, carrying operation, and dot formation operation, for example.

Paper Supplying Operation (S002): Next, the controller 60 performs the paper supplying operation. The paper supplying operation is an operation for moving the paper S, which is the object to be printed, and positioning it at a print start position (the so-called indexed position). In other words, the controller 60 rotates the paper supplying roller 21 to feed the paper S to be printed up to the carry roller 23. Next, the controller 60 rotates the carry roller 23 to position the paper S, that has been fed from the paper supplying roller 21, at the print start position. It should be noted that when the paper S has been positioned at the print start position, at least some of the nozzles of the head 41 are in opposition to the paper S.

Dot Formation Operation (S003): Next, the controller 60 performs the dot formation operation. The dot formation operation is an operation for intermittently ejecting ink from the head 41 moving in the carriage movement direction, so as to form dots on the paper S. The controller 60 drives the carriage motor 32 and moves the carriage 31 in the carriage movement direction. The controller 60 causes ink to be ejected from the head 41 (the nozzles) in accordance with the print data while the carriage 31 is moving. Then, as described above, when ink ejected from the head 41 lands on the paper, dots are formed on the paper. In other words, this dot formation operation forms raster lines composed of a plurality of dots on the paper. When this happens, the respective pixel data contained in the print data is converted based on the correction values during halftoning. In this dot formation process, images are printed using the pixel data which has been converted based on the correction values. As a result, darkness correction based on the correction values is achieved.

Carrying Operation (S004): Next, the controller 60 performs the carrying operation. The carrying operation is an operation for moving the paper S relative to the head 41 in the carrying direction. The controller 60 drives the carry motor 22 to rotate the carry roller 23 and thereby carry the paper S in the carrying direction. Through this carrying operation, the head 41 is able to form dots at positions that are different from the positions (sub-scanning positions) of the dots formed in the preceding dot formation operation.

Paper Discharge Operation (S005): Next, the controller 60 determines whether or not to discharge the paper S that is being printed. In this determination, the paper is not discharged if there is still data to be printed on the paper S that is being printed. The controller 60 repeats in alternation the dot formation operation and the carrying operation until there is no longer any data for printing, gradually printing an image made of dots (raster lines) on the paper. When there is no longer any data for printing on the paper S that is being printed, the controller 60 discharges that paper S. That is, the controller 60 discharges the printed paper S to the outside by rotating the paper discharge roller 25. It should be noted that whether or not to discharge the paper can also be determined based on a paper discharge command that is included in the print data.

Determination of Whether Printing is Finished (S006): Next, the controller 60 determines whether or not to continue printing. If the next sheet of paper S is to be printed, then printing is continued and the paper supplying operation for the next sheet of papers is started. If the next sheet of paper S is not to be printed, then the printing operation is ended.

=== Regarding the Print Modes ===

The printer 1 according to the present embodiment, with this configuration, can execute printing using the interlaced mode. By using the interlaced mode, individual differences between the nozzles such as ink ejection characteristics are lessened by spreading them out over the image to be printed, thereby making them stand out less. Here, FIGS. 15A and 15B are explanatory diagrams of the interlaced mode. A printing method using the interlaced mode is described below.

It should be noted that for the sake of simplifying the description, the nozzle rows shown in place of the head 41 are illustrated so as to appear moving with respect to the paper S, but these diagrams are for showing the relative positional relationship between the nozzle rows and the paper S, and in fact it is the paper S that moves in the carrying direction. In the diagrams, the nozzles represented by black circles are the nozzles that actually eject ink, and the nozzles represented by white circles are the nozzles that do not eject ink. Additionally, FIG. 15A shows the position of nozzles in the first pass to the fourth pass and the condition of dots formed by the nozzles. FIG. 15B shows the position of nozzles in the first pass to the sixth pass and the condition of dots formed by the nozzles. Here, "pass" refers to a single movement of the nozzle rows in the carriage movement direction.

With the interlaced mode illustrated in FIG. 15A and FIG. 15B, each time the paper S is carried in the carrying direction by a constant carry amount F, the nozzles form a raster line immediately above the raster line that was recorded in the pass immediately prior. In order to form the raster lines in this way using a constant carry amount, the number Nn (integer) of nozzles that actually eject ink is set to be coprime to k, and the carry amount F is set to be Nn·D.

In the example shown in these diagrams, the nozzle row has four nozzles lined up along the carrying direction, but in order to form raster lines by using a constant carry amount, the interlaced mode is carried out using three nozzles. Furthermore, because three nozzles are used, the paper S is carried by a carry amount 3·D. As a result, for example a nozzle row with a nozzle pitch of 180 dpi (4·D) is used to form dots on the paper S at a dot pitch of 720 dpi (=D).

The example in FIG. 15A shows the manner in which consecutive raster lines are formed, with the first raster line being formed by the nozzle #1 in the third pass, the second raster line being formed by the nozzle #2 in the second pass, the third raster line being formed by the nozzle #3 in the first pass, and the fourth raster line being formed by the nozzle #1 in the fourth pass. After this, raster lines are formed successively by the same operations, as shown in FIG. 15B.

In this example, the raster line formed by the nozzle #1 is formed after the raster line formed by the nozzle #3. The nozzle #3 and the nozzle #1 are not in an adjacent relationship in the head 41. For this reason, the order of the nozzles forming these raster lines is different from the arrangement of the nozzles in the head.

=== Regarding the Cause of Darkness Non-Uniformities in Images ===

Darkness non-uniformities that occur in a multicolor image that is printed using CMYK inks are generally due to darkness non-uniformities that occur in each of those ink colors. For this reason, the method that is normally adopted is to inhibit darkness non-uniformities in images printed in multiple colors by separately inhibiting darkness non-uniformities in each of the ink colors.

Accordingly, the following is a description of how darkness non-uniformities occur in images printed in a single color. Here, FIG. 16 is a diagram for schematically describing darkness non-uniformities that occur in an image that is printed in a single color, and that occur in the carrying direction of the paper S. This diagram shows the darkness non-uniformities in an image that has been printed in one of the ink colors from CMYK, for example black ink.

The darkness non-uniformities in the carrying direction that is illustrated in FIG. 16 appear as bands parallel to the carriage movement direction (for convenience, these are also referred to as "horizontal bands"). These horizontal bands of darkness non-uniformities occur, for example, due to variations in the amounts of ink ejection between nozzles, but they can also occur due to variations in the travel direction of the ink. In other words, when there are variations in the travel direction, the positions of the dots that are formed by the ink that lands on the paper S deviate in the carrying direction from their target formation positions. In this case, the formation position of raster line r that is constituted by these dots also deviates away from the target formation position with respect to the carrying direction. For this reason, the spacing between adjacent raster lines in the carrying direction becomes wider or narrower. When viewed macroscopically, these appear as darkness non-uniformities in horizontal bands. In other words, the adjacent raster lines r with a relatively wide spacing between them macroscopically appear light, whereas raster lines r with a relatively narrow spacing between them macroscopically appear dark. Note that variations in the travel direction of ink is caused, for example, by discrepancies in the processing precision of the nozzles.

It should be noted that these factors causing darkness non-uniformities also apply to the other ink colors as well. As long as even one color of the colors CMYK has this tendency, darkness non-uniformities will appear in an image printed in multiple colors.

<Regarding the Method of a Reference Example for Inhibiting Darkness Non-Uniformities>

The method of a reference example for inhibiting darkness non-uniformities is described. According to the method in the reference example, first a correction pattern of a predetermined darkness is printed on the paper, and the darkness of the raster lines r that constitute the correction pattern is measured. Next, based on the darkness of the raster lines r, a correction value is obtained for those raster lines. During the actual printing of the image, the obtained correction values are used to adjust the darkness of the raster lines r. For example, if the darkness of a particular raster line r in the correction pattern is lighter than prescribed, the amount of ink ejected from the nozzle responsible for that raster line r is increased at the time of the actual printing. On the other hand, when the darkness of a particular raster line r in the correction pattern is darker than prescribed, the amount of ink ejected from the nozzle responsible for that raster line r is decreased at the time of the actual printing.

Figure 17A:
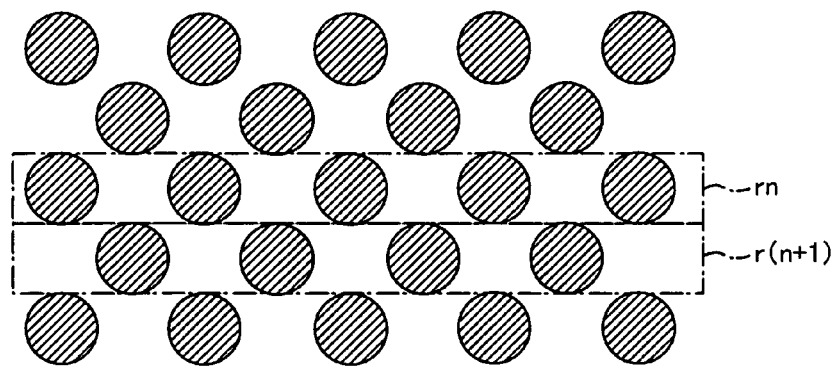
FIG. 17A is a diagram illustrating raster lines formed under ideal conditions.
Figure 17B:
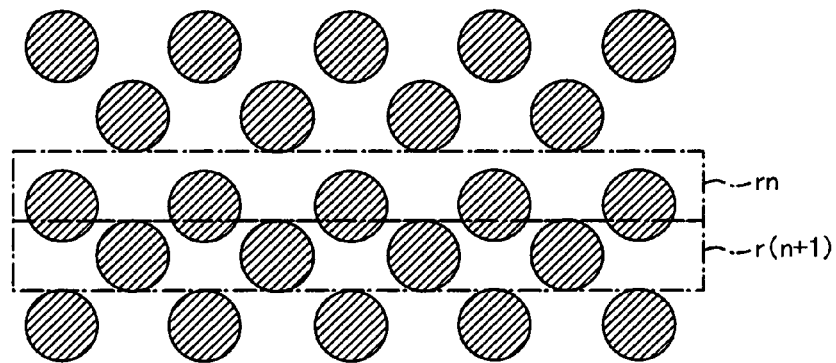
FIG. 17B is a diagram illustrating how a raster line formed by a particular nozzle deviates in the carrying direction.
Figure 17C:
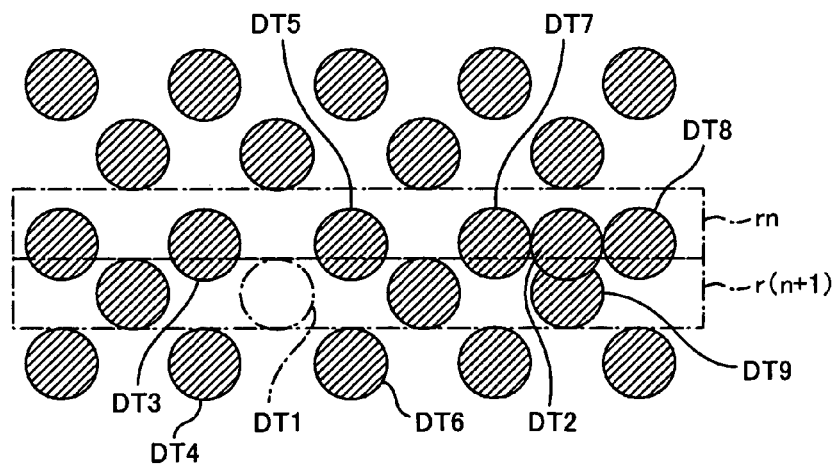
FIG. 17C is a diagram illustrating a corrected state achieved by a method of a reference example.

While the method in the reference example is effective in terms of inhibiting darkness non-uniformities in images caused by variations in travel paths of the ink, a new problem arises in that the graininess of the image deteriorates. This new problem is described below. Here, FIG. 17A, FIG. 17B, and FIG. 17C are schematic diagrams illustrating the new problem. That is, FIG. 17A is a diagram illustrating raster lines formed in an ideal condition. FIG. 17B is a diagram illustrating the condition of a raster line formed by a particular nozzle that is misaligned in the carrying direction. FIG. 17C is a diagram illustrating a condition in which the raster line has been corrected using the method in the reference example. Note that the images in these drawings are formed using an intermediate gradation. For this reason, adjacent dots in the main-scanning direction are formed with a spacing equal to one dot between them.

In the image in FIG. 17B, the dots that constitute a raster line rn are formed at positions closer to the adjacent raster line r (n+1) than the correct positions (i.e., the positions of FIG. 17A). Macroscopically, this makes the raster line rn appear lighter than the correct darkness, and the raster line r (n+1) appear darker than the correct darkness. Then, with the method of the reference example, darkness corrections are performed for each raster line by determining the darkness/lightness, and therefore the raster line which appears darker will have its darkness made lighter by, for example, decimating dots, and the raster line that appears lighter will have its darkness made darker by, for example, adding dots. For this reason, in the example in FIG. 17C, a dot DT1 stays unformed in the raster line r (n+1) and a dot DT2 is added to the raster line rn.

The condition of the density of the dots and also the graininess is changed by these corrections. For example, in the example in FIG. 17C, by not forming the dot DT1, a region in which no dot is formed is made between the dots DT3 and DT6, which surround the dot DT1. For this reason, this region will appear as though the area of the background color has increased and the dots are formed coarsely. On the other hand, by forming the new dot DT2, the dot DT2 and dots DT7 to DT9 are formed in a clustered state. As a result, the dot DT2 and dots DT7 to DT9 appear as a single lump of a large dot.

Figure 18A:
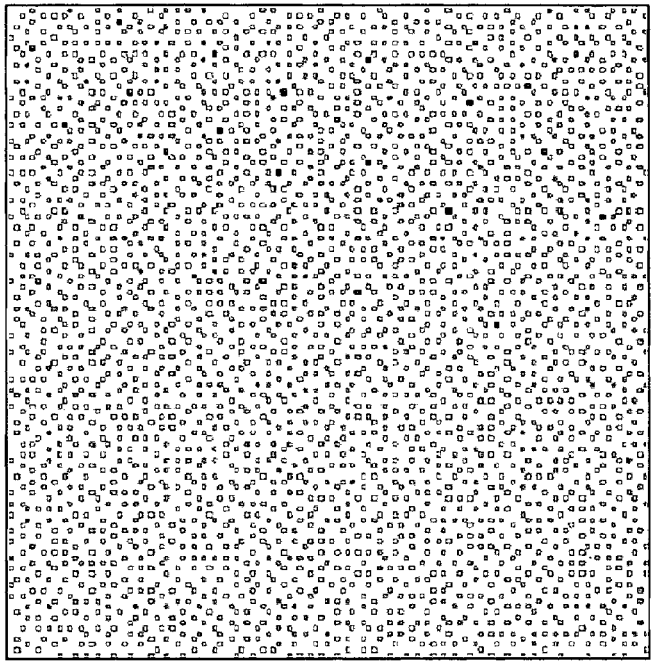
FIG. 18A is an image before correction in the reference example.
Figure 18B:
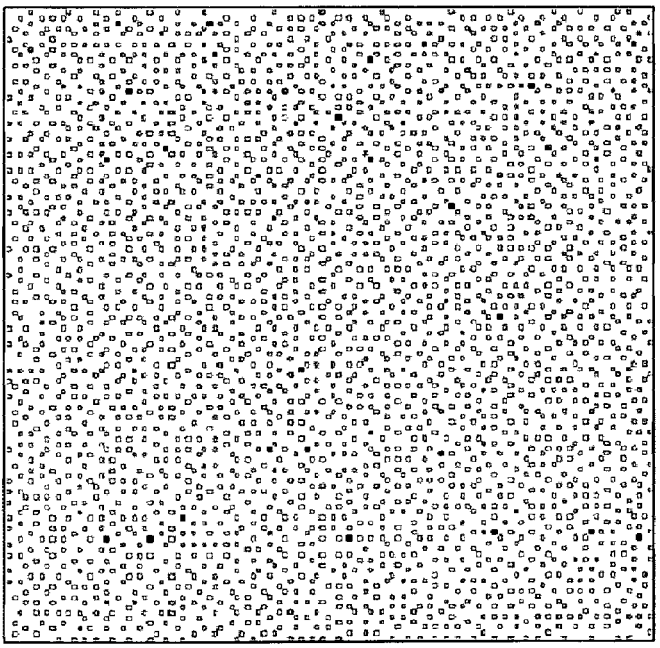
FIG. 18B is an image after correction in the reference example.

As a result, for example, the image shown in FIG. 18A (hereinafter, referred to as "pre-correction image") is corrected, and becomes the image shown in FIG. 18B (hereinafter, referred to as "corrected image"). When comparing these images, regarding the dots, the corrected image of FIG. 18B becomes more decimated than the pre-correction image of FIG. 18A. Furthermore, the lumps of dots shown as dark points are larger in number in the corrected image than the pre-correction image.

Then, with such phenomenon, the printed image is caused to have compromised graininess with regard to the range of darkness in which dots are visible. This is because in this range of darkness, by darkness correction, it is easy to visually perceive areas where the dots are grouped together and areas where the dots are decimated. Note that this problem of graininess does not occur when the image darkness is above a certain darkness. This is thought to be because in images with a certain darkness the dots are formed in a clustered state, so that a slight degree of addition or decimation of dots does not change the graininess.

=== Printing Method of the Present Embodiment ===

<Main points of the Printing Method of the Present Embodiment>

In light of the foregoing issues, in the present embodiment, a correction value for correcting the darkness in the carrying direction of the image is set for each raster line. The degree of darkness correction based on the correction value is set according to the darkness of the image to be printed. For example, the correction value that is used when printing (forming) an image with a darkness lower than a predetermined darkness causes the degree of darkness correction to be lower than the correction value used when printing (forming) an image with a darkness equal to or higher than the predetermined darkness.

Here, the "predetermined darkness" is a darkness threshold value set from the point of view of the graininess of the image caused by the darkness correction, and can be expressed as a determination reference value. In other words, the predetermined darkness is higher than the minimum darkness (0% darkness) and lower than the maximum darkness (100% darkness) in an image. Furthermore, the predetermined darkness is set to a darkness at which changes in the graininess of an image brought about by the darkness correction are visible.

For instance, when printing an image on a standard paper S using black ink which uses a dye as the color material, the predetermined darkness is set to 30%. For this reason, for example, in cases where the standard correction value is 20% and the darkness of the image to be printed is lower than 30%, the correction value (for convenience, hereinafter referred to as the low-darkness correction value) that is used when printing an image with a darkness lower than the predetermined darkness is set with a range between 0% and 20%.

To set the correction value, first a correction pattern (test pattern) is printed on the paper S, and the darkness of the respective raster lines which constitute the correction pattern that is printed is measured. When the darkness of the respective raster lines have been measured, based on the measured darkness of a corresponding raster line, a standard correction value corresponding to the raster line is set. The standard correction values are used when printing an image with a darkness equal to or higher than the predetermined darkness. On the other hand, the low-darkness correction values are set based on the standard correction values.

When carrying out printing of the image using these correction values, there are the following advantages. First, the standard correction values are set based on results of the actual printing, and therefore, even if the order of the nozzles responsible for the individual raster lines is different from the arrangement of the nozzles in the head 41, each raster line can be formed with the desired darkness.

Furthermore, when printing an image with a darkness lower than the predetermined darkness, a low-darkness correction value is used which has a degree of darkness correction that is lower than when printing an image with a darkness equal to or higher than the predetermined darkness, so that it is possible to inhibit excessive darkness correction for the image. For example, problems such as excessively adding or excessively decimating the dots in those images can be prevented.

As a result, the required darkness correction is performed for the image with a darkness equal to or higher than the predetermined darkness, and excessive correction can be prevented for the image with a darkness lower than the predetermined darkness. The result is that deterioration of graininess can be prevented and the quality of the printed image can be increased by carrying out the required darkness correction.

The above-noted predetermined darkness changes depending on a variety of factors. For example, it changes depending on the color of the ink, the type of color material, and the type of medium. Accordingly, the predetermined darkness is determined while taking into consideration these conditions.

<Regarding the Method for Printing an Image According to the Present Embodiment>

Figure 19:
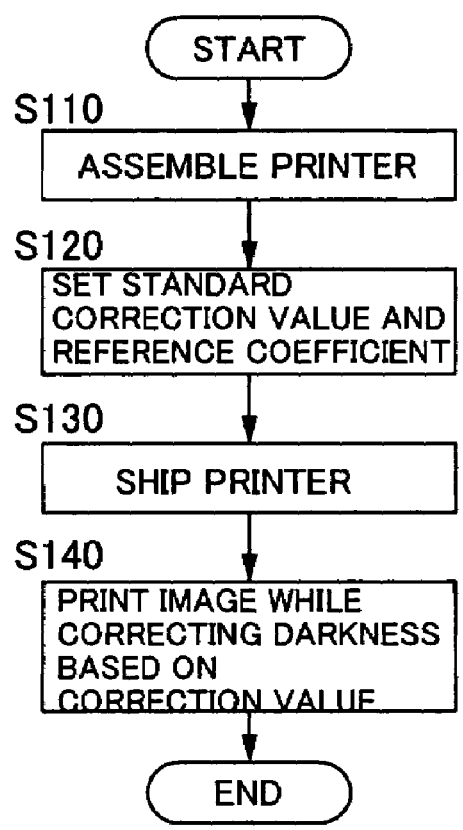
FIG. 19 is a flowchart showing a flow of processes or the like related to a method for printing an image according to the present embodiment.

FIG. 19 is a flowchart showing processes etc. related to a method for printing an image according to the present embodiment. Hereinbelow, an outline of the processes and the like is described with reference to this flowchart.

First, the printer 1 is assembled on the manufacturing line (S110). Next, a worker on the inspection line sets standard correction values and reference coefficients in the printer 1 (S120). Here, the reference coefficients are used when determining low-darkness correction values from the standard correction values (described below). In this step, the standard correction values and reference coefficients are stored in a memory 63, more specifically the correction value storage section 63a (see FIG. 8), of the printer 1. Next, the printer 1 is shipped (S130). Then, a user who has purchased the printer 1 performs actual printing of an image. At the time of this actual printing, the image is printed for every raster line at a darkness determined based on the standard correction values and/or the low-darkness correction values. In other words, the printer 1 prints an image on the paper S at the corrected darkness (S140).

It should be noted that in the present embodiment, the low-darkness correction values are determined using modifying coefficients calculated based on the reference coefficients. In other words, the low-darkness correction values are set by multiplying the standard correction value by the modifying coefficient (described below).

The method of printing an image according to the present embodiment is characterized by a correction value setting step (Step S120) and the actual printing of the image (Step S140). Accordingly, the contents of Step S120 and Step S140 are described below.

<Step S120: Setting the Standard Correction Values>

Figure 20:
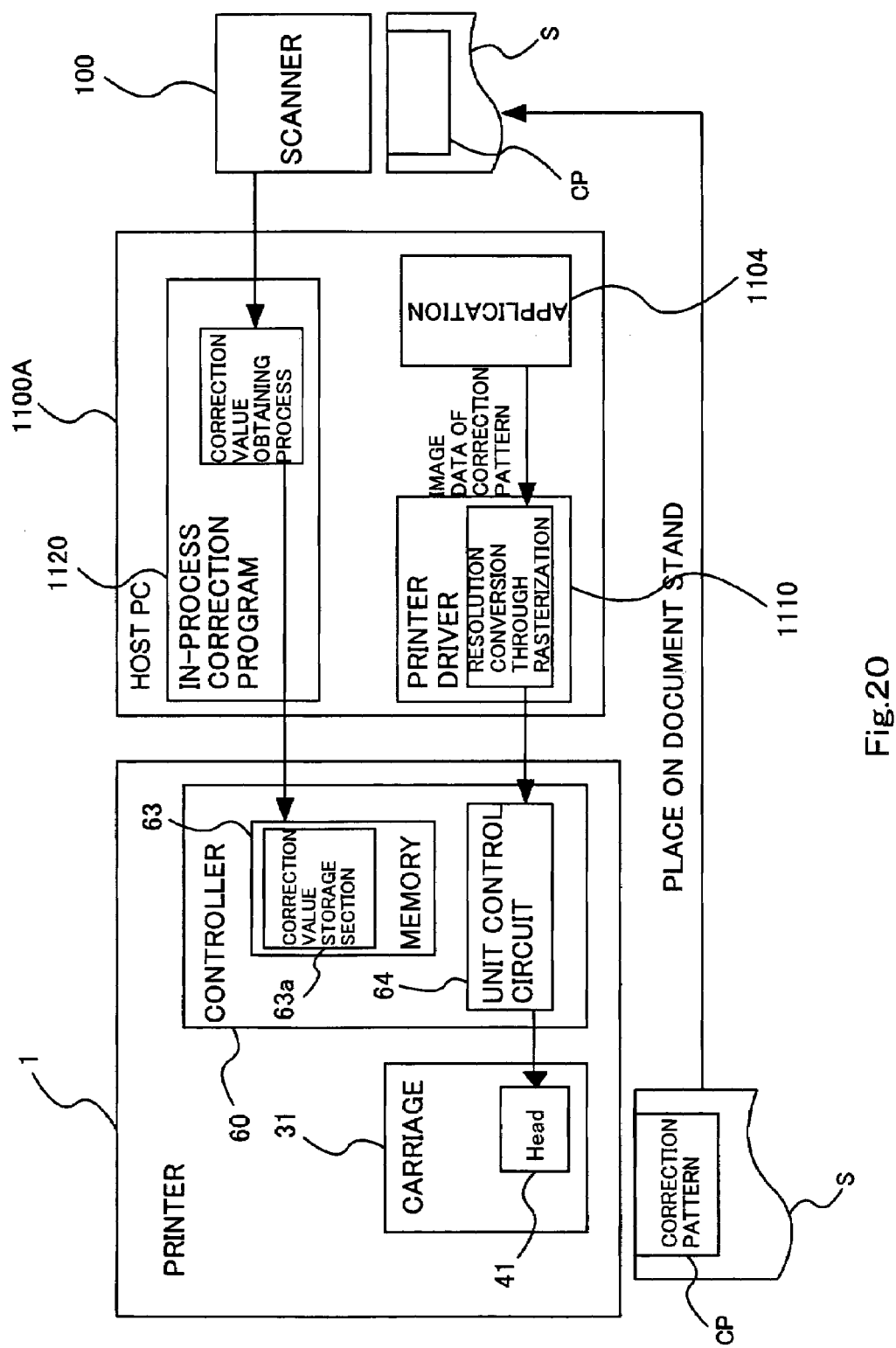
FIG. 20 is a block diagram illustrating devices used insetting the correction values.

FIG. 20 is a block diagram illustrating the equipment used in setting the standard correction values. It should be noted that structural elements that have already been described are assigned identical reference numerals and thus further description thereof is omitted.

In this diagram, a computer 1100A is a computer 1100 that is disposed on an inspection line, and runs an in-process correction program 1120. The in-process correction program 1120 can perform a correction value obtaining process. With this correction value obtaining process, a standard correction value for a target raster line is obtained based on a data group (for example, 256 tone grayscale data of a predetermined resolution) obtained by a scanner device 100 reading a correction pattern CP (see FIG. 25) that has been printed on a paper S. The process of obtaining the standard correction value is described below. Also, an application program 1104 run by the computer 1100A outputs to the printer driver 1110 image data for printing the correction pattern CP. Then, the printer driver 1110 performs the series of processes from resolution conversion to rasterization described above, and outputs to the printer 1 the print data for printing the correction pattern CP.

Figure 21:
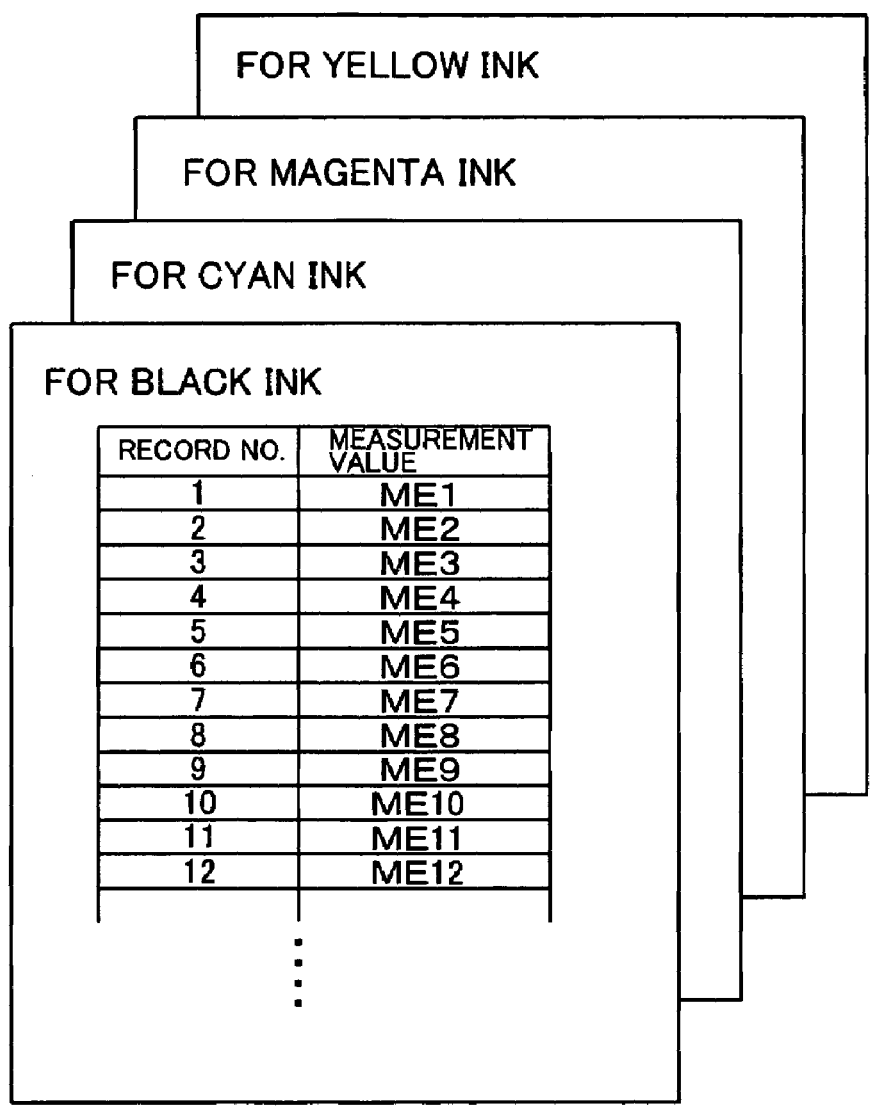
FIG. 21 is a conceptual diagram of a recording table that is provided in a memory of a computer.

FIG. 21 is a conceptual diagram of a recording table that is provided in the memory of the computer 1100. A recording table is prepared for each ink color. The measurement darkness values of the correction pattern CP printed for each color are recorded in the corresponding recording table. It should be noted that this diagram shows the fields in the recording table for black (K) as a representative recording table.

A plurality of records are prepared in this recording table. These records are provided in correspondence with the raster lines. In other words, the number of records that is provided is a number with which the overall length of the print region can be processed. Here, "print region" means the region on which an image or the like is printed. For example, in the case of so-called four-side borderless printing, the print region is a region slightly larger than the paper S. On the other hand, in the case of so-called bordered printing, the region surrounded by the margins within the paper S is the print region. Furthermore, the "overall length of the print region" means the length in the carrying direction. A record number is assigned to each record.

In the recording table, measurement values of darkness in each raster line, that is, measurement data obtained by being read in by the scanner device 100, are recorded in sequence. Accordingly, each recording table is prepared with fields for darkness measurement values. These fields have a plurality of records. According to the present embodiment, each record is associated with a raster line, and starting from the raster line formed at the upper edge of the paper the raster lines are recorded sequentially from records with small numbers. In other words, a darkness measurement value ME1 for the raster line which is formed first from the upper edge of the paper is recorded in the first record, and a darkness measurement value ME2 for the raster line which is formed second from the upper edge of the paper is recorded in the second record. Similarly, the measurement values (ME3 and so on) for the other raster lines are recorded in the corresponding records respectively.

Figure 22:
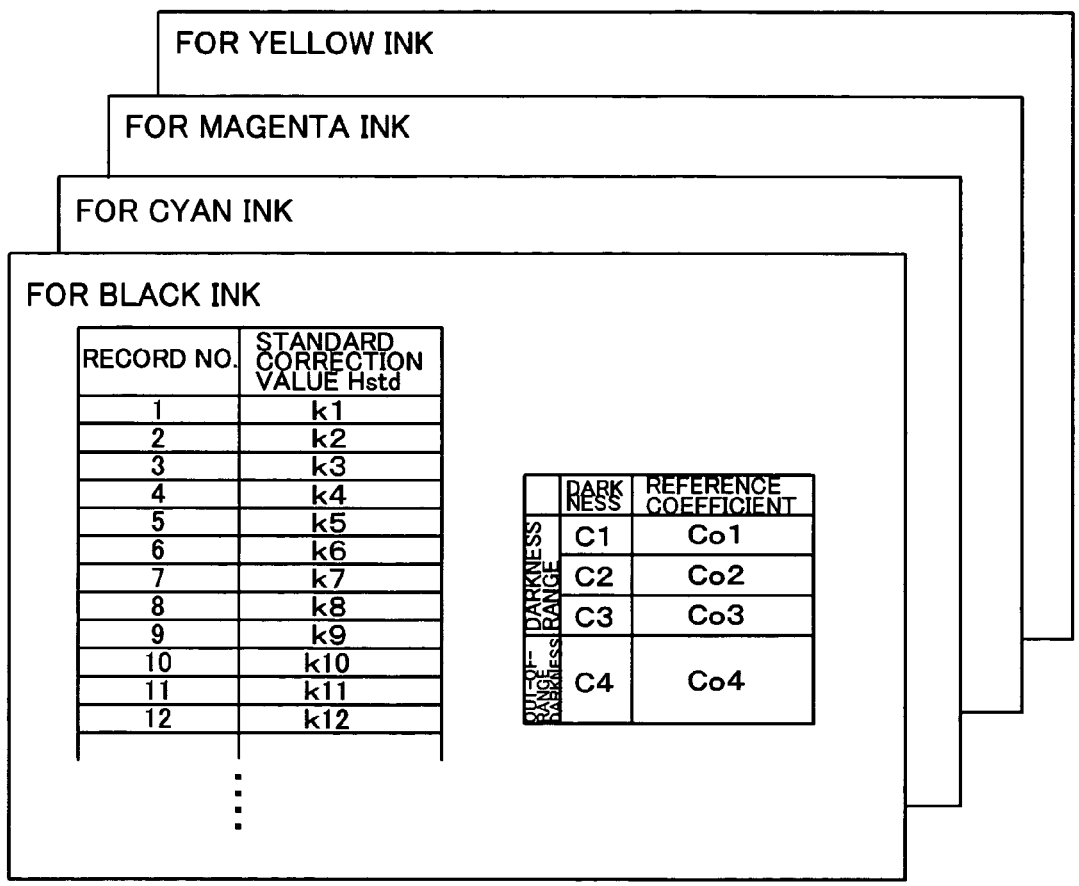
FIG. 22 is a conceptual view of the correction value storage section provided in the printer.

FIG. 22 is a conceptual view of the correction value storage section 63a provided in the memory 63 of the printer 1. As shown in the drawing, correction value tables and coefficient tables are prepared in the correction value storage section 63a. Similar to the recording tables described above, the correction value tables and coefficient tables are provided individually for each ink color. Also, this diagram shows the fields in the correction value table and coefficient table for black (K) as a representative correction value table and a representative coefficient table.

The correction value table stores standard correction values Hstd. Here, the standard correction value Hstd is a correction value calculated from the darkness measurement value for each raster line constituting the correction pattern, as described above, and is used when printing an image with a darkness equal to or higher than the predetermined darkness. The correction value table has a plurality of records, and each record is stored with a corresponding standard correction value Hstd. In other words, each record is assigned a record number, and the standard correction values Hstd obtained in the obtaining process of the correction values are recorded in the records corresponding to those raster lines, similarly to the recording tables described above. Further, the number of records in the correction value tables that is provided is a number with which the overall length of the print region can be processed.

The coefficient table stores reference coefficients Co. The reference coefficient Co is used when obtaining the correction value (that is, low-darkness correction value Hld, see FIG. 28A) which is used when printing an image with a darkness lower than the predetermined darkness, from the standard correction value Hstd described above. As described below, the printer 1 references the darkness of the image (dots) to be printed and obtain a modifying coefficient Cch (see FIG. 28C) based on the reference coefficient Co if the darkness is lower than the predetermined darkness. The low-darkness correction values Hld are determined using the modifying coefficients Cch. The image is printed by carrying out darkness correction using the low-darkness correction values Hld which were determined. It should be noted that, the modifying coefficients Cch indicate a ratio with respect to the standard correction value Hstd, and this ratio varies in accordance with the darkness of the image to be printed.

According to the present embodiment, the reference coefficients Co which are the basis for these modifying coefficients Cch are provided for each of a plurality of image darknesses (hereinafter, also referred to as "standard darkness") which serve as references. Specifically, as shown in FIG. 28B, a first reference coefficient Co1 is provided corresponding to a first reference darkness C1, a second reference coefficient Co2 is provided corresponding to a second reference darkness C2, and a third reference coefficient Co3 is provided corresponding to a third reference darkness C3, within the range of darknesses lower than the predetermined darkness. Further, according to the present embodiment, a fourth reference coefficient Co4 is provided corresponding to an image darkness C4 (equivalent to the predetermined darkness described above; hereinafter, referred to as "predetermined darkness C4"), which acts as a reference for determination. Accordingly, two fields are provided in the coefficient tables, corresponding to the reference darknesses C1 to C3 and the predetermined darkness C4, and to the reference coefficients Co1 to Co4. Further, four records are provided corresponding to the four types of darknesses C1 to C4.

The reference coefficients Co1 to Co3 corresponding to the reference darknesses C1 to C3 are equivalent to the modifying reference coefficients. The reference coefficient Co4 corresponding to the predetermined darkness C4 is equivalent to an out-of-range reference coefficient.

Figure 23A:
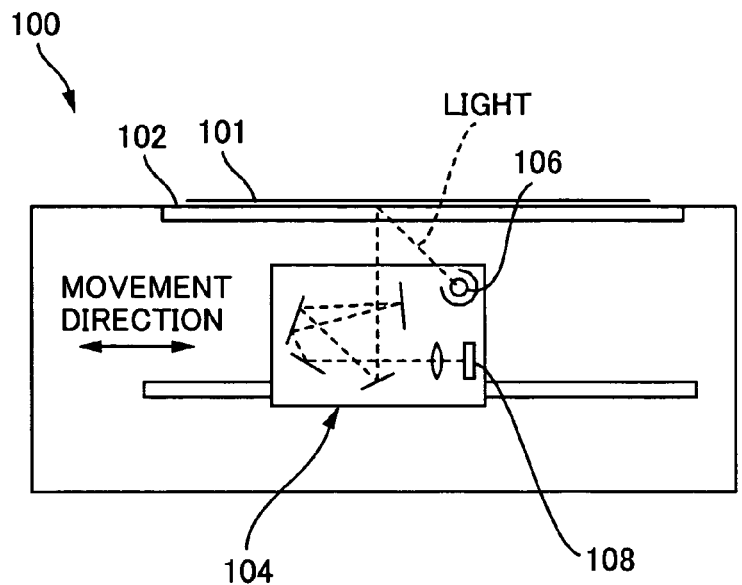
FIG. 23A is a vertical cross-sectional view of a scanner device.
Figure 23B:
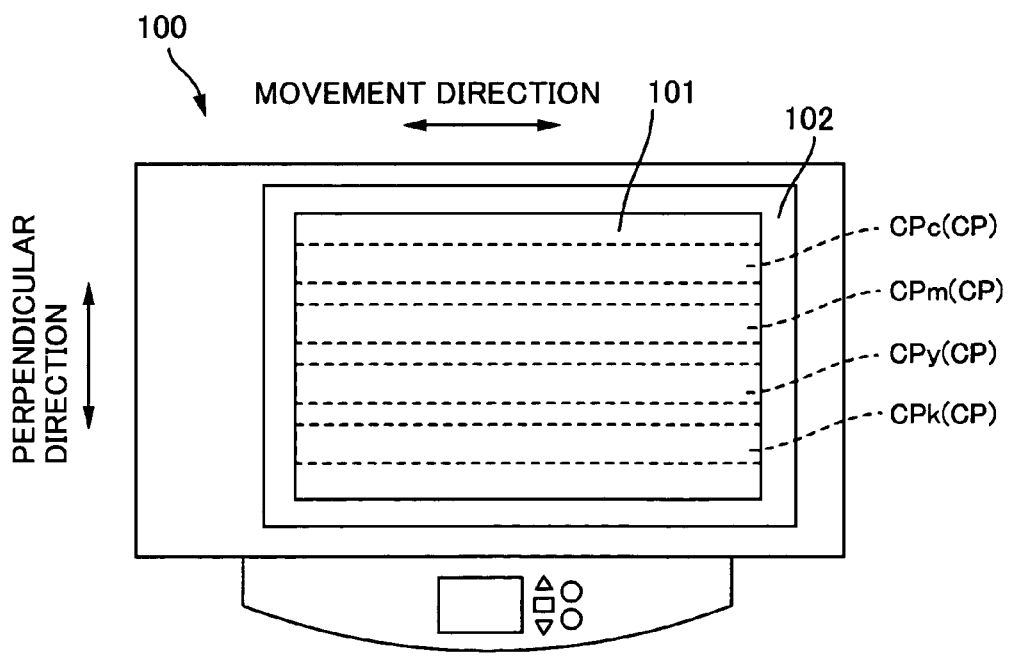
FIG. 23B is a plan view of a scanner device.

FIG. 23A and FIG. 23B are diagrams illustrating the scanner device 100 that is communicably connected to the computer 1100. That is, FIG. 23A is a cross-sectional view of this scanner device 100. FIG. 23B is a plan view of the scanner device 100. The scanner device 100 is a type of darkness measuring device that measures the darkness of the correction patterns CP. The scanner device 100 is capable of reading, as a data group of pixel units, an image (for example, a correction pattern CP which is printed on a paper S) that is printed on a document 101 and is provided with a document platen glass 102 on which the document 101 is placed, a reading carriage 104 that moves in a predetermined movement direction in opposition to the document 101 via the document platen glass 102, and a controller (not shown) for controlling the various sections, such as the reading carriage 104. The reading carriage 104 is provided with an exposure lamp 106 that irradiates light onto the document 101 and a linear sensor 108 for receiving the light that is reflected by the document 101 over a predetermined range in a perpendicular direction that is perpendicular to the movement direction. The scanner device 100 moves the reading carriage 104 in the movement direction while causing an exposure lamp 106 to emit light and receives the light that is reflected with the linear sensor 108. In this manner, the scanner device 100 reads the image printed on the document 101 at a predetermined reading resolution. It should be noted that the dashed lines in FIG. 23A indicate the path of the light during image reading.

Figure 24:
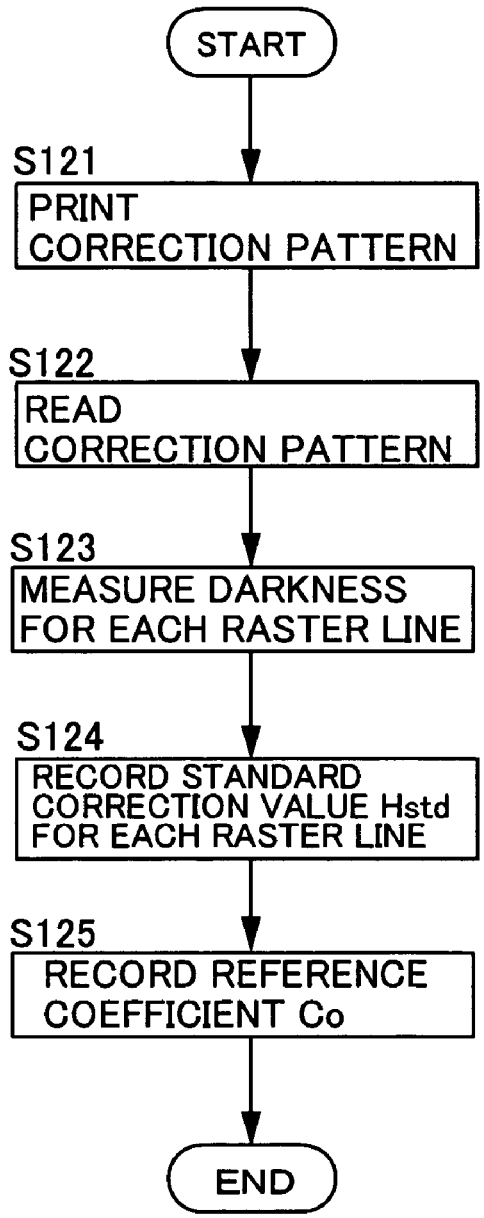
FIG. 24 is a flowchart showing the procedure of Step S120 in FIG. 19.

FIG. 24 is a flowchart showing the procedure of Step S120 in FIG. 19. Hereinbelow, the flowchart is referred to and a procedure for storing the standard correction values Hstd and the reference coefficients Co in the correction storage section 63a is described. This procedure includes a step of printing a correction pattern CP (S121), a step of reading the correction pattern CP (S122), a step of measuring the darkness of each raster line (S123), a step of setting a standard correction value Hstd for each raster line (S124), and a step of setting a reference coefficient Co (S125). These steps are described in detail below.

(1) Printing the Correction Pattern CP (S121)

First, in Step S121, a correction pattern CP is printed on the paper S. Here, a worker on the inspection line communicably connects the printer 1 to a computer 1100A on the inspection line and prints a correction pattern CP using the printer 1. In other words, the worker issues a command to print a correction pattern CP through a user interface of the computer 1100A. At that time, the print mode and the paper size mode, etc., are set through the user interface. Due to this command, the computer 1100A reads the image data of the correction pattern CP that is stored in the memory and carries out the processes of resolution conversion processing, color conversion, halftone processing, and rasterization processing, described above. The result is that print data for printing the correction pattern CP is output to the printer 1 from the computer 1100A. The printer 1 then prints the correction pattern CP on the paper S according to the print data. It should be noted that the printer 1 that prints the correction pattern CP is the printer 1 for which correction values are to be set. In other words, correction values are set for each printer 1.

Figure 25:
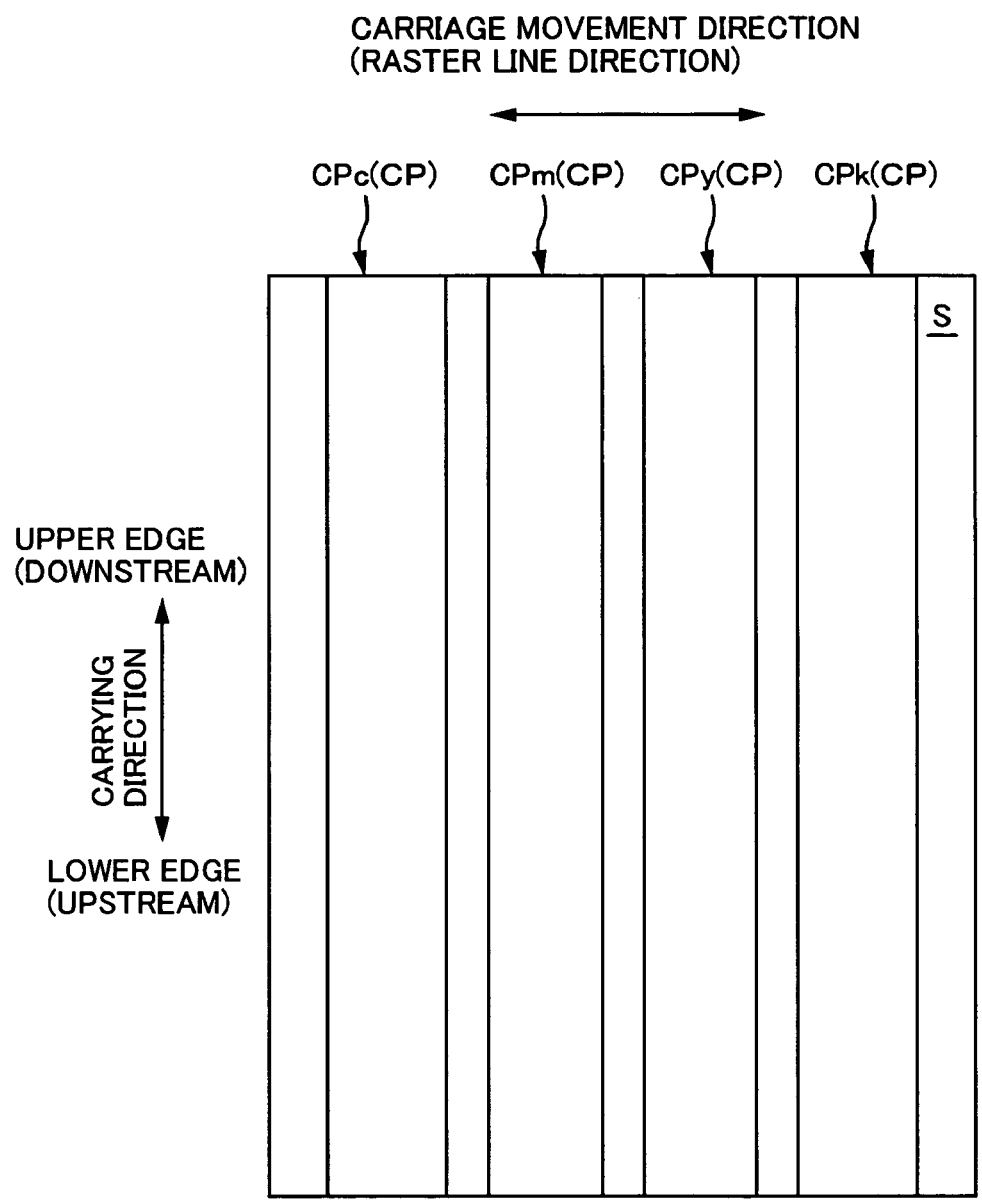
FIG. 25 is a diagram illustrating an example of the correction pattern that is printed.

Here, FIG. 25 is a diagram illustrating an example of the correction pattern CP that is printed. As shown in the drawing, the correction pattern CP of the present embodiment is printed in segments for each ink color. The correction pattern CP shown here as an example has long thin band shapes in the carrying direction, and is printed across the entire area of the paper S in the carrying direction. In other words, it is formed continuously from the upper edge to the lower edge of the paper S. Furthermore, a cyan (C) correction pattern CPc, a magenta (M) correction pattern CPm, a yellow (Y) correction pattern CPy, and a black (K) correction pattern CPk are printed lined up in the carriage movement direction in order from the left side in the diagram.

The print data of the correction pattern CP is data that has been created by performing halftoning and rasterization described above with respect to CMYK image data made by directly specifying the gradation values of each of the ink colors CMYK. The gradation values of the pixel data of this CMYK image data are set to the same value for all of the pixels of each correction pattern CP. Due to this, each correction pattern CP is printed at substantially the same darkness over the entire region in the carrying direction. The gradation values (darknesses) of these correction patterns CP can be changed freely. However, from the standpoint of actively inhibiting darkness non-uniformities in ranges susceptible to occurrences of darkness non-uniformities, a gradation value that results in a so-called intermediate gradation is selected in the present embodiment. For example, in the case of dye-type black ink with gradation values of 256 levels, the range from gradation value 77 to gradation value 128 is selected.

In principle, the only difference between the correction patterns CP is the ink color. Also, as mentioned above, darkness non-uniformities in multicolor printing are inhibited for each ink color that is used in that multicolor printing, but the method that is used for inhibiting the darkness non-uniformities is the same. For this reason, black (K) shall serve as an example in the following description. In other words, in the following description there are sections in which the description concerns only the color black (K), but the same also applies for the other ink colors C, M, and Y as well.

(2) Reading the Correction Patterns CP (Step S122)

Next, the correction patterns CP that have been printed are read by the scanner device 100. In Step S122, first a worker on the inspection line places the paper S on which the correction patterns CP have been printed onto the document glass 102. At this time, as shown in FIG. 23B, the worker places the paper S such that, the raster line direction of the correction patterns CP (CPc to CPk) and the perpendicular direction in the scanner device 100 (that is, the direction in which the linear sensor 108 is arranged) are the same direction. Once the paper S has been placed, the worker sets the reading conditions through the user interface of the computer 1100A and then issues a command to initiate reading. Here, it is preferable that the reading resolution in the movement direction of the reading carriage 104 is several integer multiples finer than the pitch of the raster lines. In this way, the measured values of the darkness that are read and the raster lines can be correlated easily, allowing the measurement accuracy to be increased. When the command to initiate reading is received, the controller (not shown) of the scanner device 100 controls the reading carriage 104, for example, to read the correction patterns CP that have been printed on the paper S and obtain data groups in pixel units. The obtained data groups are transferred to a memory (not shown) of the computer 1100A.

(3) Measuring the Darkness of the Correction Patterns (Step S123)

Next, the computer 1100A measures the darkness of the correction pattern CP raster line by raster line. The darkness measurements are carried out based on the obtained data groups. First, the computer 1100A recognizes, from the data groups transferred from the scanner device 100, the data pertaining to the raster line whose darkness is to be measured. Next, the computer 1100A measures the darkness of the raster line based on the recognized data. In this case, it is preferable that the darkness measurement value of the raster line is an average value of the darkness of a plurality of pixels belonging to the same raster line. This is due to the correction patterns CP being printed in halftones. In other words, since the correction patterns CP are printed at an intermediate gradation, dots belonging to the same raster line will vary in size or be formed such that neighboring dots are decimated. For this reason, if a single pixel is used as a representative of that entire raster line, there is a possibility that the darkness of that raster line will vary depending on the pixel that undergoes darkness measurements, that is, depending on the position in the main-scanning direction. For this reason, in the present embodiment, the computer 1100A obtains the respective darknesses of between several tens and several hundreds of pixels belonging to the same raster line, and the average value of the obtained darkness values is used as the darkness measurement value of that raster line.

Once a darkness measurement value of the raster line is obtained, the computer 1100A records the obtained measurement value in a record of the corresponding recording table. For example, if a measurement value ME1 of the first raster line (the raster line at the uppermost edge of the paper) in the carrying direction is obtained, then the measurement value ME1 is recorded in the first record. Once the obtained measurement value ME1 is recorded, the computer 1100A obtains a measurement value ME2 for the next raster line using the same procedure, and records this in a record. Once measurement values have been obtained and records have been recorded until the final raster line, the darkness measurement process of the correction patterns CP is ended.

(4) Setting the Standard Correction Value for Each Raster Line (Step S124)

Next, the computer 1100A sets a standard correction value Hstd for each raster line. In this step, the computer 1100A determines the standard correction value Hstd from the measurement value that has been recorded in each record of each recording table, and stores the standard correction value Hstd in the correction value storage section 63a of the printer 1 (see FIG. 22).

The standard correction value Hstd is determined from the darkness measurement value for a correction pattern, as described above, and is used when printing images with a darkness equal to or higher than the predetermined darkness. The standard correction value Hstd also serves as the basis for the low-darkness correction value Hld, which is used when printing an image with a darkness lower than the predetermined darkness. In other words, the printer 1 according to the present embodiment determines a modifying coefficient Cch corresponding to images with a darkness lower than the predetermined darkness based on the reference coefficients Co1 to Co4 described above. Next, the printer 1 uses this modifying coefficient Cch to determine a new correction value, that is, the low-darkness correction value Hld, from the standard correction value Hstd. The low-darkness correction value Hld is used when printing images with a darkness lower than the predetermined darkness.

Here, the low-darkness correction value Hld has a smaller degree of darkness correction than the degree of darkness correction by the standard correction value Hstd. Assuming that an image is to be printed whose standard correction value Hstd is a value of "0.2", or in other words an image with a darkness 20% darker than the darkness specified in the image data from the application. Then the low-darkness correction value Hld would set the image darkness increase ratio within a range of 0% to less than 20%. On the other hand, it is assumed that an image is to be printed whose standard correction value Hstd is a value of "−0.2", or in other words an image with a darkness 20% lighter than the darkness specified in the image data from the application. Then in this case, the low-darkness correction value Hld would set the image darkness increase ratio within a range of 0% to less than −20%.

Printing with this kind of low-darkness correction value Hld makes it possible to inhibit excessive darkness correction when printing images with a darkness lower than the predetermined darkness. Therefore, problems such as excessively adding dots or excessively decimating dots in those images can be prevented, for example. For images with a darkness equal to or higher than the predetermined darkness, however, darkness correction is performed based on the standard correction value Hstd, so printing can be carried out with an appropriate darkness for that raster line. As a result, deterioration of graininess can be prevented and the quality of the printed image can be increased by conducting the required darkness correction.

Figure 26:
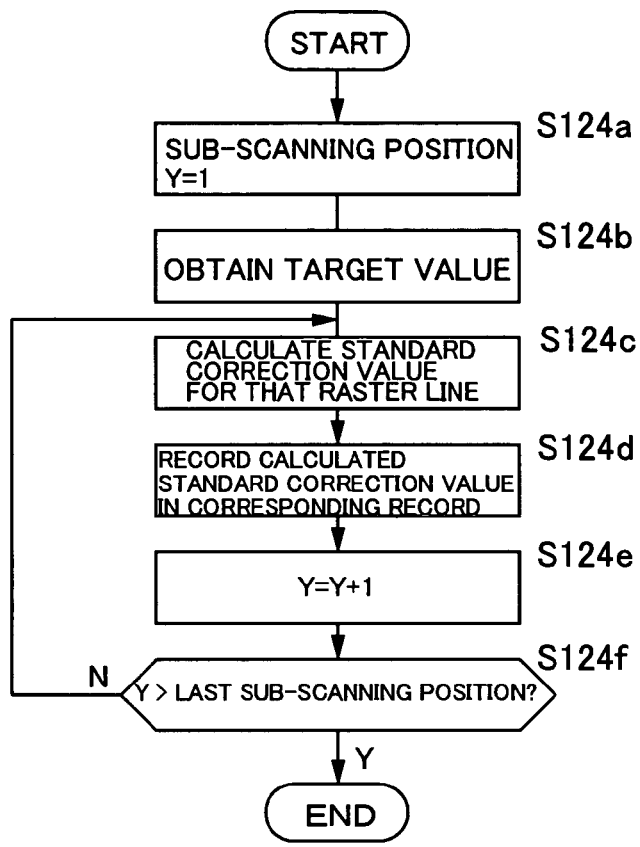
FIG. 26 is a flowchart describing the processes involved in setting standard correction values.

Setting the standard correction value Hstd for each raster line is described in greater detail below. Here, FIG. 26 is a flowchart for describing the processes in setting the standard correction value Hstd. The operations described below are performed by the computer 1100A in accordance with the process correction program 1120 (computer program) stored in the memory. The process correction program 1120 includes code for executing the operations. For the sake of convenience, in the following description, the raster line formed at the uppermost edge of the paper (the first raster line) is sometimes expressed as "sub-scanning position Y=1". In this case, increment in the value of the sub-scanning position Y refers to a raster line formed toward a lower edge side of the paper.

First, in Step S124a, the computer 1100A sets the raster line, that is the sub-scanning position, that will determine first the standard correction value Hstd. According to the present embodiment, a standard correction value Hstd is determined for each raster line in order starting with the raster line formed at the upper edge of the paper. For this reason, the computer 1100A sets a value of "1" as the information of the sub-scanning position Y in Step S124a. Once the information of the sub-scanning position has been set, the procedure advances to Step S124b.

In Step S124b, the computer 1100A obtains a darkness target value. The darkness target value according to the present embodiment is the average value of the darkness measurement values recorded in the recording table. For example, for black ink, all the records recorded in the recording table corresponding to black ink (the darkness measurement values for all the raster lines) are read and added up. This sum value is then divided by the number of records, and the obtained average value is the darkness target value. Once the darkness target value for that ink has been obtained in this manner, the procedure advances to Step S124c.

In Step S124c, the computer 1100A obtains a standard correction value Hstd for that raster line. This standard correction value Hstd is obtained in the format of a correction ratio indicating the ratio of correction with respect to the gradation value of the darkness. Specifically, this is calculated as follows.

First, the computer 1100A reads the darkness measurement value for the raster line under consideration, and calculates the difference between the read measurement value and the darkness target value. Then, a value obtained by dividing the calculated difference by the darkness target value is set as the standard correction value Hstd.

In other words, the standard correction value Hstd can be expressed by the following equation (1).

$$Hstd = \Delta C / M \quad (1)$$
$$= (M - ME)/M$$

In the above equation:
Hstd: standard correction value
M: darkness target value
ME: darkness measurement value
$\Delta C$: Difference between darkness measurement value and darkness target value Note that correction values calculated in this manner are decimals, such as "0.2", "−0.1". However, since these figures are, as described above, correction ratios, they can be expressed as percentages. For this reason, correction values are expressed in percentages in the description below. For example, if the calculated correction value is "0.2", it might be expressed as a correction value of 20%, whereas if a value of the calculated correction value is "−0.1", it might be expressed as a correction value of −10%.

Next, In Step S124d, the computer 1100A records the calculated standard correction value Hstd in the corresponding record in the recording table. For example, once the standard correction value Hstd for the raster line at sub-scanning position Y=1 is obtained, the computer 1100A records this standard correction value Hstd in the first record in the field for standard correction values (for example k1 in FIG. 22). Once the standard correction value Hstd has been recorded in this manner, the procedure advances to Step S124e.

In Step S124e, the computer 1100A updates the raster line (sub-scanning position) whose standard correction value Hstd is to be determined. According to this embodiment, the standard correction value Hstd is determined starting from the upper edge of the paper, as described above, so the computer 1100A increments the information of the sub-scanning position Y (updates it by adding 1 to it). Once the raster line has been updated, the procedure advances to Step S124g.

In Step S124g, the computer 1100A determines whether or not the standard correction value Hstd has been set until the final raster line. This determination is carried out, for example, based on the sub-scanning position Y updated in Step S124e. In other words, depending on the paper size and the print mode (in this case, bordered printing, borderless printing, or roll paper printing), the computer 1100A can identify the raster line number corresponding to the final raster line. Accordingly, the computer 1100A compares the updated sub-scanning position Y with the raster line number corresponding to the final raster line, and based on the condition that the updated sub-scanning position Y has exceeded the raster line number corresponding to the final raster line, determines that the standard correction value Hstd has been set until the final raster line. If, in step 124g, there are still raster lines remaining for which the standard correction value Hstd has not been set, the procedure returns to Step S124c, and the standard correction values Hstd are calculated for those raster lines and recorded. On the other hand, if the standard correction value Hstd has been recorded up to the final raster line, then this series of processes is ended.

(5) Recording the Reference Coefficients (Step S125)

Next, the reference coefficient Co, described above, is recorded in the printer 1. The reference coefficient Co according to the present embodiment is set in advance, and is stored in the memory and the like of the computer 1100A. Therefore, the computer 1100A reads the stored reference coefficient Co and sends it to the printer 1. The printer 1 then records the received reference coefficient Co in the field for the reference coefficient in the correction value storage section 63a. As described above, according to the present embodiment, three reference values C1 to C3 and corresponding reference coefficients Co1 to Co3 are provided within a range of darkness that is lower than the predetermined darkness. A reference coefficient Co4 corresponding to the predetermined darkness C4 is also provided. Accordingly, the computer 1100A sends to the printer 1 the darknesses C1 to C4 and the corresponding reference coefficients Co1 to Co4.

According to the present embodiment, as the reference darknesses corresponding to the reference coefficients Co1 to Co3 decreases, the values become smaller. For instance, as shown in FIG. 28B, reference darknesses of 0% (equivalent to the reference darkness C1), 10% (equivalent to the reference darkness C2), and 20% (equivalent to the reference darkness C3) are set. In this case, for the reference coefficient Co1 corresponding to the reference darkness C1, a smaller value is chosen than for the reference coefficient Co2 corresponding to the reference darkness C2. Similarly, for the reference coefficient Co2 corresponding to the reference darkness C2, a smaller value is chosen than for the reference coefficient Co3 corresponding to the reference darkness C3. Specifically, a value of "0.5" is chosen as the reference coefficient Co1, a value of "0.75" is chosen for the reference coefficient Co2, and a value of "0.9" is chosen for the reference coefficient Co3, respectively. Note that when printing images with a darkness equal to or higher than the predetermined darkness, the standard correction value Hstd is used as is, as described above, so a value of "1.0" is chosen as the reference coefficient Co4.

<Step S140: Actual Printing of the Image While Performing Darkness Correction for Each Raster Line>

In this way, the standard correction value Hstd, the reference darknesses C1 to C3, the predetermined darkness C4, and the reference coefficients Co1 to Co4 are set, and the printer 1 that is shipped is used by the user. In other words, the actual printing is performed by the user. In the actual printing, the printer driver 1110 and the printer 1 work in cooperation to perform darkness correction for each raster line and execute printing. At this time, the printer driver 1110 references the standard correction values Hstd and the reference coefficients Co1 to Co4 which are stored in the correction value storage section 63a and converts the pixel data based on this information. In other words, the printer driver 1110 determines the correction values (standard correction value Hstd and low-darkness correction value Hld) based on information relating to the darkness of the image data when converting the RGB image data into print data, and corrects the darkness of the multi-gradation pixel data based on the determined correction values. It then outputs the print data based on the corrected image data to the printer 1. The printer 1 forms the dots of the corresponding raster lines based on this print data. The print procedure is described in greater detail below.

Figure 27:
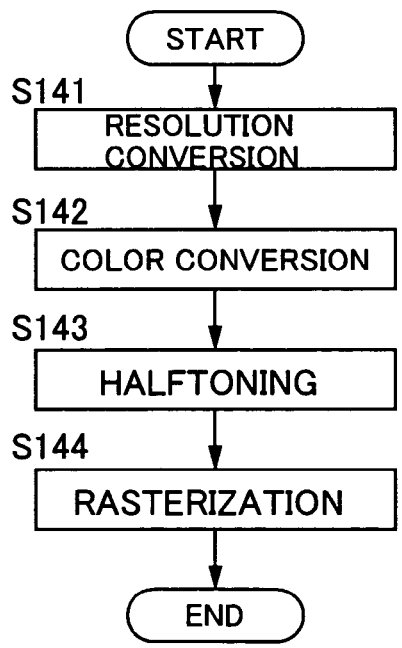
FIG. 27 is a flowchart showing the procedure of darkness correction for each raster line.

FIG. 27 is a flowchart showing the procedure for correcting the darkness of each raster line in Step S140 of FIG. 19. The operations described below are performed by the printer driver 1110. Accordingly, the printer driver 1110 includes code for executing the operations. Hereinafter, the darkness correction procedure is described with reference to this flowchart.

In this procedure, first, the printer driver 1110 carries out resolution conversion processing (Step S141). Next the printer driver 1110 successively performs color conversion (Step S142), halftoning (Step S143), and rasterization (Step S144). Note that in these processes, the user communicably connects the printer 1 to the computer 1100, establishing the printing system 1000 described in FIG. 1. Specifically, this is carried out on the condition that, once necessary information such as image quality mode and paper size mode has been input, an operation to execute printing is performed from the screen of the user interface of the printer driver 1110. The processes of these steps are described below.

Resolution Conversion Processing (S141): First, the printer driver 1110 performs resolution conversion with respect to the RGB image data that has been output from the application program 1104. That is, it converts the resolution of the RGB image data to the print resolution corresponding to the image quality mode that has been input. The printer driver 1110 then suitably processes the RGB image data by trimming, for example, to adjust the number of pixels in the RGB image data so that it matches the number of dots in the print region corresponding to the paper size and margin format mode that have been specified.

Color Conversion Processing (S142): Next, the printer driver 1110 carries out the above-described color conversion to convert the RGB image data into CMYK image data. The CMYK image data is, as described above, is provided with C image data, M image data, Y image data, and K image data, and is set to an amount of data in accordance with the print region.

Halftone Processing (S143): Next, the printer driver 1110 performs halftoning. Halftoning is a process for converting the gradation values of 256 levels indicated by the respective pixel data in the C, M, Y, and K image data into gradation values of four levels that can be expressed by the printer 1. In the present embodiment, darkness correction is then performed for each raster line during halftoning. In other words, the processing for converting each pixel data of the respective image data from a gradation value of 256 levels to one of four levels is performed while performing a correction based on the correction values described above. Darkness correction is performed for the respective C, M, Y, and K image data based on the correction value table for each ink color, but here only black (K) image data are described as representative image data.

In the present embodiment, in the halftoning processing, the gradation values of the 256 levels are temporarily substituted with level data and then converted into gradation values of four levels. At the time of this conversion, pixel data with gradation values in four levels is obtained by modifying the gradation values in 256 levels by an amount of the correction values. The correction values used here are chosen according to the darkness of the image to be printed. In other words, the standard correction value Hstd is used when printing an image with a darkness equal to or higher than the predetermined darkness. On the other hand, the low-darkness correction value Hld is used when printing an image with a darkness lower than the predetermined darkness. For this reason, the halftoning processing in the present embodiment comprises a pre-processing for determining the correction value according to the image darkness, that is, the standard correction value Hstd or the low-darkness correction value Hld, and a main process for converting the correction values determined in the pre-processing into pixel data with gradation values in four levels. The pixel data with gradation values in four levels is determined for every pixel. Therefore, the pre-processing and the main processing are repeatedly performed for each pixel. In other words, after the pre-processing and the main processing have been performed for a certain pixel data, the pre-processing and the main processing are then performed for the next pixel.

First, the procedure of the pre-processing is described. Note that, according to the present embodiment, the darkness of an image is determined for every pixel. Therefore, the darkness of pixel data is described as the image darkness below. When performing the following processing, the printer driver 1110 is able to use the information of the reference darknesses and predetermined darkness C1 to C4 and the information of the corresponding reference coefficients Co1 to Co4 that are stored in the correction value storage section 63a in the printer 1. For example, storing the information to the memory (not shown) in the computer 1100 enables it to be suitably read.

Figure 29:
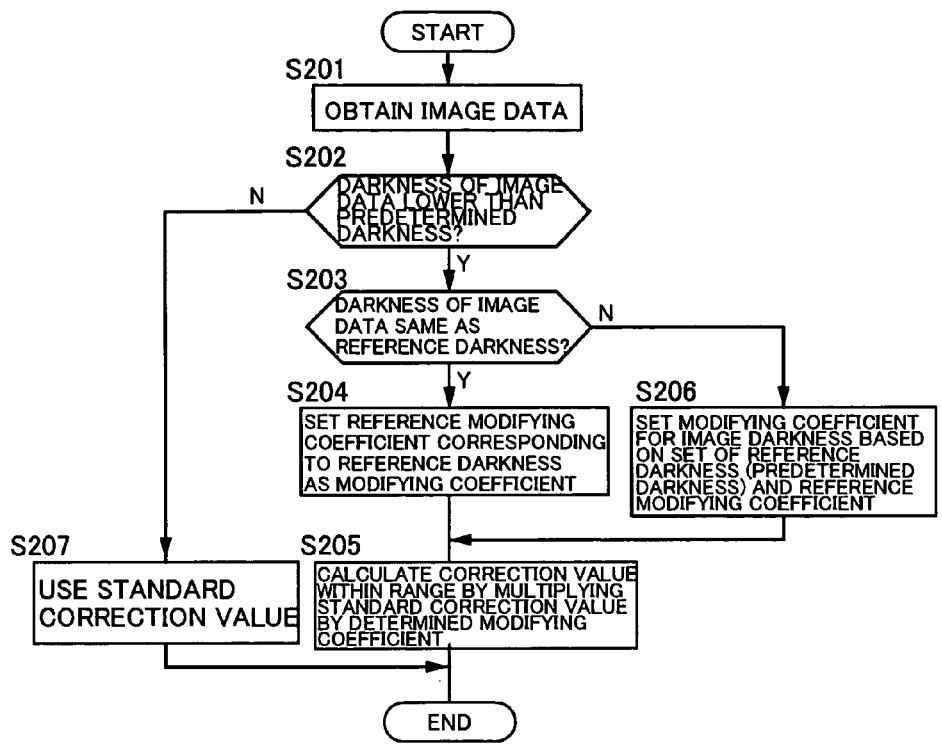
FIG. 29 is a flowchart describing the process of determining the correction value.

FIG. 28A, FIG. 28B, and FIG. 28C are diagrams describing the standard correction value Hstd and the low-darkness correction value Hld. That is, FIG. 28A is a diagram illustrating the standard correction value Hstd and the low-darkness correction value Hld in a case where the standard correction value is 0.2 (20%) and in a case where it is −0.2 (−20%). FIG. 28B is a diagram describing specific examples of the reference darknesses C1 to C3 and the predetermined darkness C4 and the corresponding reference coefficients Co1 to Co4. FIG. 28C is a diagram describing the determined modifying coefficient Cch. FIG. 29 is a flowchart describing the pre-processing which determines the correction value.

In Step S201, the printer driver 1110 obtains the pixel data (pixel data expressed in gradation values of 256 levels of CMYK) to be printed. The processing in Step S201 is equivalent to the halftone processing described above (refer to FIG. 3) in Step S300. Once the pixel data is obtained in this step, the procedure advances to Step S202.

In Step S202, it is determined whether or not the darkness regarding the target pixel data is lower than the predetermined darkness. For example, the printer driver 1110 obtains gradation values for the pixel data, and when the obtained gradation values are lower than the gradation value corresponding to the predetermined darkness, determines that it is lower than the predetermined darkness. In the example in FIG. 28, if the gradation value is a gradation value which corresponds to a darkness lower than 30%, the darkness is determined to be "lower than the predetermined darkness", and if the gradation value is a gradation value which corresponds to a darkness equal to or higher than 30%, the darkness is determined to be "equal to or higher than the predetermined darkness". In Step S202, if it is determined that the darkness is lower than the predetermined darkness, the procedure advances to Step S203, and if it is determined that the darkness is equal to or higher than the predetermined darkness, the procedure advances to Step S207. If the procedure advances to Step S207, then the standard correction value Hstd is used as is to print an image (dots). In other words, in Step S207, the printer driver 1110 reads the standard correction value Hstd that corresponds to the raster line to which the pixel data belongs. It then proceeds to the main processing.

In Step S203, it is determined whether or not the darkness of the obtained pixel data is identical to the reference darkness. Using the example in FIG. 28B to describe this, the first reference darkness C1 is 0%, the second reference darkness C2 is 10%, and the third reference darkness C3 is 20%. On this account, the printer driver 1110 determines the darkness of the obtained pixel data to be 0%, 10%, or 20%. In Step S203, if it is determined that the darknesses are identical, then the procedure advances to Step S204, and if it is determined that the darknesses are not identical, then the procedure advances to Step S206.

In Step S204, the reference coefficients Co1 to Co3 which correspond to the reference darknesses C1 to C3 determined as being identical to the pixel data darkness, are set as the modifying coefficients Cch for the pixel data. Using the example in FIG. 28B to describe this, if the darkness of the pixel data is 10%, then the printer driver 1110 determines that it is identical to the second reference darkness C2, and sets the second reference coefficient Co2 (a value of 0.75) as the modifying coefficient Cch for the pixel data. Similarly, if the darkness of the pixel data is 20%, then the third reference coefficient Co3 (a value of 0.9) is set as the modifying coefficient Cch corresponding to that pixel data. Once the modifying coefficient Cch has been set in this way, the procedure advances to Step S205.

In Step S205, the low-darkness correction value Hld is calculated by multiplying the set modifying coefficient Cch by the standard correction value Hstd. In this case, the printer driver 1110 reads the corresponding standard correction value Hstd from the correction value storage section 63a in the printer 1, and calculates the low-darkness correction value Hld by multiplying the modifying coefficient Cch by the standard correction value Hstd. For example, if the standard correction value Hstd is set to 0.2 (20%) for the raster line to which the pixel belongs, and the modifying coefficient Cch is set as 0.75 in Step S204, then the low-darkness correction value Hld is calculated by multiplying 0.2 by 0.75, and becomes 0.15 (15%). Further, if the standard correction value Hstd is set to −0.2 (−20%), and the modifying coefficient Cch is set to 0.9 in Step S204, then the low-darkness correction value Hld becomes −0.18 (18%). The low-darkness correction value Hld thus obtained is, for example, temporarily stored in the memory (not shown) in the computer 1100 and used in the main processing.

On the other hand, if in the above-described Step S203, the darkness of the pixel data and the reference darknesses C1 to C3 are determined as not identical, if the procedure advances to Step S206, then the modifying coefficient Cch is set in Step S206. In Step S206, the modifying coefficient Cch is determined based on the correlation between the sets of the reference darknesses (the predetermined darkness) C1 to C4 and the reference coefficients Co1 to Co4. Specifically, the modifying coefficient Cch is determined through linear interpolation based on the sets of the reference darknesses (the predetermined darkness) C1 to C4 and the reference coefficients Co1 to Co4. Furthermore, when determining the modifying coefficient Cch, it is possible to use quadratic interpolation or the like, but linear interpolation is used in view of increasing the speed of the processing. By increasing the speed of the processing, it is easier to make the system compatible with high-frequency ejection of ink.

In Step S206, the printer driver 1110 obtains the reference darknesses C1 to C3 immediately below the darkness of the pixel data and the corresponding reference coefficients Co1 to Co3, and the reference darknesses C2 and C3 or the predetermined darkness C4 immediately above the darkness of the pixel data and the corresponding reference coefficients Co2 to Co4. Describing this specifically, if the darkness of the pixel data is 0% or higher and lower than 10%, then the first reference darkness C1 and the first reference coefficient Co1, and the second reference darkness C2 and the second reference coefficient Co2 are obtained. Furthermore, if the darkness of the pixel data is 10% or higher and lower than 20%, then the second reference darkness C2 and the second reference coefficient Co2, and the third reference darkness C3 and the third reference coefficient Co3 are obtained. Similarly, if the darkness of the pixel data is 20% or higher and lower than 30%, then the third reference darkness C3 and the third reference coefficient Co3, and the predetermined darkness C4 and the fourth reference coefficient Co4 are obtained.

In this way, once two sets of darknesses and reference coefficients are obtained, the printer driver 1110 performs linear interpolation based on the information of the darknesses and the information of the reference coefficients that were obtained, and determines the modifying coefficient Cch according to the darkness of the pixel data. For example, as shown in FIG. 28C, if the darkness of the pixel data is 5%, the corresponding modifying coefficient Cch is set to 0.63.

Here, according to the present embodiment, a plurality (three) of reference values C1 to C3 with differing darknesses and the corresponding reference coefficient Co1 to Co3 are determined within the range of darknesses which are lower than the predetermined darkness, and based on such information the modifying coefficient Cch is determined. In this way, it is possible to set the modifying coefficient Cch with a high degree of precision even in cases where the amount of change in the modifying coefficient Cch relative to the amount of change in the image darkness is not constant. For example, as shown in FIG. 28C, the amount of change in the modifying coefficient Cch relative to the amount of change in the darkness between the first reference darkness C1 and the second reference darkness C2 is expressed as $\theta 1$, while the amount of change in the modifying coefficient Cch between the second reference darkness C2 and the third reference darkness C3 is expressed as $\theta 2$. In this example, it is clear that the amount of change $\theta 1$ is larger than the amount of change $\theta 1$. Even in cases like this, according to the present embodiment, it is possible to determine the modifying coefficient Cch with a high degree of precision.

In this way, once the modifying coefficient Cch is set in Step S206, the procedure advances to Step S205. In Step S205, as described above, the low-darkness correction value Hld is calculated by multiplying the set modifying coefficient Cch by the standard correction value Hstd. Once the low-darkness correction value Hld is set, the procedure advances to the main processing.

Figure 30:
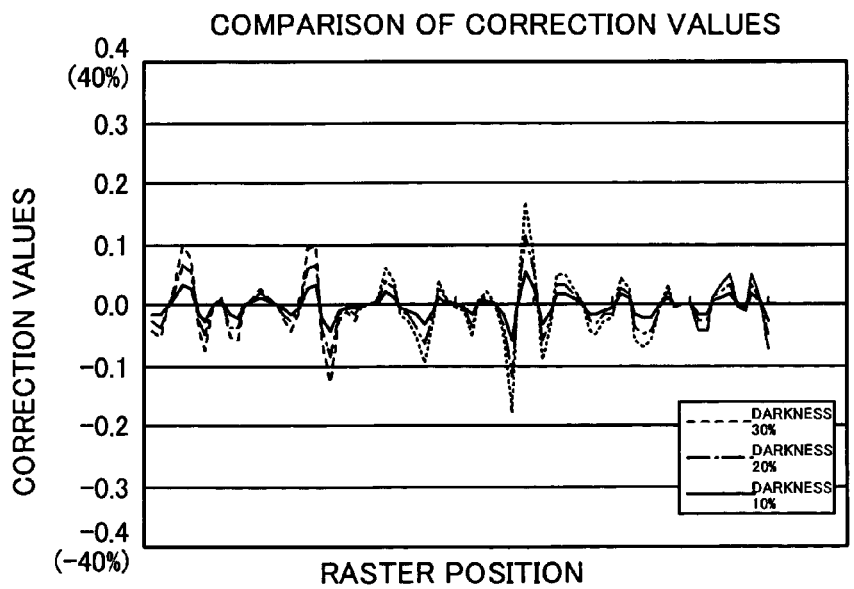
FIG. 30 is a diagram comparing the correction values acquired in a pre-processing.

Here, FIG. 30 is a diagram comparing correction values obtained through the pre-processing. Note that for the sake of convenience of illustration, three examples are indicated: image darkness 10% (solid line), image darkness 20% (dash-dotted line), and image darkness 30% (dashed line). The correction value for the image darkness 30% is the standard correction value Hstd described above, i.e., the correction value obtained from the measurement value of the darkness of the correction pattern. The correction value for the image darkness of 20% is the correction value for when the modifying coefficient Cch is approximately 0.67. Similarly, the correction value for the image darkness of 10% is the correction value for when the modifying coefficient Cch is approximately 0.33.

It can be seen from FIG. 30, with images having a darkness lower than 30%, the smaller the darkness of the image grows, the closer the low-darkness correction value Hld approaches a value "0". When the low-darkness correction value Hld approaches 0, it means that it is approaching the darkness of the image data from the application program 1104, with regard to the converted pixel data darkness. Accordingly, it is possible to prevent deterioration of graininess caused by addition or decimation of dots. For images with a darkness equal to or higher than the predetermined darkness, correction is performed based on the standard correction value Hstd, and darkness non-uniformities in images in the carrying direction can be effectively prevented. Further, in the present embodiment, as the image darkness approaches 0, the smaller the degree of darkness correction by the low-darkness correction value Hld becomes. Therefore, the degree of addition or decimation of dots changes according to the image darkness. It is therefore possible to prevent both darkness non-uniformities in images and deterioration of graininess at a high level.

Next, the main processing mentioned above is described. Note that the main processing is performed by a similar procedure as ordinary halftone processing (refer to FIG. 3) which has already been described. The difference between ordinary halftoning and the main processing here is mainly in steps S301, S303, and S305 which set the level data. For this reason, in the following description, these processings will be focused on, while the other processings will be described simply. There is also a difference in that the pre-processing described above, is performed for certain pixel data before performing the main processing. However, the overall flow of the processings in the main processing is the same. For this reason, the following description is made with reference to the flowchart in FIG. 3 and the dot creation ratio table in FIG. 4.

Once the pre-processing described above has been completed for a certain pixel, in Step S301, the printer driver 1110 reads level data LVL corresponding to the gradation value of the pixel data from a large dot profile LD of the creation ratio table. However, at the time of performing this reading, according to the present embodiment, the correction value determined in the pre-processing (the standard correction value Hstd or the low-darkness correction value Hld) is used, and the level data LVL is read while changing the gradation value by an amount of the correction value.

For example, if the pixel data is equal to or higher than the predetermined darkness, the standard correction value Hstd for the corresponding raster line is set as the correction value to be used. For example, if the gradation value of the pixel data is gr, then the printer driver 1110 obtains a new gradation value GR from the standard correction value Hstd and this gradation value gr. Specifically, the printer driver 1110 obtains the new gradation value GR by calculating the following equation (2).

$$GR = gr + \Delta gr \qquad (2)$$
$$= gr + (gr \times Hstd)$$

In the above equation:
GR: new gradation value
gr: the gradation value of the pixel data (gradation value before correction)
Hstd: standard correction value
$\Delta gr$: difference between the new gradation value and the gradation value of the pixel data On the other hand, if the pixel data is lower than the predetermined darkness, the low-darkness standard correction value Hld is set as the correction value to be used. For example, if the gradation value of the pixel data is gr1, then the printer driver 1110 obtains a new gradation value GR1 from the low density correction value Hld and this gradation value gr1. For example, the printer driver 1110 obtains the new gradation value GR1 by calculating the following equation (3).

$$GR1 = gr1 + \Delta gr1 \qquad (3)$$
$$= gr1 + (gr \times H1d)$$

In the above equation:
GR1: new gradation value
gr1: the gradation value of the pixel data (gradation value before correction)
Hld: low-darkness correction value (standard gradation value×modifying coefficient)
$\Delta gr1$: difference between the new gradation value and the gradation value of the pixel data If, as a result of these calculations, the darkness of the pixel data is gr, which is equal to or higher than the predetermined darkness, then the gradation value GR is calculated based on equation (2), and the level data LVL is calculated as 11$d$. If, as a result of these calculations, the darkness of the pixel data is gr1, which is lower than the predetermined darkness, then the gradation value GR1 is calculated based on equation (3). Note that the gradation value GR1 does not intersect with the large dot profile LD. For this reason, the level data LVL corresponding to the gradation value GR1 cannot be calculated. For example, a value "0" is set as the level data.

In Step S302, the printer driver 1110 determines, on the dither matrix, whether or not the level data LVL of this large dot is greater than the threshold value THL of the pixel block corresponding to that pixel data. In this case, the level data LVL corresponding to the gradation value GR is changed by the value $\Delta gr$ based on the standard correction value Hstd. Consequently, the result of this determination changes by the amount of change, and thus the ease with which the large dot is formed also changes. As a result, darkness non-uniformities in the carrying direction are inhibited in the image to be printed. It should be noted that if in Step S302 the level data LVL is larger than the threshold value THL, then the procedure advances to Step S310 and a large dot is recorded corresponding to that pixel data. Otherwise the procedure advances to Step S303.

In Step S303, the printer driver 1110 reads the level data LVM that corresponds to the gradation value from the medium dot profile MD of the creation ratio table, and at this time, as similar to Step S301, the gradation value is changed according to the standard correction value Hstd or the low-darkness correction value Hld. For example, for the gradation value GR, a level data LVM of 12$d$ is obtained. In contrast, for the gradation value GR1, a level data LVM of 22$d$ is obtained. Here, the low-darkness correction value Hld has a smaller degree of darkness correction compared to the standard correction value Hstd. In other words, the gradation value GR1 approaches the gradation value of the pixel data obtained by the color conversion processing (S142). Accordingly, excess addition and decimation of dots can be prevented in the printed image.

Next, in Step S304 the printer driver 1110 determines, on the dither matrix, whether or not the level data LVM of this medium dot is greater than the threshold value THM of the pixel block corresponding to that pixel data. Here also, the level data LVM changes according to the values $\Delta gr$ or $\Delta gr1$. Consequently, the result of this determination changes by the amount of change, and thus the ease with which the medium dot is formed also changes. It should be noted that if in Step S304 the level data LVM is larger than the threshold value THM, then the procedure advances to Step S309 and a medium dot is recorded corresponding to that pixel data. Otherwise, the procedure advances to Step S305.

In Step S305, the printer driver 1110 reads the level data LVS that corresponds to the gradation value from the small dot profile SD of the creation ratio table, and at this time, as similarly to Step S301, the gradation value is changed according to the correction value (the standard correction value Hstd or the low-darkness correction value Hld) and the level data LVS is read. Thus, the level data LVS corresponding to the gradation value GR is obtained as 13$d$. On the other hand, the level data LVS corresponding to the gradation value GR1 is obtained as 23$d$. Then, in Step S306 the printer driver 1110 determines, on the dither matrix, whether or not the level data LVS of this small dot is larger than the threshold value THS of the pixel block corresponding to that pixel data. Here also, the level data LVS changes according to the values $\Delta gr$ or $\Delta gr1$. Consequently, the result of this determination changes by the amount of change, and thus the ease with which the small dot is formed also changes. It should be noted that if in Step S306 the level data LVS is larger than the threshold value THS, then the procedure advances to Step S308, and a small dot is recorded corresponding to that pixel data. Otherwise, the procedure advances to Step S307 and no dot is recorded corresponding to that pixel data.

Rasterization processing (S144): Next, the printer driver 1110 performs rasterization. The rasterized print data is output to the printer 1, and the printer 1 executes actual printing of the image to the paper S according to the pixel data of the print data. It should be noted that as discussed above, the darkness of the pixel data has been corrected for each raster line, and thus darkness non-uniformities can be effectively inhibited in the image that is printed.

In other words, since each raster line is formed under a condition in which its gradation value is changed based on the standard correction value Hstd or the low-darkness correction value Hld, a raster line that, without correction, would be formed darker than the prescribed darkness (designated darkness) is corrected so as to have a lower gradation value. As a result, such a raster line is formed in a state in which the amount of ink is suppressed and can be formed with a darkness closer to the desired darkness. Similarly, a raster line that would, without correction, be formed lighter than the prescribed darkness is corrected so as to have a larger gradation value and to increase the amount of ink, and therefore can be formed with a darkness closer to the desired darkness. Furthermore, when the darkness of an image is lower than the predetermined darkness, the degree of darkness correction is smaller than in cases where the darkness is equal to or higher than the predetermined darkness. Therefore, it is possible to prevent phenomena such as dots being added excessively or dots being decimated excessively. As a result, deterioration of graininess can be prevented by applying the required darkness correction.

Second Embodiment

The first embodiment described above determines a low-darkness correction value Hld by modifying a standard correction value Hstd using a modifying coefficient Cch, and uses a predetermined darkness C4 and three reference darknesses C1 to C3 determined within the range of darkness lower than the predetermined darkness, and reference coefficients Co1 to Co4 corresponding to the darknesses, when determining the modifying coefficient Cch. In other words, the modifying coefficient Cch was determined by performing a linear interpolation based on a correlation between a set of the reference darknesses C1 to C3 and the reference coefficients Co1 to Co4, and a set of the predetermined darkness C4 and the reference coefficient Co4. In this regard, it is also possible to determine the modifying coefficient Cch from a set of one reference darkness and a corresponding coefficient determined within the range of darkness lower than the predetermined darkness, and a set of the predetermined darkness and the corresponding reference coefficient. A second embodiment as set in this way is described next. Note that this second embodiment differs from the first embodiment described above, mainly in the method for setting the modifying coefficient Cch, that is, the pre-processing described above. Accordingly, the following description will focus on this difference.

FIG. 31A, FIG. 31B, and FIG. 31C are diagrams describing a low-darkness correction value Hld and a standard correction value Hstd in the second embodiment. In other words, FIG. 31A is a diagram illustrating the standard correction value Hstd, set to 0.2 and −0.2, and the low-darkness correction value Hld corresponding thereto. FIG. 31B is a diagram illustrating specific examples of the reference darknesses C1 and the corresponding reference coefficient Co1, and the predetermined darknesses C4 and the corresponding reference coefficient Co4. FIG. 31C is a diagram describing the determined modifying coefficient Cch.

According to the second embodiment, the reference darkness C1 is set as the minimum darkness in the range of darknesses lower than the predetermined darkness, i.e., as an image darkness of 0%, while the reference coefficient Co1 corresponding to the reference darkness C1 is set to a value of "0.0", as shown in FIG. 31B. The reference coefficient Co4 corresponding to the predetermined darkness C4 is set to a value of "1.0". Note also that such information is, for example, stored as a table in the correction storage section 63a described above. In the present embodiment, for images with a darkness lower than the predetermined darkness, the modifying coefficient Cch is determined based on a correlation between a set of the minimum darkness C1 and the corresponding reference coefficient Co1, and a set of the predetermined darkness C4 and the corresponding reference coefficient Co4. For images with a darkness equal to or higher than the predetermined darkness, correction is performed using the standard correction value Hstd.

In other words, for images with a darkness lower than the predetermined darkness, in the pre-processing described above, from the set of the minimum darkness C1 and the corresponding reference coefficient Co1, and a set of the predetermined darkness C4 and the corresponding reference coefficient Co4, the modifying coefficient Cch is determined using linear interpolation according to the darkness (gradation value) of the pixel data.

For example, as shown in FIG. 31C, if the darkness of the pixel data is 10%, the corresponding modifying coefficient Cch is set to 0.33. Similarly, if the darkness of the pixel data is 20%, the corresponding modifying coefficient Cch is set to 0.67. Therefore using this kind of linear interpolation simplifies the process and makes it easier to handle high-frequency ejection of ink. Further, in the present embodiment, the amount of information provided to the printer 1 can be deleted since only one reference darkness C1 is provided within the range of darknesses lower than the predetermined darkness. Once the modifying coefficient Cch is determined this way, the main processing is performed in a manner similar to that in the first embodiment, described above, and correction value (the standard correction value Hstd or the low-darkness correction value Hld) corresponding to the pixel data is determined. Once the main processing has been performed, the pre-processing and main processing are performed similarly for the next pixel data. Finally, once the correction values for all the pixel data have been determined, rasterization (S144) is performed. The print data is output to the printer 1 by rasterization, and the printer 1 executes actual printing of the image on the paper S according to the pixel data of the print data. It should be noted that, as discussed above, the darkness of the pixel data has been corrected for each raster line, and thus darkness non-uniformities of an image can be effectively inhibited in the image that is printed. Furthermore, in the present embodiment, when the darkness of the image is lower than the predetermined darkness, the degree of darkness correction is smaller than cases where the darkness is equal to or higher than the predetermined darkness. Therefore, it is possible to prevent phenomena such as dots being added excessively or dots being decimated excessively. As a result, deterioration of graininess can be prevented by applying the required darkness correction.

While the reference darkness is determined as the minimum darkness (0%) in the second embodiment, the configuration is not limited to this. In other words, the reference darkness may be determined as any darkness lower than the predetermined darkness. Note that with respect to the reference darkness, when determining it as a darkness near the predetermined darkness, the difference between the reference coefficient corresponding to the reference darkness and the reference coefficient corresponding to the predetermined darkness becomes very small, and may lower the precision of the obtained modifying coefficient Cch. With this point in mind, it is preferable to set the reference darkness as close to the low-darkness side as possible.

Third Embodiment

Figures 32A, 32B:
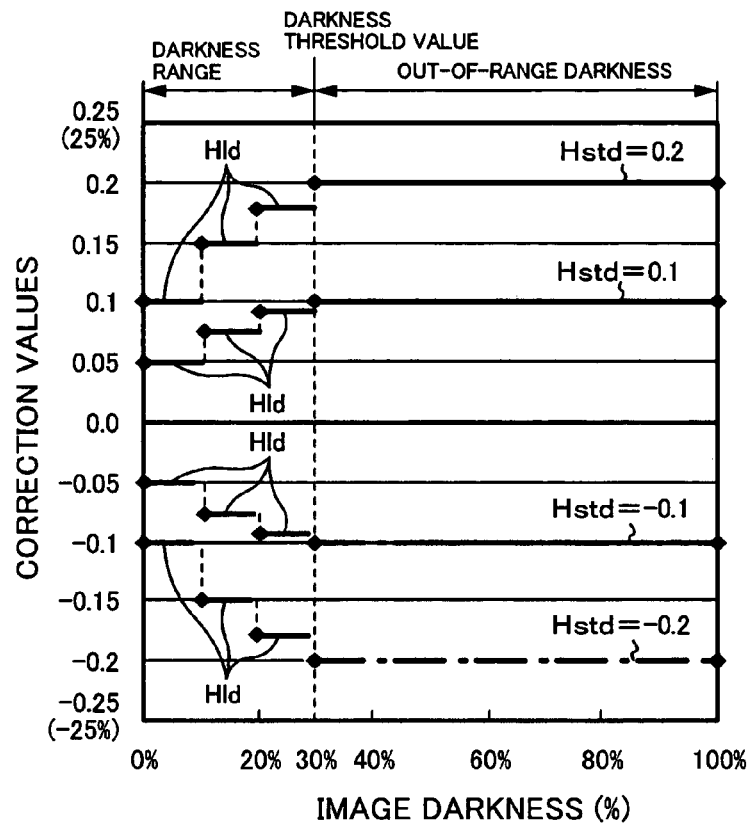
FIG. 32A is a diagram illustrating standard correction values according to a third embodiment and the low-darkness correction values corresponding thereto.
FIG. 32B is a diagram illustrating a specific example of standard correction values according to a third embodiment and the low-darkness correction values corresponding thereto.

In both the first embodiment and the second embodiment described above, by performing linear interpolation between a set of a reference darkness and a reference coefficient and a set of a predetermined darkness and a predetermined coefficient, the modifying coefficient Cch is determined. With regard to this point, it is also possible to divide the range of darknesses below the predetermined darkness into a plurality of sub-darkness ranges, and determine a low-darkness correction value Hld for each sub-darkness range. A third embodiment constructed in this way is described next. Here, FIG. 32A and FIG. 32b are diagrams describing a low darkness correction value Hld in the third embodiment. In other words, FIG. 32A is a diagram describing the standard correction value Hstd and the low-darkness correction value Hld in cases where the standard correction value Hstd is 0.2, 0.1, −0.1, and −0.2. FIG. 32B is a diagram describing specific examples of the standard correction value Hstd and the low-darkness correction value Hld. According to the third embodiment, the printer 1 is provided with the standard correction value Hstd and the low-darkness correction value Hld. For example, these correction values are stored in the correction value storage section 63a, described above. Accordingly, in the present embodiment, fields for standard correction values and fields for low-darkness correction values are provided to the correction value storage section 63a.

The low-darkness correction value Hld is stored in fields for the low-darkness correction values for every sub-darkness range. Further, the low-darkness correction value Hld is also stored for every standard correction value Hstd. As shown partly in FIG. 32B, according to the present embodiment, three types of low-darkness correction value Hld are stored for every 0.01 within the predetermined range of the standard correction value Hstd (e.g., in the range from 0.25 to −0.25). In other words, an image darkness (a darkness expressed as a gradation value for pixel data) of 0% or higher and lower than 10% is set as a first sub-darkness range CR1, an image darkness of 10% or higher and lower than 20% is set as a second sub-darkness range CR2, and an image darkness of 20% or higher and lower than 30% is set as a third sub-darkness range CR3, and a low-darkness correction value Hld is stored for each of those.

The standard correction value Hstd in the present embodiment is stored in a procedure similar to that of the first embodiment described above. The low-darkness correction value Hld is calculated by multiplying the standard correction value Hstd by a correction ratio that corresponds to that sub-darkness range, and is transferred to the printer 1 from the computer 1100A. For example, the correction ratio for the first sub-darkness range CR1 is set to 0.5, the correction ratio for the second sub-darkness range CR2 is set to 0.75, and the correction ratio for the third sub-darkness range CR3 is set to 0.9. Accordingly, if the standard correction value Hstd is 0.2, then 0.1 is stored as the low-darkness correction value Hld corresponding to the first sub-darkness range CR1. Similarly, 0.15 is stored as the low-darkness correction value Hld corresponding to the second sub-darkness range CR2, and 0.18 is stored as the low-darkness correction value Hld corresponding to the third sub-darkness range CR3. Further, if the standard correction value Hstd is −0.1, then −0.05 is stored as the low-darkness correction value Hld corresponding to the first sub-darkness range CR1, −0.075 is stored as the low-darkness correction value Hld corresponding to the second sub-darkness range CR2, and −0.09 is stored as the low-darkness correction value Hld corresponding to the third sub-darkness range CR3.

Each low-darkness correction value Hld is, for example, set after the standard correction value Hstd for each raster line is stored in the correction value storage section 63a. Specifically, the processing of setting the low-darkness correction value Hld is performed instead of setting the reference coefficient in the first embodiment (S125, refer to FIG. 24). In this setting process, the corresponding low-darkness correction value Hld is stored in the correction value storage section 63a for every standard correction value Hstd. For example, assuming that the standard correction value Hstd is determined in increments of 0.01, from 0.25, 0.24, 0.23, and so on until −0.25. Then, in this case, first three types of low-darkness correction values Hld are stored for a standard correction value Hstd value of 0.25, then the low-darkness correction values Hld are stored for the standard correction value Hstd value of 0.24. Thereafter the low-darkness correction values Hld are stored by the same procedure until a value of −0.25.

Also in the present embodiment, correction is performed based on correction values in halftoning (S143, refer to FIG. 27). In other words, in the present embodiment, the correction value (the standard correction value Hstd, or the low-darkness correction values Hld) corresponding to the darkness of the image is chosen in the pre-processing, and the pixel data is converted in the main processing using the selected correction value. During the conversion, the low-darkness correction value Hld is read and can be used in the present embodiment. In other words, the low-darkness correction value Hld determined based on the standard correction value Hstd and the darkness of the pixel data can be directly read from the correction value storage section 63a, so that the processing can be simplified and made more suitable for high-frequency ejection of ink.

In this manner, once conversion has been performed for all the pixel data, rasterization (S144) is performed. The print data is output to the printer 1 by rasterization, and the printer 1 executes the actual printing of the image on the paper S according to the pixel data of the print data. In the present embodiment, the darkness of the pixel data has been corrected for each raster line, and thus darkness non-uniformities in an image can be effectively inhibited in the image that has been printed. Furthermore, when the darkness of an image is lower than the predetermined darkness, the degree of darkness correction is smaller than in the case where the darkness is equal to or higher than the predetermined darkness, so deterioration of graininess can be prevented while performing the required darkness correction.

Figures 33A, 33B:
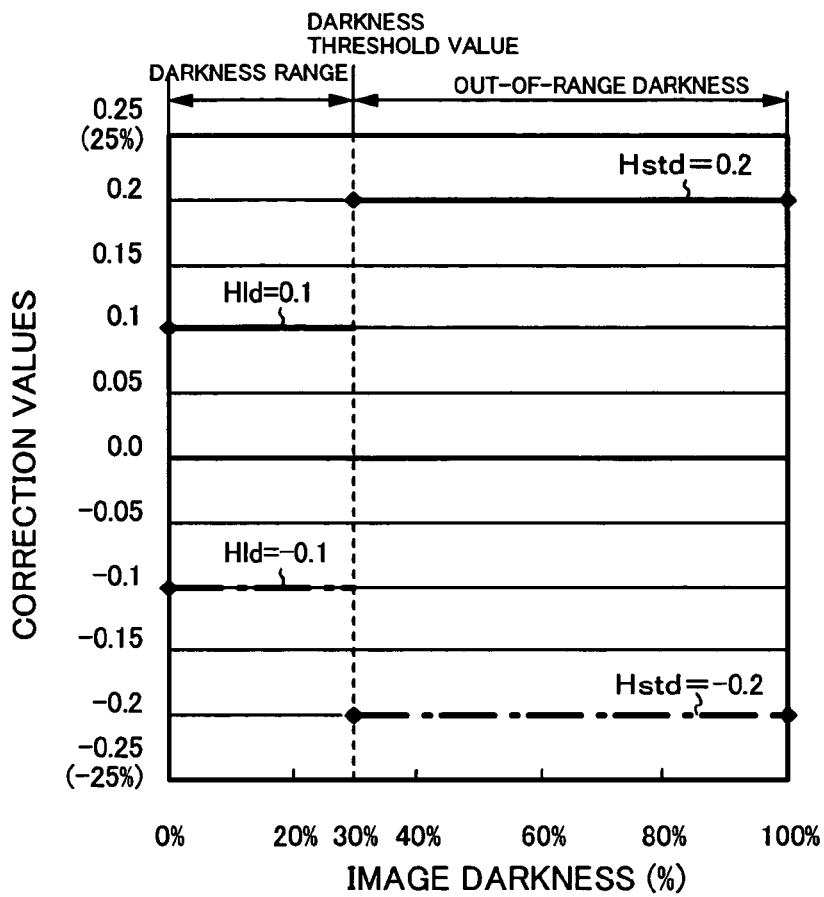
FIG. 33A is a diagram illustrating standard correction values and the low-darkness correction values corresponding thereto according to another example of the third embodiment.
FIG. 33B is a diagram illustrating a specific example of standard correction values and the low-darkness correction values corresponding thereto according to another example of the third embodiment.

However, in the examples in FIG. 32A and FIG. 32B, by dividing a range of darkness lower than the predetermined darkness, a plurality of sub-darkness ranges CR1 to CR3 are determined and a low-darkness correction value Hld is determined for each sub-darkness range, but there is no limitation to this configuration. For example, as shown in FIG. 33A and FIG. 33B, the low-darkness correction value Hld can be determined as a value obtained by multiplying the standard correction value Hstd by a fixed ratio. In other words, by multiplying the standard correction value Hstd by a fixed predetermined ratio, regardless of the darkness of the image to be printed, it is also possible to determine the low-darkness correction value Hld. In the examples in FIG. 33A and FIG. 33B, by setting the predetermined ratio as 0.5 and multiplying the standard correction value Hstd by this predetermined ratio, the low-darkness correction value Hld is determined. In such configuration, since excessive addition and/or decimation of dots can be prevented in images with a darkness lower than the predetermined darkness, it is possible to prevent deterioration of graininess while performing the required darkness correction.

In the embodiments in FIG. 32A, FIG. 32B, FIG. 33A, and FIG. 33b, the low-darkness correction value Hld is stored in the correction value storage section 63a, but it is also possible to store a correction ratio instead of the low-darkness correction value Hld, and calculate the low-darkness correction value Hld from the standard correction value Hstd and the correction ratio.

Other Embodiments

The above embodiments were described primarily with regard to the printer 1, but also include the disclosure of a printing apparatus, a printing method, and a printing system 1000, for example. Further, a printer 1 was described above as one embodiment. However, the foregoing embodiments are for the purpose of elucidating the present invention and are not to be interpreted as limiting the present invention. The present invention can of course be altered and improved without departing from the gist thereof and includes equivalents. In particular, the embodiments mentioned below are also included in the present invention.

<Regarding the Correction Values>

In the above embodiments, the correction value that is used when printing an image with a darkness lower than the predetermined darkness reduces the degree of darkness correction as compared to the correction value used when printing an image with a darkness equal to or higher than the predetermined darkness, but there is no limitation to this embodiment. In other words, the degree of darkness correction based on the correction value is set according to the darkness of the image to be printed.

<Regarding the Printer>

In the above embodiments, the printer 1 and the scanner device 100 are configured as separate devices, and each is communicably connected to the computer 1100. However, there is no limitation to this configuration. For example, the present invention can also be a so-called printer-scanner compound device that has both the function of the printer 1 and the function of the scanner device 100.

A printer 1 was described in the above described embodiments, but the present invention is not limited to this. For example, technology similar to that of the present embodiment can also be adopted for various types of recording apparatuses that apply inkjet technology, such as color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also, these methods and manufacturing methods are within the scope of application.

<Regarding the Ink>

The above described embodiments were of the printer 1, and thus a dye ink or a pigment ink is ejected from the nozzles. However, the ink that is ejected from the nozzles is not limited to such inks.

<Regarding the Nozzles>

In the foregoing embodiments, ink was ejected using piezoelectric elements. However, the mode for ejecting ink is not limited to this. Other methods, such as a method for generating bubbles in the nozzles through heat, can also be employed.

<Regarding the Print Mode>

The interlaced mode was described as an example of the print mode in the above described embodiments, but the print mode is not limited to this, and it is also possible to use a so-called overlapping mode. With interlacing mentioned above, a single raster line is formed by a single nozzle, whereas with the overlapping mode, a single raster line is formed by two or more nozzles. That is, with the overlapping mode, each time the paper S is carried by a constant carry amount F in the carrying direction, the nozzles which move in the carriage movement direction, intermittently eject ink droplets at intervals of every several pixels to intermittently form dots in the carriage movement direction. Then, in another pass, dots are formed by another nozzle such that the intermittent dots already formed are completed in a complementary manner, and thus a single raster line is completed by a plurality of nozzles.

<Regarding the Target of Darkness Correction>

In the foregoing embodiments, pixel data conversion is performed based on correction values in halftoning, but the present invention is no limitation to this method. For example, it is also possible to adopt a configuration in which pixel data is converted based on correction values with respect to the RGB image data that is obtained through resolution conversion processing.

<Regarding the Carriage Movement Direction in which Ink is Ejected>

The foregoing embodiments described an example of single-direction printing in which ink is ejected only when the carriage 31 is moving forward, but this is not a limitation, and it is also possible to perform so-called bidirectional printing in which ink is ejected both when the carriage 31 is moving forward and backward.

<Regarding the Ink Colors Used in Printing>

In the foregoing embodiments, there is described an example of multicolor printing in which the four color inks of cyan (C), magenta (M), yellow (Y), and black (K) are ejected onto the paper to form dots, but the ink colors are not limited to these. For example, it is also possible to use other inks in addition to these, such as light cyan (pale cyan, LC) and light magenta (pale magenta, LM). Alternatively, it is also possible to perform single-color printing using only one of these four colors.

What is claimed is:

1. A printing method comprising:
   (a) printing a correction pattern on a medium, wherein said correction pattern:
      comprises a plurality of lines, each of said lines being made of a plurality of dots arranged in a movement direction of nozzles, said lines being arranged in an intersecting direction that intersects with said movement direction, and
      is printed by alternately repeating an operation of ejecting ink from a plurality of said nozzles and an operation of moving said medium in said intersecting direction;
   (b) determining corresponding to each of said lines a correction value for correcting a darkness in said intersecting direction of an image to be printed on said medium, wherein a degree of darkness correction achieved by each of said correction values is determined according to a darkness of said correction pattern and a darkness of an image to be printed; and (c) printing said image on said medium based on said correction values determined corresponding to each of said lines, wherein a correction value that is used when printing an image with a darkness equal to or higher than predetermined darkness is constant regard less of the darkness of the image to be printed, and wherein a correction value that is used when printing an image with a darkness lower than said predetermined darkness makes the degree of darkness correction lower as compared to the constant correction value that is used when printing the image with the darkness equal to or higher than said predetermined darkness.

2. A printing method according to claim 1, wherein:

correction values that are used when printing an image with a darkness lower than a predetermined darkness makes the degree of darkness correction lower as compared to correction values that are used when printing an image with a darkness equal to or higher than said predetermined darkness.

3. A printing method according to claim 2, wherein:

the correction values that are used when printing an image with a darkness equal to or higher than said predetermined darkness are determined based on measurement values obtained by measuring a darkness of said correction pattern; and the correction values that are used when printing an image with a darkness lower than said predetermined darkness are determined based on the correction values that are used when printing an image with a darkness equal to or higher than said predetermined darkness.

4. A printing method according to claim 3, wherein:

the correction value that is used when printing an image with a darkness lower than said predetermined darkness is determined by modifying the correction value that is used when printing an image with a darkness equal to or higher than said predetermined darkness using a modifying coefficient; and said modifying coefficient indicates a ratio with respect to the correction value that is used when printing an image with a darkness equal to or higher than said predetermined darkness, and varies according to the darkness of an image to be printed.

5. A printing method according to claim 3, wherein:

the correction value that is used when printing an image with a darkness lower than said predetermined darkness is determined for each sub-darkness range by multiplying the correction value that is used when printing an image with a darkness equal to or higher than said predetermined darkness by a predetermined ratio corresponding to that sub-darkness range;

wherein a plurality of said sub-darkness ranges are set within a range of darkness lower than said predetermined darkness.

6. A printing method according to claim 1, wherein:

said printing of said image on said medium based on said correction values determined corresponding to each of said lines, forms said lines at a darkness corresponding to gradation values, and varies said gradation values of said image based on said correction values.

7. A printing method according to claim 1, wherein:

said printing of said image on said medium based on said correction values determined corresponding to each of said lines, forms said lines in a complementary manner by:

setting at least one line that is not formed between the lines that are formed by carrying out the operation of ejecting ink from said plurality of nozzles once, and carrying out the operation of ejecting ink from said plurality of said nozzles a plurality of times.

8. A printing method comprising:

(a) printing a correction pattern on a medium, said correction pattern:

comprises a plurality of lines, each of said lines being made of a plurality of dots arranged in a movement direction of nozzles, said lines being arranged in an intersecting direction that intersects with said movement direction, and is printed by alternately repeating an operation of ejecting ink from a plurality of said nozzles and an operation of moving said medium in said intersection direction;

(b) determining corresponding to each of said lines a correction value for correcting a darkness in said intersecting direction of an image to be printed on said medium, wherein a degree of darkness correction achieved by each of said correction values is determined according to a darkness of said correction pattern and a darkness of an image to be printed; and (c) printing said image on said medium based on said correction values determined corresponding to each of said lines, wherein:

said modifying coefficient is determined based on a correlation between a set of a reference darkness and a modifying reference coefficient and a set of the predetermined darkness and an out-of-range reference coefficient; wherein at least one said reference darkness is set within a range of darkness lower than said predetermined darkness, said modifying reference coefficient is a coefficient that is set corresponding to said reference darkness, and said out-of-range reference coefficient is a coefficient that is set corresponding to said predetermined darkness.

9. A printing method according to claim 8, said modifying coefficient is determined by linear interpolation between said set of said reference darkness and said modifying reference coefficient and said set of said predetermined darkness and said out-of-range reference coefficient.

10. A printing method according to claim 8, wherein:

a plurality of said sets of said reference darkness and said modifying reference coefficient are provided, said reference darkness being different for each of said sets; and said modifying reference coefficient makes the degree of darkness correction lower as said reference darkness becomes lower.

11. A printing method according to claim 8, wherein:

said reference darkness is a minimum darkness in said image, and is set within said darkness range.

12. A printing method comprising:

(a) printing a correction pattern on a medium, wherein said correction pattern:

comprises a plurality of lines, each of said lines being made of a plurality of dots arranged in a movement direction of nozzles, said lines being arranged in an intersecting direction that intersects with said movement direction, and is printed by alternately repeating, an operation of ejecting ink from a plurality of said nozzles and an operation of moving said medium in said intersecting direction;

(b) determining corresponding to each of said lines a correction value for correcting a darkness in said intersecting direction of an image to be printed on said medium, wherein a degree of darkness correction achieved by each of said correction values is determined according to a darkness of said correction pattern and a darkness of an image to be printed; and (c) printing said image on said medium based on said correction values determined corresponding to each of said lines, wherein:

correction values that are used when printing an image with a darkness lower than a predetermined darkness makes the degree of darkness correction lower as compared to correction values that are used when printing an image with a darkness equal to or higher than said predetermined darkness, the correction values that are used when printing an image with a darkness equal to or higher than said predetermined darkness are determined based on measurement values obtained by measuring a darkness of said correction pattern;

the correction values that are used when printing an image with a darkness lower than said predetermined darkness are determined based on the correction values that are used when printing an image with a darkness equal to or higher than said predetermined darkness, and the correction value that is used when printing an image with a darkness lower than said predetermined darkness is determined by multiplying the correction value that is used when printing an image with a darkness equal to or higher than said predetermined darkness by a constant predetermined ratio, regardless of the darkness of the image to be printed.

13. A printing method comprising:

(a) printing a correction pattern on a medium, wherein said correction pattern:

comprises a plurality of lines, each of said lines being made of a plurality of dots arranged in a movement direction of nozzles, said lines being arranged in an intersecting direction that intersects with said movement direction, and is printed by alternately repeating an operation of ejecting ink from a plurality of said nozzles and an operation of moving said medium in said intersecting direction;

(b) determining corresponding to each of said lines a correction value for correcting a darkness in said intersecting direction of an image to be printed on said medium, wherein:

a degree of darkness correction achieved by each of said correction values is determined according to a darkness of said correction pattern and a darkness of an image to be printed;

correction values that are used when printing an image with a darkness equal to or higher than a predetermined darkness are determined based on measurement values obtained by measuring a darkness of said correction pattern;

correction values that are used when printing an image with a darkness lower than said predetermined darkness make the degree of darkness correction lower as compared to the correction values that are used when printing an image with a darkness equal to or higher than said predetermined darkness, and each of said correction values that is used when printing an image with a darkness lower than said predetermined darkness is determined by modifying the correction value that is used when printing an image with a darkness equal to or higher than said predetermined darkness using a modifying coefficient, wherein said modifying coefficient:

indicates a ratio with respect to the correction value that is used when printing an image with a darkness equal to or higher than said predetermined darkness, and varies according to the darkness of an image to be printed; and is determined by linear interpolation between the set of a reference darkness and a modifying reference coefficient and the set of a predetermined darkness and an out-of-range reference coefficient, wherein a plurality of said sets of said reference darkness and said modifying reference coefficient are provided, said reference darkness being different for each of said sets, one of the reference darknesses is a minimum darkness in said image, and is set within a range of darkness lower than said predetermined darkness, said modifying reference coefficient is a coefficient that is set corresponding to said reference darkness, and makes the degree of darkness correction lower as said reference darkness becomes lower, and said out-of-range reference coefficient is a coefficient that is set corresponding to said predetermined darkness; or the correction values that are used when printing an image with a darkness lower than said predetermined darkness makes the degree of darkness correction lower as compared to the correction values that are used when printing an image with a darkness equal to or higher than said predetermined darkness, and each of the correction values that are used when printing an image with a darkness lower than said predetermined darkness is determined for each sub-darkness range by multiplying the correction value that is used when printing an image with a darkness equal to or higher than said predetermined darkness by a predetermined ratio corresponding to that sub-darkness range, wherein a plurality of said sub-darkness ranges are set within the range of darkness lower than said predetermined darkness; or the correction values that are used when printing an image with a darkness lower than said predetermined darkness makes the degree of darkness correction lower as compared to the correction values that are used when printing an image with a darkness equal to or higher than said predetermined darkness, and each of the correction values that are used when printing an image with a darkness lower than said predetermined darkness is determined by multiplying the correction value that is used when printing an image with a darkness equal to or higher than said predetermined darkness by a constant predetermined ratio, regardless of the darkness of the image to be printed; and (c) printing said image on said medium by varying gradation values in said image based on said correction values determined corresponding to each of said lines, and forming said lines at a darkness corresponding to said gradation values, and forming said lines in a complementary manner by:
  setting at least one line that is not formed between the lines that are formed by carrying out the operation of ejecting ink from said plurality of nozzles once, and
  carrying out the operation of ejecting ink from said plurality of said nozzles a plurality of times,
wherein the corrections values that are used when printing the image with the darkness equal to or higher than the predetermined darkness is constant regardless of the darkness of the image to be printed, and
wherein the correction values that are used when printing an image with a darkness lower than said predetermined darkness makes the degree of darkness correction lower as compared to the constant correction value that is used when printing the image with the darkness equal to or higher than said predetermined darkness.

14. A printing apparatus comprising:
nozzles for ejecting ink;
a carry unit for carrying a medium in an intersecting direction that intersects with said movement direction; and
a controller for controlling ejection of ink from said nozzles and carrying of the medium by said carry unit,
wherein said controller:
  (A) prints a correction pattern on said medium using said nozzles and said carry unit,
  wherein said correction pattern:
    comprises a plurality of lines, each of said lines being made of a plurality of dots arranged in a movement direction of the nozzles, said lines being arranged in an intersecting direction that intersects with said movement direction, and
    is printed by alternately repeating an operation of ejecting ink from a plurality of said nozzles, and an operation of moving said medium in said intersecting direction;
  (B) determines corresponding to each of said lines a correction value for correcting a darkness in said intersecting direction of an image to be printed on said medium,
  wherein a degree of darkness correction achieved by each of said correction values is determined according to a darkness of said correction pattern and a darkness of an image to be printed; and
  (C) prints, using said nozzles and said carry unit, said image on said medium based on said correction values determined corresponding to each of said lines,
wherein a correction value that is used when printing an image with a darkness equal to or higher than a predetermined darkness is constant regardless of the darkness of the image to be printed, and
wherein a correction value that is used when printing an image with a darkness lower than said predetermined darkness makes the degree of darkness correction lower as compared to the constant correction value that is used when printing the image with the darkness equal to or higher than said predetermined darkness.

* * * * *